(12) United States Patent
Conlin et al.

(10) Patent No.: US 11,451,594 B2
(45) Date of Patent: Sep. 20, 2022

(54) GENERATION AND MANAGEMENT OF DATA INSIGHTS TO AID COLLABORATIVE MEDIA OBJECT GENERATION WITHIN A COLLABORATIVE WORKSPACE

(71) Applicant: Microsoft Technology Licensing, LLC, Redmond, WA (US)

(72) Inventors: Paul Donnelly Conlin, Saint Paul, MN (US); Arnavi Mahendra Chheda, Kirkland, WA (US); Cassio Martins Antonio, Bloomington, MN (US); Justin J. Chando, Bellevue, WA (US); Ahamad Rifaadh Saif, Vancouver (CA); Megan Christin Buzzas, Minneapolis, MN (US); Cassandra Nicole Bub, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/178,600

(22) Filed: Feb. 18, 2021

(65) Prior Publication Data
US 2022/0263877 A1 Aug. 18, 2022

(51) Int. Cl.
*H04L 65/402* (2022.01)
*H04N 7/15* (2006.01)
(Continued)

(52) U.S. Cl.
CPC ......... *H04L 65/4025* (2022.05); *G06N 20/00* (2019.01); *G06Q 10/101* (2013.01); *H04L 65/4053* (2013.01); *H04N 7/152* (2013.01)

(58) Field of Classification Search
CPC .............. G06Q 10/101; H04L 65/4023; H04L 65/4053; H04N 7/152
See application file for complete search history.

(56) References Cited

U.S. PATENT DOCUMENTS 10,126,927 B1 11/2018 Fieldman
10,319,150 B1 * 6/2019 Canada .................. G06T 11/00
(Continued)

OTHER PUBLICATIONS

"Non Final Office Action Issued in U.S. Appl. No. 17/178,566", dated Nov. 12, 2021, 12 Pages.
(Continued)

*Primary Examiner* — Thomas J Dailey

(57) ABSTRACT

In the present disclosure, a collaborative workspace fosters content creation between users in a synchronous and/or asynchronous manner by enabling automatic generation and management of collaborative media objects that automatically combine content from a plurality of users into a single media object. To improve processing efficiency and user productivity, the present disclosure further provides processing that applies trained artificial intelligence (AI) processing that is adapted to automatically generate representations of data insights for management of a collaborative media object within the collaborative workspace. Data insights are generated pertaining to feature management of an exemplary application/service (e.g., video discussion application/service) including features for generating and managing a collaborative media object. Signal data associated with users of a collaborative session (e.g., within a collaborative workspace) is detected and analyzed. Contextually relevant data insights are generated, where representations of data insights are provided for rendering through the collaborative workspace (e.g., GUI representation thereof).

20 Claims, 26 Drawing Sheets

(51) Int. Cl.
    *G06Q 10/10*     (2012.01)
    *H04L 65/4053*   (2022.01)
    *G06N 20/00*     (2019.01)

(56) References Cited

U.S. PATENT DOCUMENTS

| | | | |
|---|---|---|---|
| 10,459,985 B2* | 10/2019 | Shepherd | H04L 65/403 |
| 10,764,534 B1 | 9/2020 | Shevchenko et al. | |
| 10,768,885 B1 | 9/2020 | Fieldman | |
| 11,082,486 B1* | 8/2021 | Brevoort | H04L 51/16 |
| 2009/0222742 A1* | 9/2009 | Pelton | G06Q 10/10 715/753 |
| 2009/0307189 A1* | 12/2009 | Bobbitt | G06F 16/00 |
| 2015/0082203 A1 | 3/2015 | James et al. | |
| 2016/0117061 A1 | 4/2016 | Hodgart et al. | |
| 2017/0351402 A1* | 12/2017 | Yoakum | H04L 12/1822 |
| 2018/0316946 A1 | 11/2018 | Todd | |
| 2020/0294317 A1* | 9/2020 | Segal | G06T 19/006 |
| 2020/0302816 A1 | 9/2020 | Williams et al. | |
| 2021/0026897 A1 | 1/2021 | Rathje et al. | |
| 2021/0051196 A1* | 2/2021 | Hodgins | H04W 4/08 |
| 2021/0397402 A1* | 12/2021 | Ashkenazi | G06F 3/0482 |

OTHER PUBLICATIONS

"International Search Report and Written Opinion Issued in PCT Application No. PCT/US22/011888", dated Apr. 19, 2022, 12 Pages.

"Final Office Action Issued in U.S. Appl. No. 17/178,566", dated Apr. 14, 2022, 10 Pages.

"International Search Report and Written Opinion Issued in PCT Application No. PCT/US22/014808", dated Mar. 24, 2022, 13 Pages.

* cited by examiner

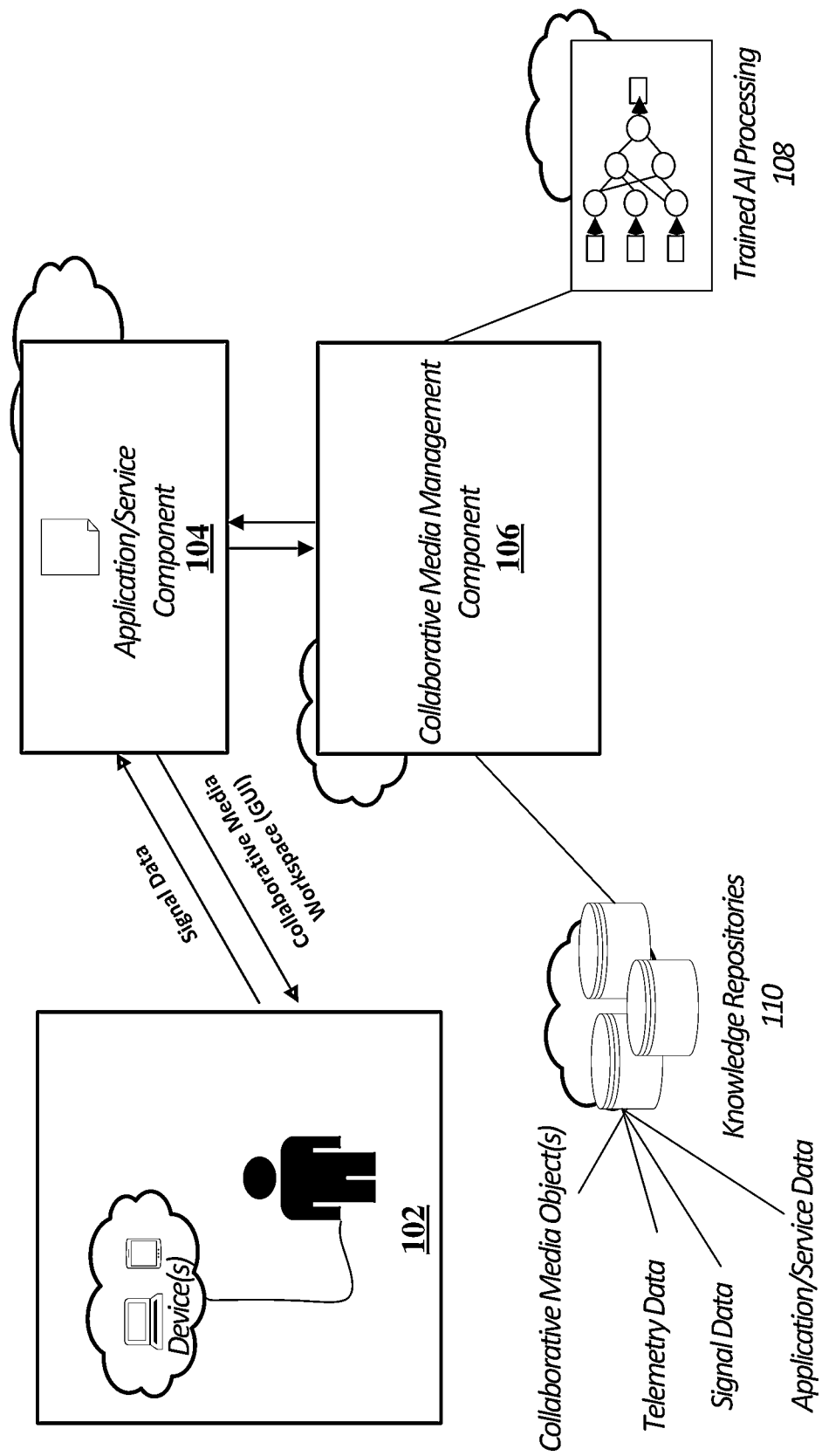

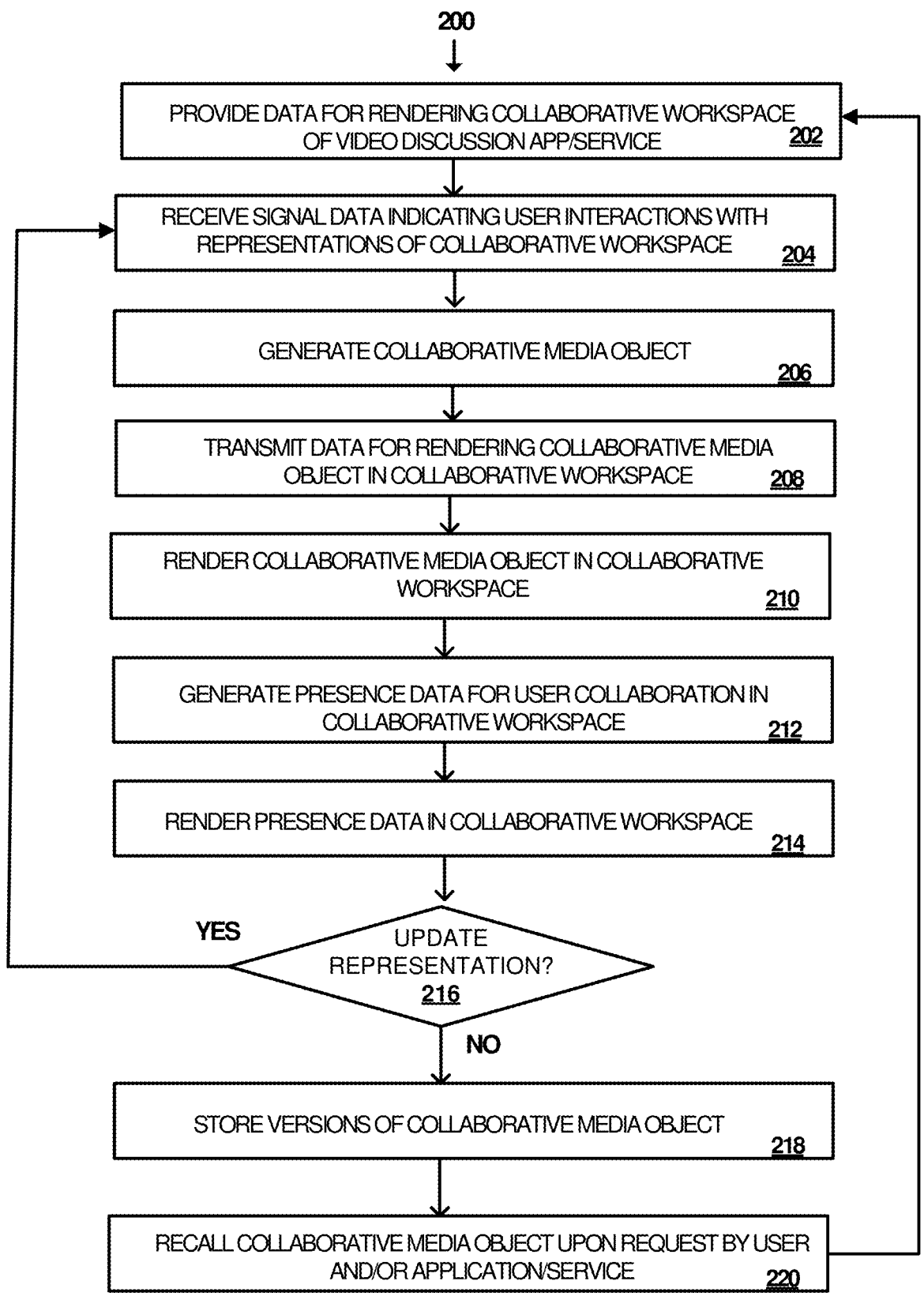

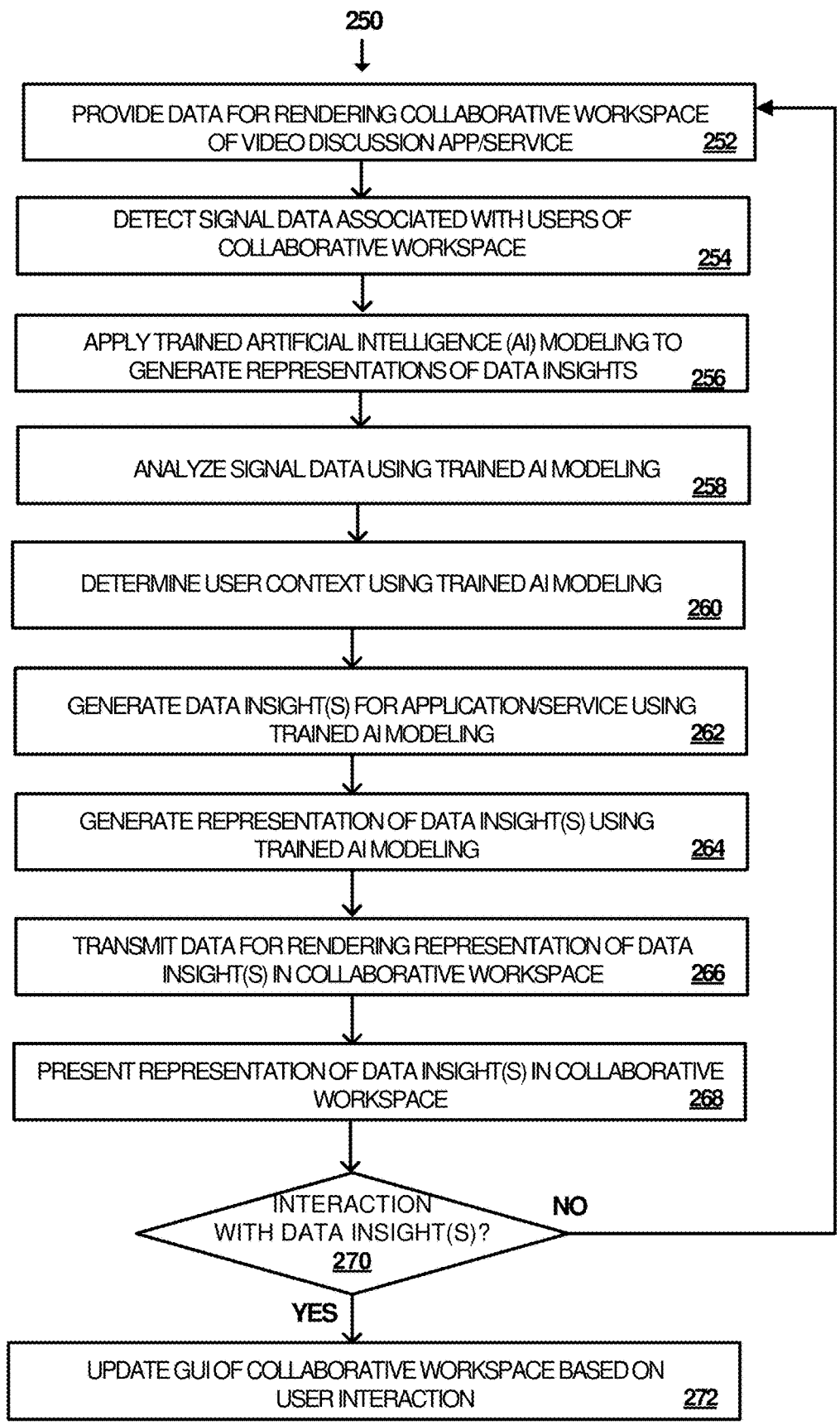

300

310

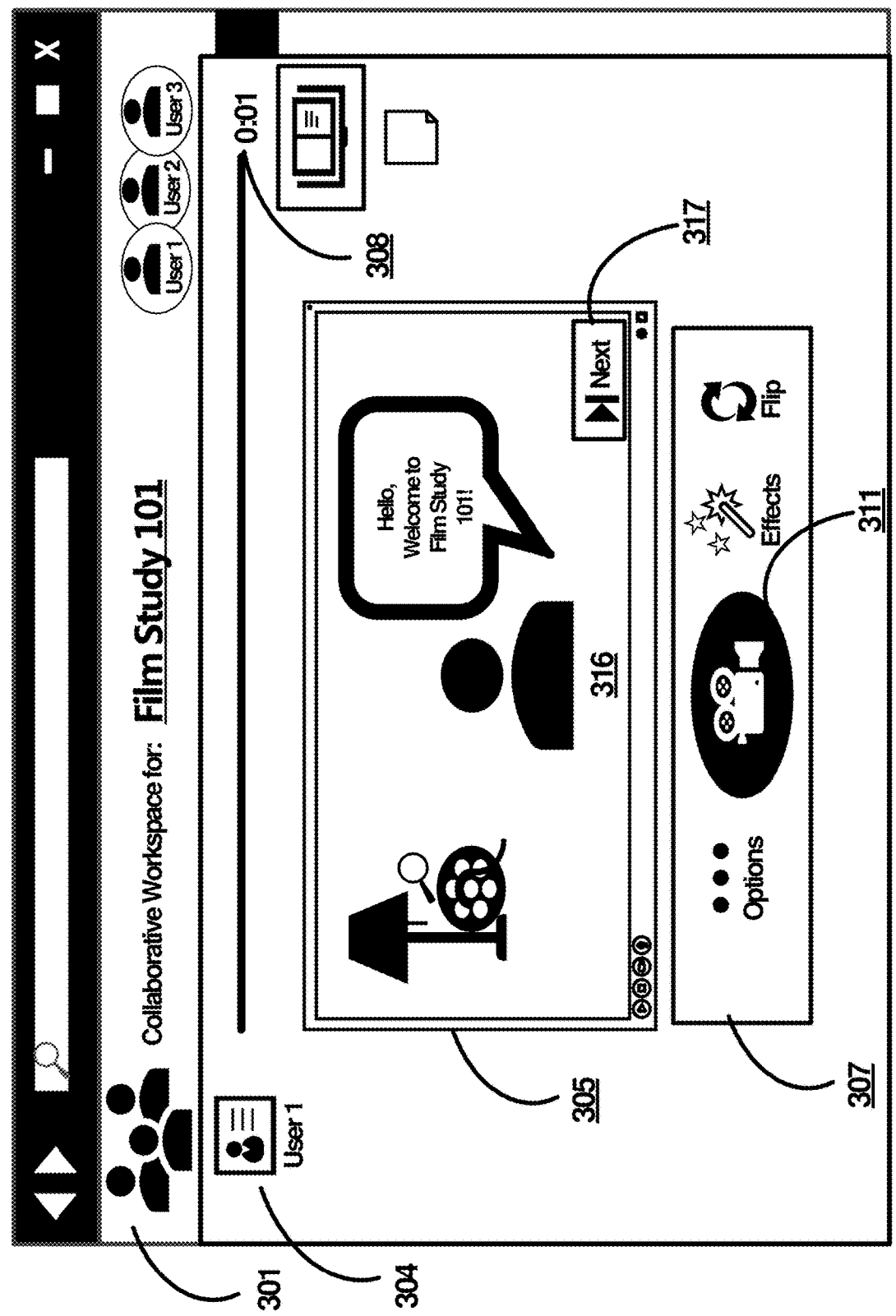

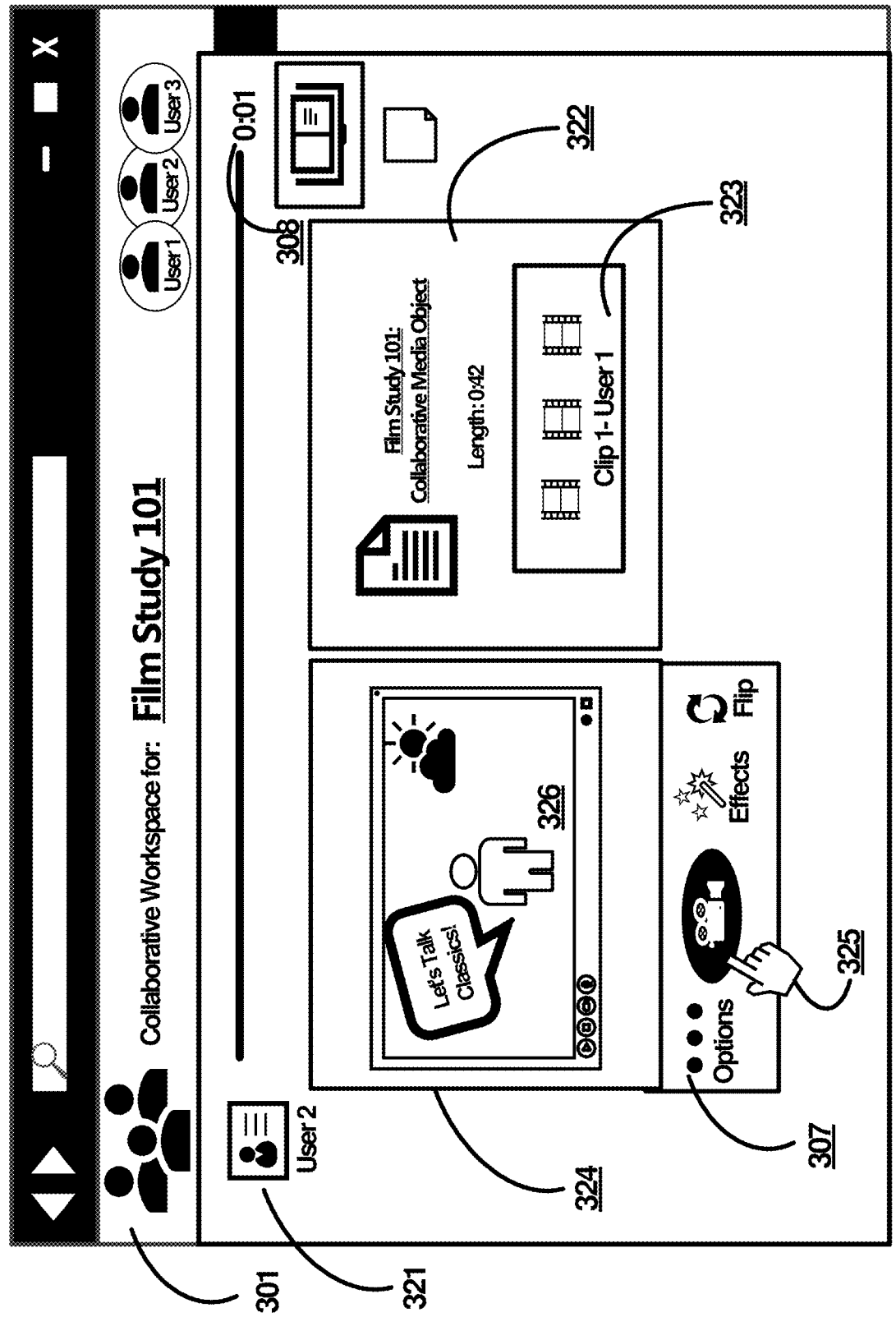

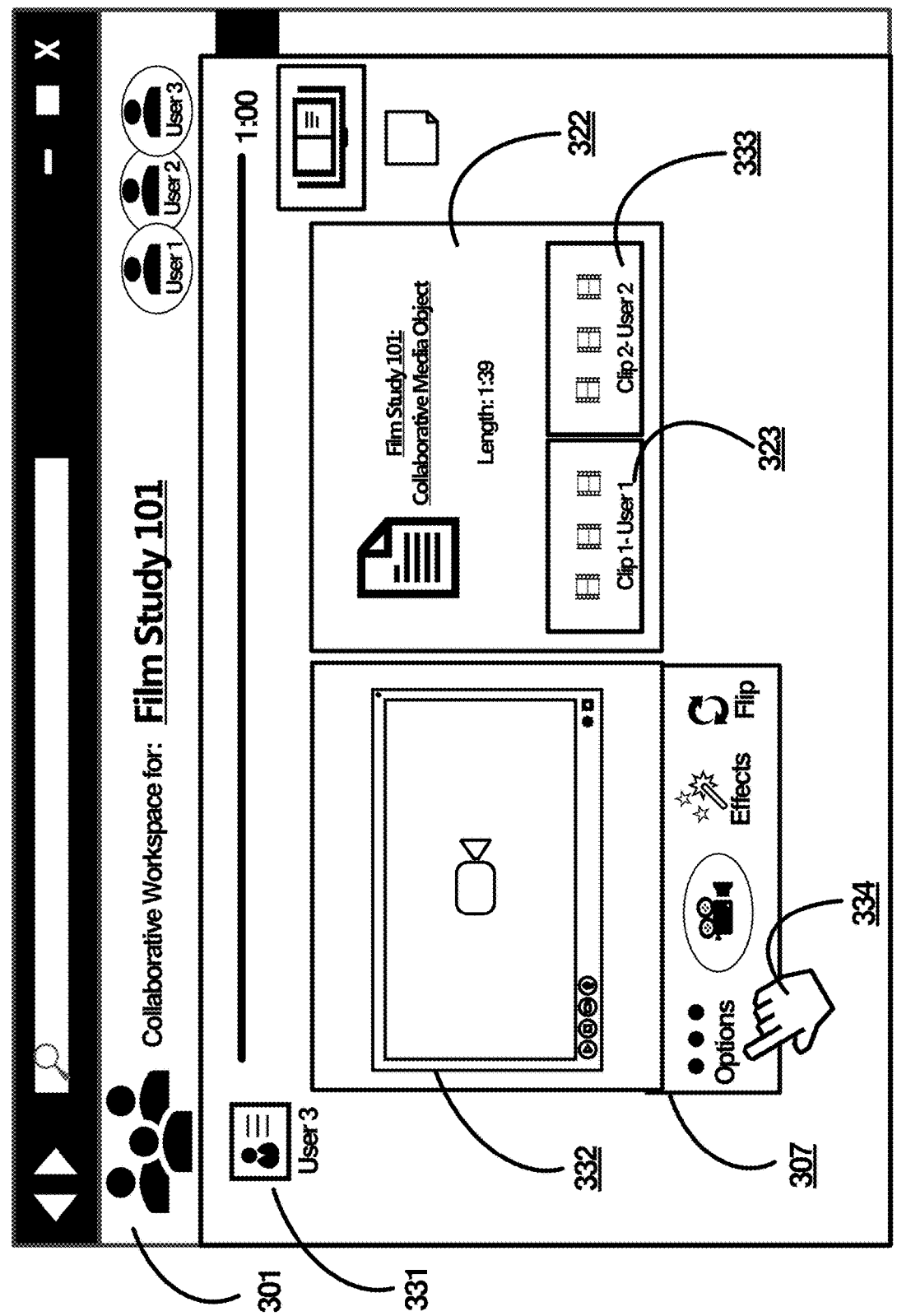

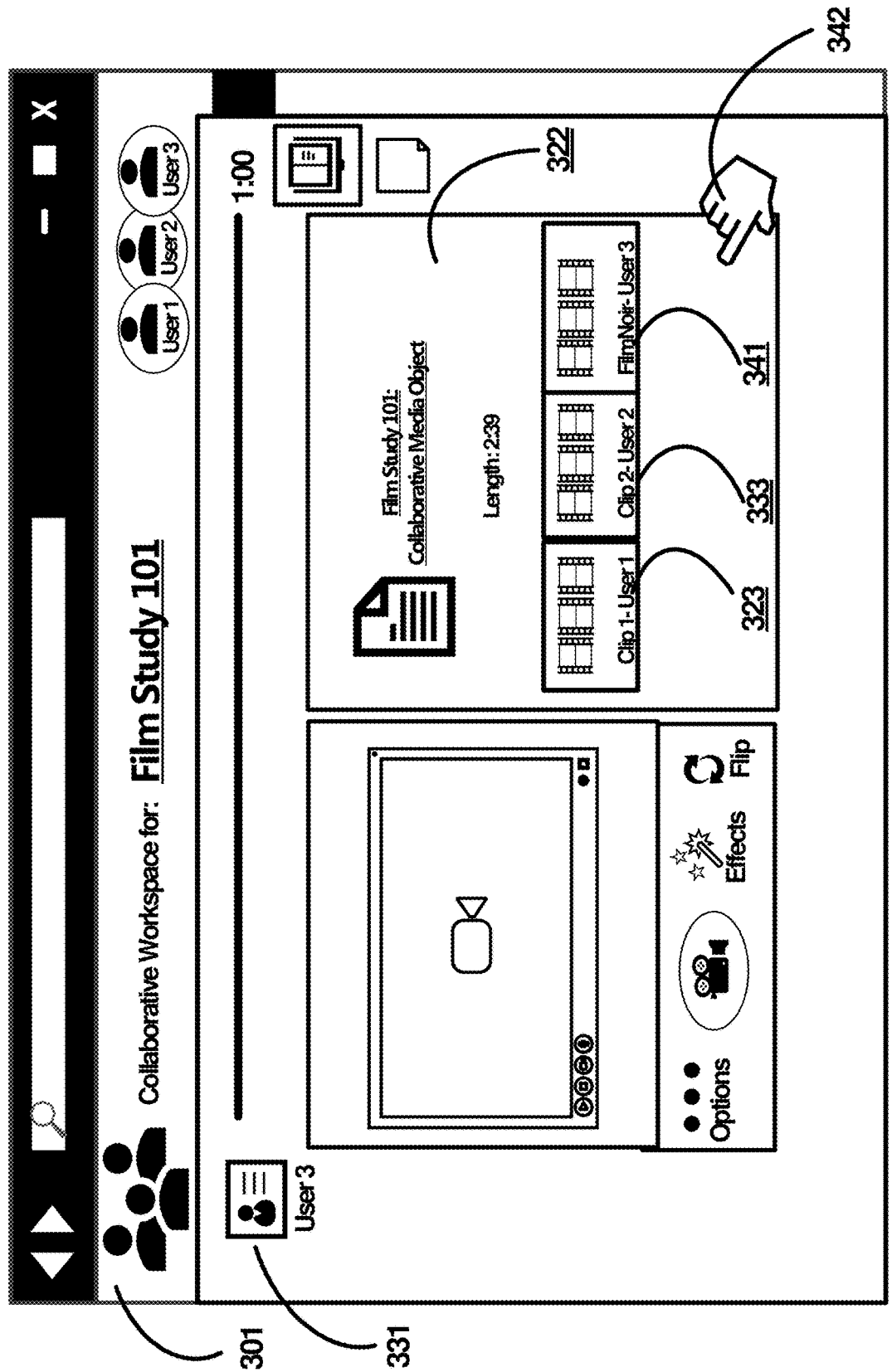

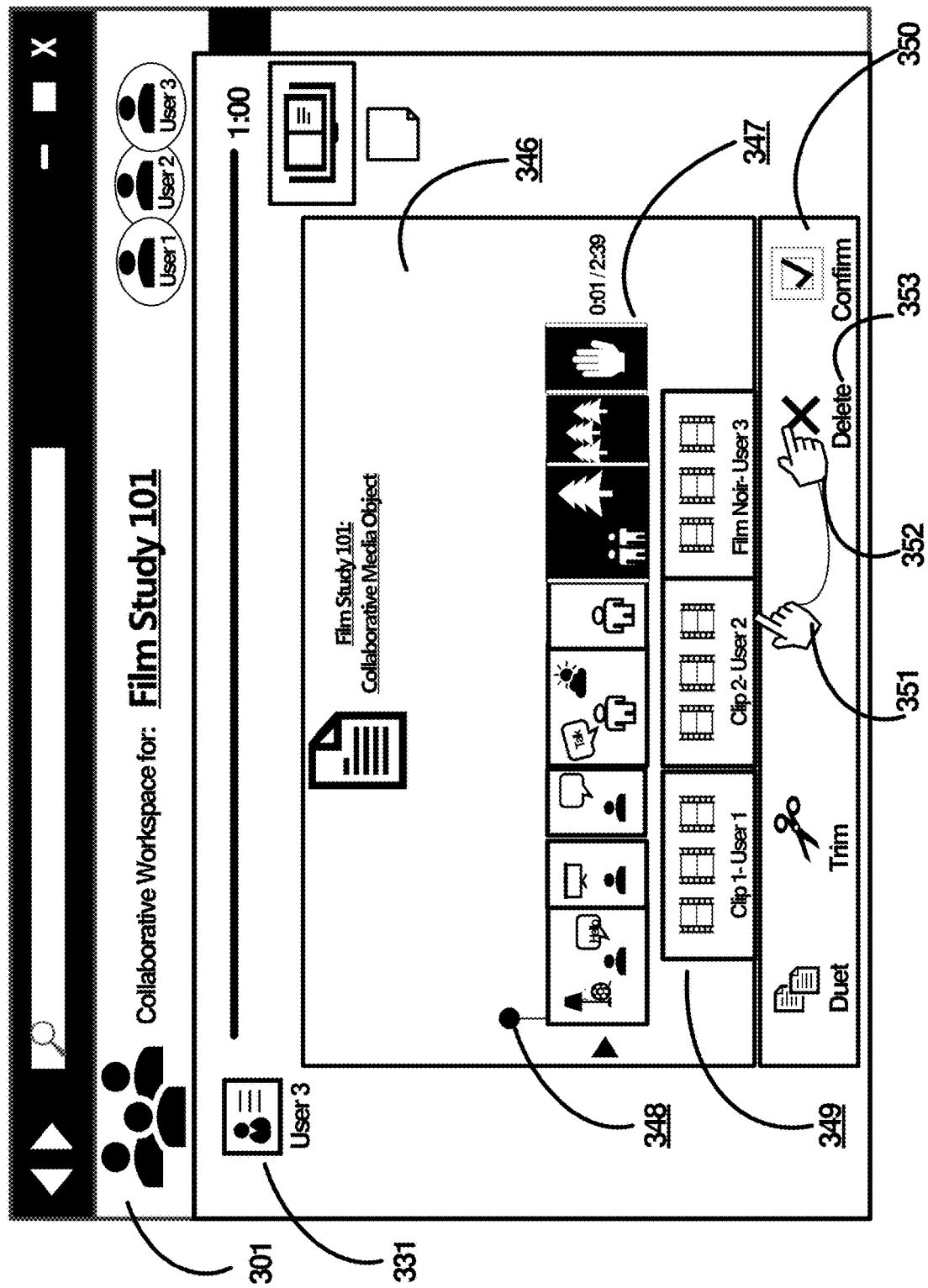

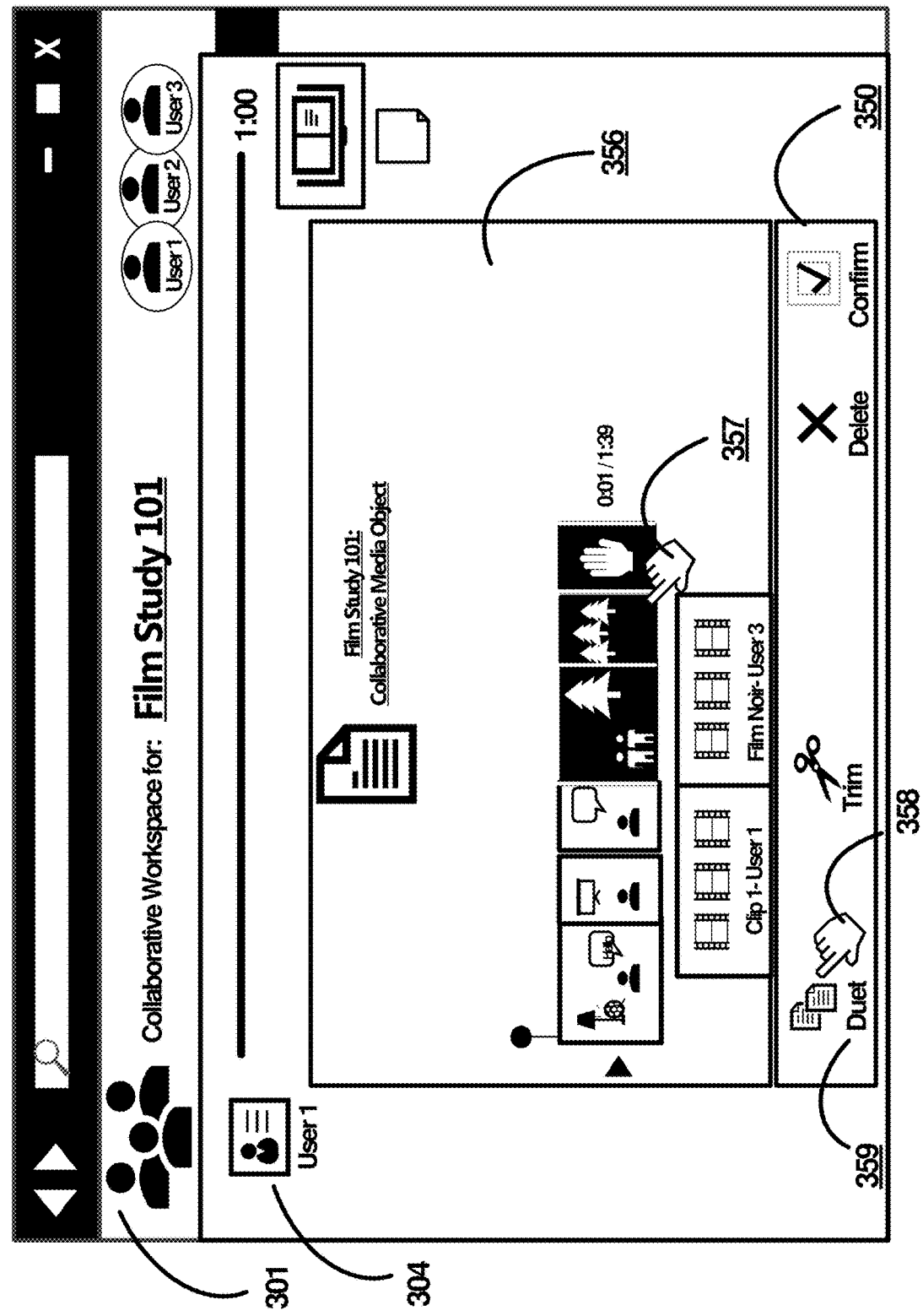

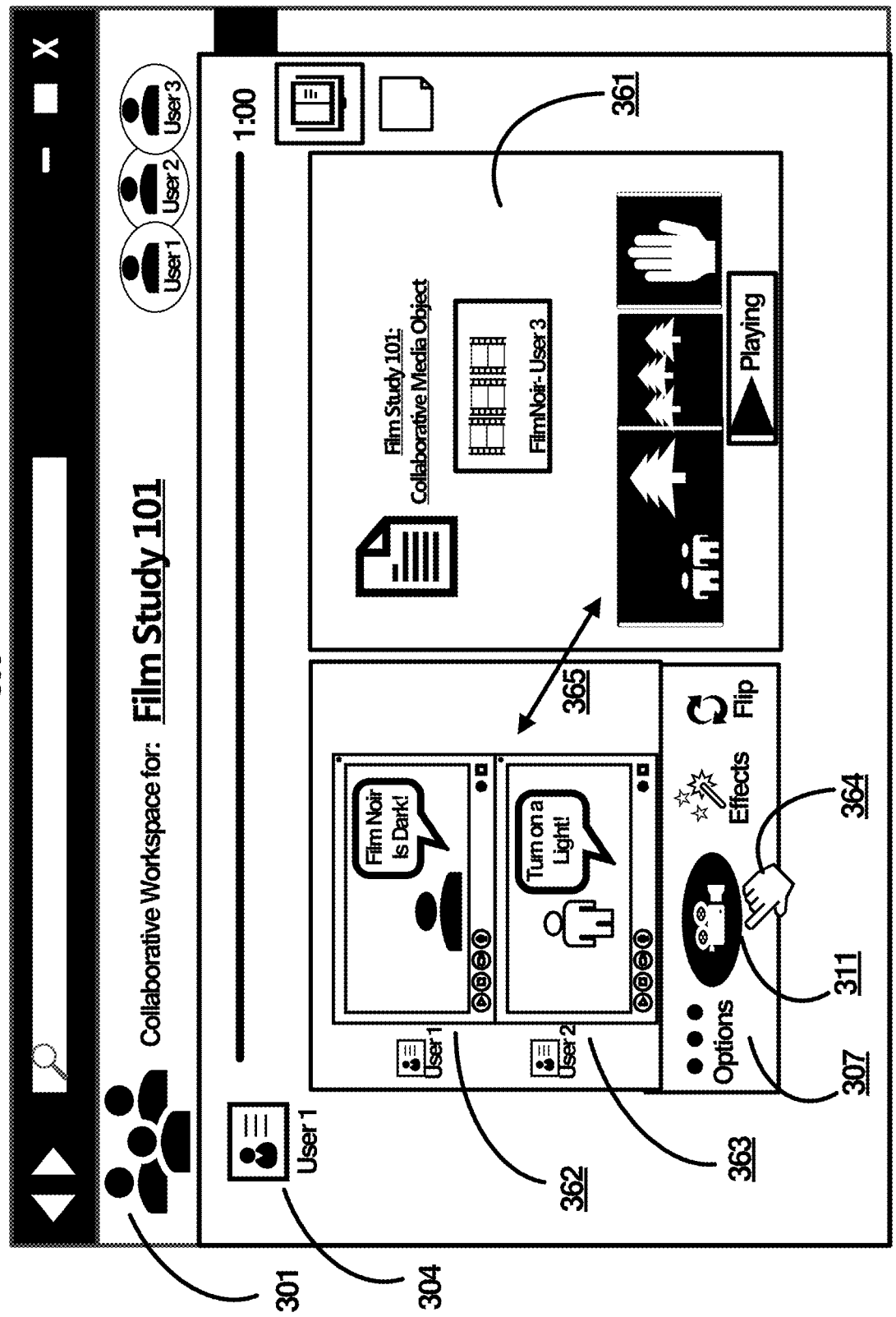

400

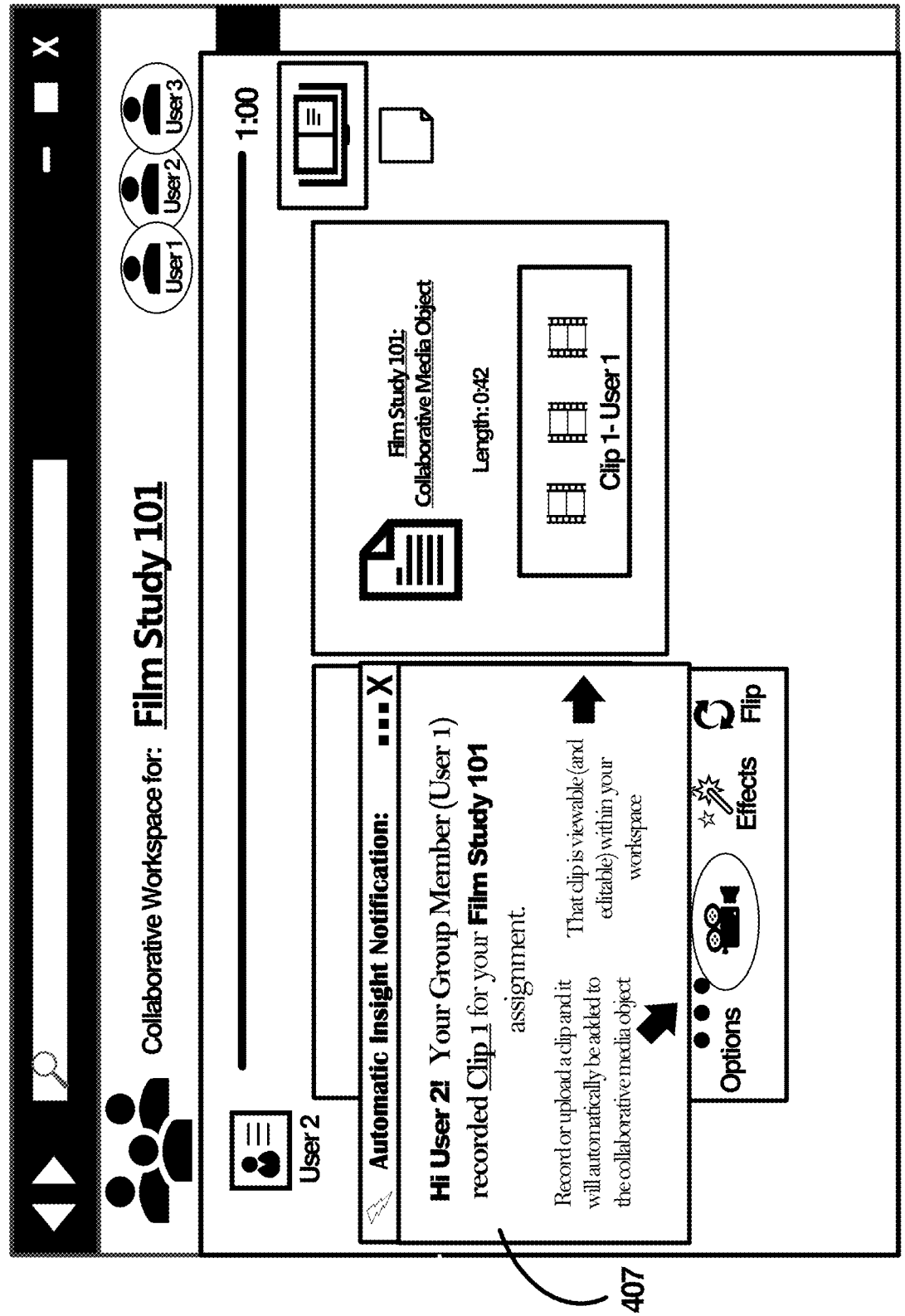

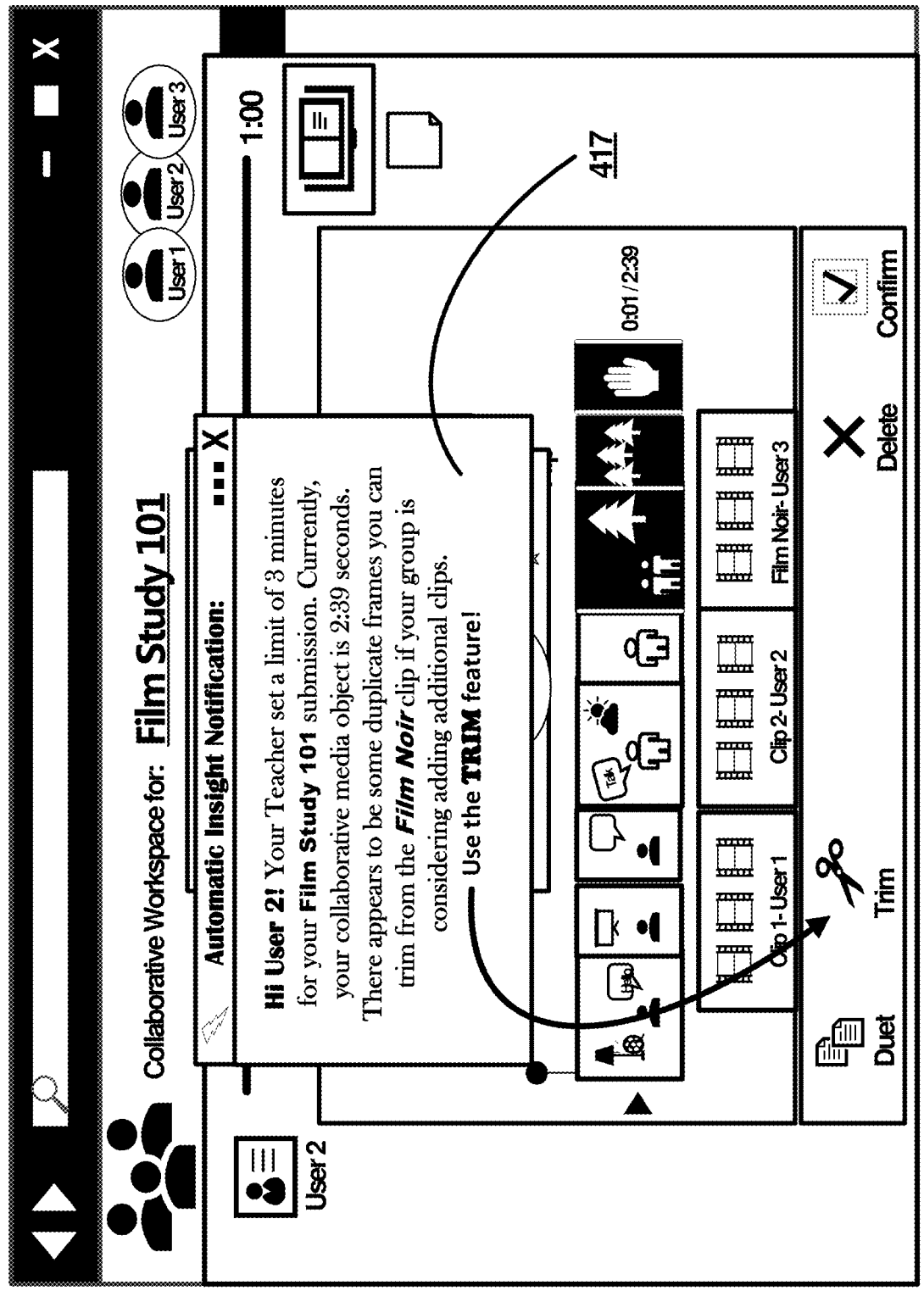

420

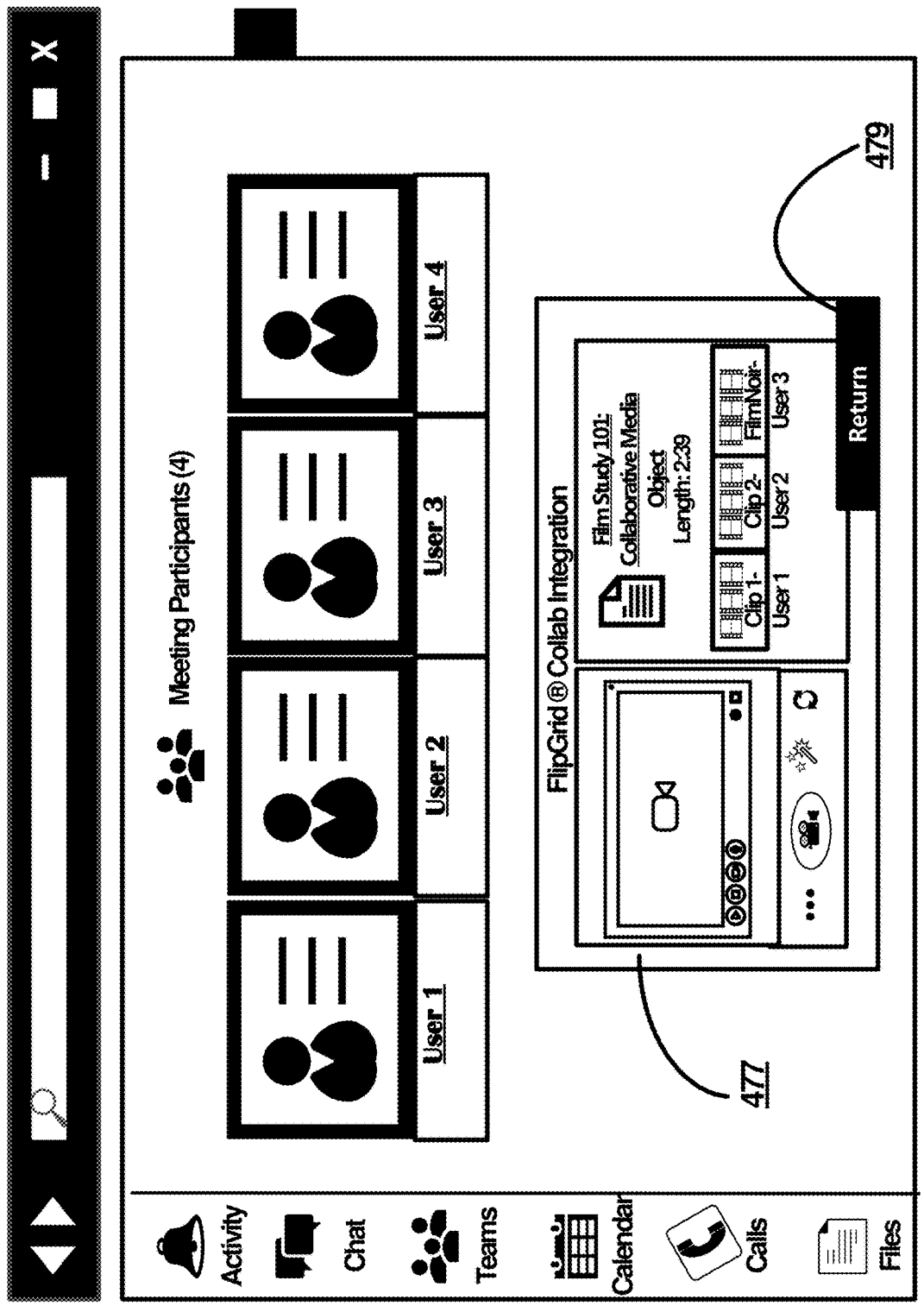

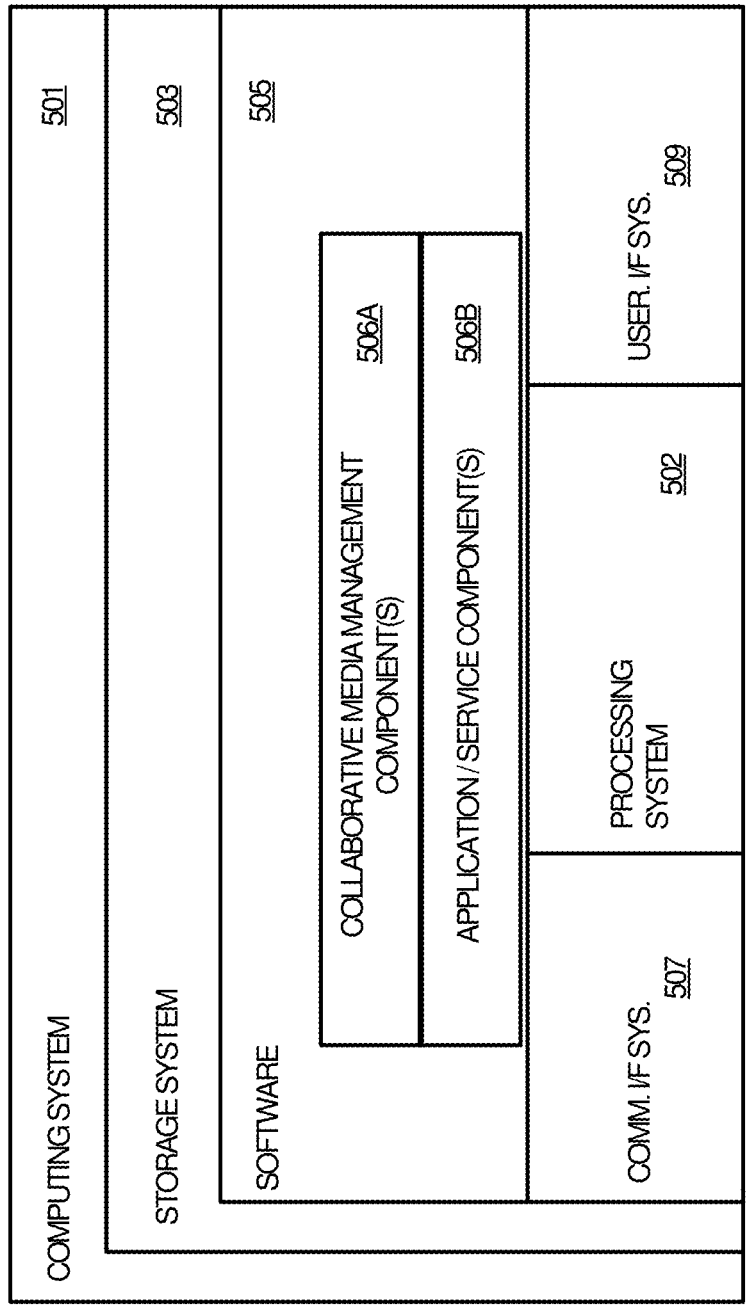

GENERATION AND MANAGEMENT OF DATA INSIGHTS TO AID COLLABORATIVE MEDIA OBJECT GENERATION WITHIN A COLLABORATIVE WORKSPACE

BACKGROUND

With "remote everything" being the new normal, online collaboration is pivotal to maintaining the same productivity that users traditionally have via in-person interactions. However, current solutions for video collaboration are limited in synchronous and asynchronous collaboration scenarios. For instance, users can either co-record a single video at the same time or are limited to sharing files with one another and having one user stitch together a final video product. This is especially cumbersome for users when they are working with a plurality of content portions (e.g., videos) from different users and manually creating a combined work product (e.g., school assignments, work presentations). A lot of time and manual actions (processing operations) are required to be executed to combine content in a final work product. As such processing efficiency for both computing devices as well as applications/services executing thereon can be greatly improved in collaborative scenarios.

Furthermore, improvements in processing capabilities have made users come to expect more intelligent applications/services that can adapt to a context in which a user is working. Users have also come to expect instantaneous processing results that reduce latency when creating content. However, traditional applications/services do not typically provide intuitive graphical user interfaces (GUIs) that assist users with task completion relative to an operational context that a user is experiencing. This creates a disadvantage in collaborative scenarios, especially when users have to execute a plurality of manual actions to accomplish a task. As such, improvements in applications/services, including GUIs, can greatly enhance a user experience and overall productivity, especially in collaborative instances that involve multiple users.

SUMMARY

For resolution of the above technical problems and other reasons, there is a technical need for a collaborative workspace that fosters content creation between users in a synchronous and/or asynchronous manner. Uniquely, an exemplary collaborative workspace, presentable through a GUI of an application or service, is adapted to enable automatic generation and management of collaborative media objects. Collaborative media objects are generated that automatically combine content from a plurality of users into a single media object. This is extremely beneficial in technical scenarios where users are creating projects, assignments, presentations, etc., by removing the need for users to manually stitch together and combine content to create a final product. In some technical instances, the collaborative workspace is adapted for a video discussion application/service, where users create one or more video clips (e.g., video feeds, live camera feeds) in response to a posted topic.

To improve processing efficiency and user productivity relative to a collaborative workspace, the present disclosure further provides processing that applies trained artificial intelligence (AI) processing that is adapted to automatically generate representations of data insights for management of a collaborative media object within the collaborative workspace. Data insights may be generated pertaining to feature management of an exemplary application/service (e.g., video discussion application/service) including features for generating and managing a collaborative media object. Signal data associated with users of a collaborative session (e.g., within a collaborative workspace) may be detected and analyzed. While a plurality of different types of signal data are applicably described herein, detected signal data comprises application-specific signal data pertaining to user interactions of users within a collaborative workspace (e.g., of a video discussion application or service). Analysis of signal data leads to a determination as to a context of users within a collaborative workspace. Contextually relevant data insights may then be generated, where representations of data insights are provided for rendering through the collaborative workspace (e.g., a GUI representation thereof).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary system diagram of components interfacing to enable automatic generation and management of collaborative media objects and data insights within an exemplary collaborative workspace, with which aspects of the present disclosure may be practiced.

FIG. 2A illustrates exemplary method related to automatic generation and management of exemplary collaborative media objects, with which aspects of the present disclosure may be practiced.

FIG. 2B illustrates exemplary method related to automatic generation and management of data insights to aid user collaboration within a collaborative workspace, with which aspects of the present disclosure may be practiced.

FIGS. 3A-3L illustrate exemplary processing device views associated with user interface examples for an improved user interface that is adapted for generation and management of collaborative media objects, with which aspects of the present disclosure may be practiced.

FIGS. 4A-4J illustrate exemplary processing device views associated with user interface examples for an improved user interface that is adapted for generation and management of data insights to aid user collaboration within a collaborative workspace, with which aspects of the present disclosure may be practiced.

FIG. 5 illustrates a computing system suitable for implementing processing operations described herein related to generation and management of collaborative media objects and data insights within an exemplary collaborative workspace, with which aspects of the present disclosure may be practiced.

DETAILED DESCRIPTION

Figure 3A:
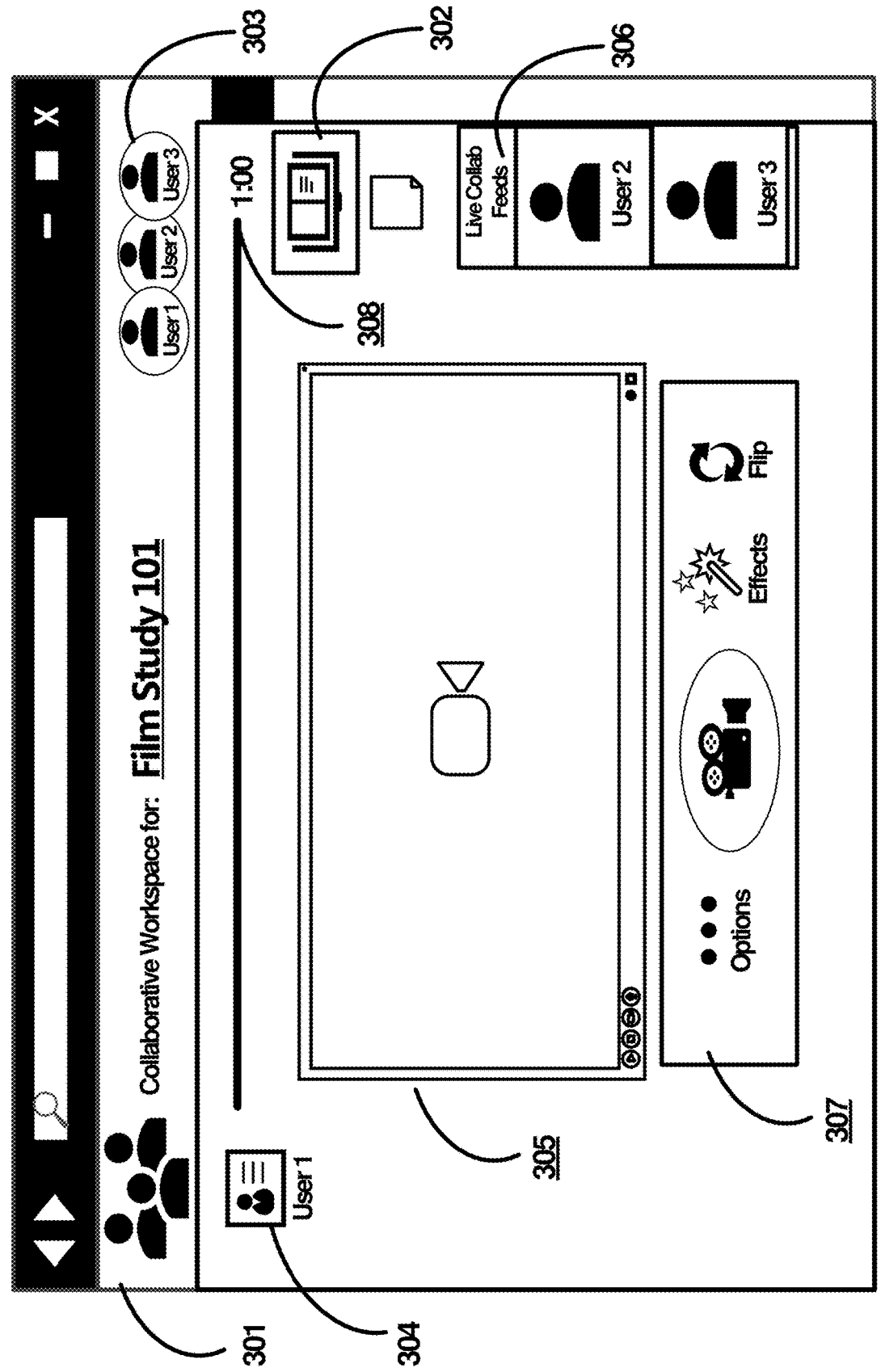

As identified in the foregoing, there is a technical need for a collaborative workspace that fosters content creation between users in a synchronous and/or asynchronous manner. An exemplary collaborative workspace, presentable through a GUI of an application or service, is adapted to enable automatic generation and management of collaborative media objects. Collaborative media objects are generated that automatically combine content from a plurality of users into a single media object. This is extremely beneficial in technical scenarios where users are creating projects, assignments, presentations, etc., by removing the need for users to manually stitch together and combine content to create a final product. In some technical instances, the collaborative workspace is adapted for a video discussion application/service, where users create one or more video clips (e.g., video feeds, live camera feeds) in response to a posted topic. In at least one example, a collaborative workspace for a video discussion application/service may be integrated to display within another type of application/service to further improve processing efficiency and user productivity. However, it is to be understood that processing described in the present disclosure is extensible to work with any type of application/service and any content type.

For ease of understanding, a non-limiting example of a video discussion application/service is Flipgrid® video discussion application/service. The present disclosure describes both back-end processing (e.g., server-side processing) and front-end representations (e.g., an adapted GUI) that bring online collaboration to the Flipgrid® camera application/service. Through the present disclosure, users are now able to join the same video creation session which is adapted to foster collaboration allowing multiple users to join and record video clips in response to a posted topic. In some examples, video clips can be recorded at the same time where the collaborative workspace is configured to intelligently (and automatically) create an arrangement of those video clips as a single media object. For instance, a teacher may post an assignment for students via the Flipgrid® camera, where a group of students can collaboratively create and/or upload video clips to create a response to the assignment for submission and subsequent review by the teacher. Video clips recorded and/or uploaded by users are automatically combined to create a combined work product (e.g., collaborative media object) for posting and/or submission. A collaborative media object can further be collaboratively edited by a group of users in association with a collaborative session of the collaborative workspace. Collaborative sessions described herein may pertain to synchronous and/or asynchronous user collaboration through an exemplary collaborative workspace and/or other application/service endpoints.

Furthering aspects of collaborative integration, users can return to a collaborative workspace at a later point in time and modify a collaborative media object (e.g., add/delete video clips, trim, rearrange, add dueting). For example, recall processing may occur through a collaborative workspace and/or through a different application/service endpoint. Changes made to a collaborative media object are automatically updated (e.g., through a collaborative workspace) for all users who are participating in an ongoing collaborative session via a collaborative workspace. For instance, collaboration is extremely useful in educational scenarios where students may collaborate remotely from different locations. An exemplary collaborative workspace allows students to start a collaborative session, record video clips and then wait for another student (e.g., in a different time zone) to record their own clip to add to an assignment while treating the entire user experience as a single session with a single work product.

As a non-limiting example, users may access a collaborative workspace through a video discussion application/service. That is, a collaborative workspace is tailored for presentation via a video discussion application/service. An exemplary collaborative workspace fosters synchronous and/or asynchronous user collaboration via a group space that is accessible to multiple users. In some examples, collaboration, through the collaborative workspace, occurs where two or more users who concurrently access the collaborative workspace. In alternative examples, users may utilize the collaborative workspace in an asynchronous manner to conduct user collaboration. For example, the collaborative workspace is a real-time (or near real-time) electronic collaboration session that is concurrently accessed by at least two users and further provides a topic for the at least two users to respond to by providing video feeds. Video feeds can be recorded live through the collaborative workspace (e.g., during a collaborative session) and/or uploaded by users within the collaborative session. The collaborative workspace is configured to detect and analyze added content and automatically generate a single media object (e.g., collaborative media object) from one or more added video feeds. Portions of the single media object can be edited (e.g., within the collaborative workspace) but the entirety of the collaborative media object is a treated a single media object. This is beneficial for not only review of a submission of the collaborative media object (e.g., by a teacher) but also for users who want to export or transfer the collaborative media object to work in other applications/services.

Furthering the above discussion, a technical scenario may be considered in which multiple video feeds are added to a collaborative workspace. For instance, a component of a video discussion application/service may receive a first live video feed from a first device associated with a first user of a collaborative session. The first live video feed is recorded within the collaborative workspace in response to a posted topic associated with the collaborative workspace. Additionally, a second live video feed may be added from a second device associated with a second user of a collaborative session. Similarly, the second live video feed may be recorded within the collaborative workspace in response to the posted topic associated with the collaborative workspace. In further examples, a third video feed, that was previously recorded by a user, may be uploaded to the collaborative workspace as part of an assignment submission. As an example, the third video feed may be uploaded via a third device associated with a third user of the collaborative session. However, any user may record or upload content. Regardless of the number of video feeds and/or video clips that are added to the collaborative workspace, the collaborative workspace may generate a collaborative media object that automatically combines the video feeds/clips (and in some cases content portions of other content types) into a single media object for presentation in the collaborative workspace of the video discussion application or service. For example, generation of the collaborative media object comprises aggregating a clip of the first live video feed (or live camera feed) and a clip of the second live video feed (or live camera feed) in a sequential order (and the third video feed in such examples) to create the single media object. In instances where additional feeds are added (e.g., third video feed), the collaborative media object may further incorporate additional video feeds into a single media object. In some technical examples, generation of the collaborative media object may comprise execution of trained artificial intelligence (AI) processing that executes processing operations to intelligently determine how to arrange the content (e.g., clips of video feeds) for aggregation. For instance, an AI model (or models) may be trained to evaluate the importance of video clips to a posted topic (and/or relevance between added clips) to determine how to order or present an arrangement of video clips as a single media object. Any types of signal data, alone or in combination, may be utilized to aid importance/relevance ranking processing to generate determinations including but not limited to automatic determinations with respect to: editing capabilities of users (e.g., user settings for collaborative editing/viewing); generation of presence indications for interactions with a collaborative media object during one or more collaborative sessions; generation of a dynamic timeline providing temporal representation of user interactions with a collaborative media object; and generation and provision of data insight representations for a collaborative workspace (e.g., for interaction with a collaborative media object), among other examples.

Continuing the above example, data for rendering of the collaborative media object may be transmitted for display in a GUI representation of the collaborative workspace. For instance, this may occur in distributed examples where a component is executing processing and transmits, over a network connection, data for rendering a representation of a GUI on a client computing device (e.g., user computing device). As an example, transmission of data for rendering a collaborative media object, and representations thereof, may comprise transmitting, to a client device, data for rendering the collaborative media object in a GUI presenting the collaborative workspace (e.g., within the video discussion application/service). In other examples, processing to generate a collaborative media object, and representations thereof, may occur directly on a client device that is rendering a user representation of the collaborative workspace (e.g., representation of collaborative workspace for first user of a group of users).

Further examples described herein pertain to generation of notification representations of activity for users, which may be extremely beneficial to keep users in the loop while other users are collaboratively working on the same collaborative media object. For example, a collaborative media management component is configured to detect presence data of users during interaction with a collaborative media object (or portions thereof). Presence indications may be generated and rendered in a GUI representation of the collaborative workspace that identify user activity (e.g., past actions, present activity and/or future intended activity). In distributed processing examples, data for rendering presence indications may be transmitted, to a client computing device, for rendering/display in a GUI (e.g., of a video discussion application/service).

In additional examples, activity notifications may be generated and presented for users which comprise a dynamic timeline providing temporal representation of user interactions with a collaborative media object. For instance, since collaborative editing may occur in real-time, one user may add a video clip and then realize that another user may have modified that video clip. As such, a collaborative media management component may be configured to generate dynamic media management timelines identifying user interactions (e.g., modification) with a collaborative media object as well as identification of a timing of when an interaction occurred. This can aid in providing users with a fuller picture of a collaborative session and even help identify a point that an edit should be rolled back or returned to a previous version of the collaborative media object.

To improve processing efficiency and user productivity relative to a collaborative workspace, the present disclosure further provides processing that applies trained artificial intelligence (AI) processing that is adapted to automatically generate representations of data insights for management of a collaborative media object within the collaborative workspace. Data insights may be generated pertaining to feature management of an exemplary application/service (e.g., video discussion application/service) including features for generating and managing a collaborative media object. Signal data associated with users of a collaborative session (e.g., within a collaborative workspace) may be detected and analyzed. While a plurality of different types of signal data are applicably described herein, detected signal data comprises application-specific signal data pertaining to user interactions of users within a collaborative workspace (e.g., of a video discussion application or service). Analysis of signal data leads to a determination as to a context of users within a collaborative workspace. Contextually relevant data insights may then be generated, where representations of data insights are provided for rendering through the collaborative workspace (e.g., a GUI representation thereof).

In generating contextually relevant data insights, trained AI processing is configured to execute a relevance evaluation (e.g., relevance determinations) that identifies relevant features of a video discussion application/service to determine user context of one or more users within the collaborative workspace. In some examples, a user context evaluation is generated collectively for user collaboration of two or more users within the collaborative workspace. This type of evaluation may more accurately capture a state of user collaboration within a collaborative workspace. With respect to a relevance evaluation, a trained AI model may be trained to generate relevance scoring (e.g., relevance ranking processing) that scores the relevance of individual data insights to a user context and/or a state of a collaborative media object. As a non-limiting example, relevance scoring for a data insight may be derived from analysis of collected signal data, an identified user context (individually and/or collaboratively), a state of a collaborative media object within the collaborative workspace or any combination thereof. For instance, user context within the collaborative workspace may be comparatively evaluated relative to states of collaborative media object (e.g., a current state of the collaborative media object as well as future state that is intended to be reached as a final product that ultimately contemplates the parameters set forth for content submission). As a collaborative workspace is expansive and a user context can vary from collaborative session to collaborative session, non-limiting examples of specific types of relevance evaluations (and associated scoring metrics) are subsequently disclosed herein. It is noted that a trained AI model may be configured to focus on a specific relevance scoring metric or may be trained to collectively consider multiple relevance scoring metrics to determine contextually relevant data insights for presentation.

In some examples, representations of data insights may be generated in real-time (or near real-time) depending on a user context relative to the collaborative workspace. In other examples, representations of data insights may be generated asynchronously from user access and then surfaced at the most relevant timing based on analysis of signal data received relative to the collaborative workspace. Representations of data insights may comprise not only content defining a contextually relevant data insight but also GUI elements linked to features of a video discussion application/service that are provided through a collaborative workspace. For instance, a representation of a data insight may comprise a selectable GUI element, that when selected, provides automatic execution of a feature of the video discussion application or service. As an example, multiple users may be collaboratively creating a collaborative media object, where selectable GUI elements may be presented to help users create (or add content to) the collaborative media object and/or manage editing of the same. In further examples, representations of data insights may enable automated import/export control of a collaborative media object across different applications/services. In even further examples, representations of data insights may further enable users to integrate a GUI version of the collaborative workspace within a GUI of another application/service. This is extremely beneficial to users who are multi-tasking or are simply accessing content primarily in another application/service.

Exemplary technical advantages provided by processing described in the present disclosure comprise but are not limited to: improved server-side processing for management of a collaborative workspace within different types of applications/services (e.g., a video discussion application/service); processing operations to more intelligently generate and manage exemplary collaborative media objects presented within a collaborative workspace or other application/service endpoint; generation of GUI representations of collaborative media objects including automatic rendering and presentation of GUI features (e.g., notifications/menus) that present collaborative media objects and management of user interactions therewith; generation of GUI representations of data insights for a collaborative workspace automatic rendering and presentation of GUI features (e.g., notifications/menus) that present representations of data insights and management of user interactions therewith; application of specific purpose computing to generate collaborative media objects and representation of data insights including, in some technical examples, application of trained AI processing to aid content generation and provision; improved processing efficiency (e.g., reduction in processing cycles, saving resources/bandwidth) for computing devices when generating and rendering a collaborative workspace including generation and presentation of exemplary collaborative media objects; improved processing efficiency (e.g., reduction in processing cycles, saving resources/bandwidth) for computing devices when generating data insights and representations thereof, adapting and improving a GUI of an application/service to integrate GUI elements for the provision and management of collaborative media objects and representations of data insights for a collaborative workspace; reduction in latency through efficient processing operations that improve collaboration via specific types of applications/services; extensibility to customize representations of collaborative workspaces for user-specific presentation; implementation of a novel collaborative media management component that is further configured to interface with a plurality of applications/services (e.g., applications/services of a distributed software platform) to extend functionality during processing described herein; and improving usability of applications/services for users via integration of processing described herein, among other technical advantages.

FIG. 1 illustrates an exemplary system diagram 100 of components interfacing to enable automatic generation and management of collaborative media objects and data insights within an exemplary collaborative workspace, with which aspects of the present disclosure may be practiced. System diagram 100 describes components that may be utilized to execute processing operations described in method 200 (FIG. 2A) and method 250 (FIG. 2B) as well as processing described in and associated with visual diagrams of FIGS. 3A-3L, FIGS. 4A-4J and the respective accompanying descriptions. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a collaborative media management component 106; a component for implementation trained AI processing 108; and knowledge repositories 110.

System diagram 100 comprises user computing device(s) 102 (e.g., client computing device). An example of a user computing device 102 is a computing system (or computing systems) as described in the description of FIG. 5. A user may interact with an exemplary application/service, provided by an application/service component 104, through the user computing device(s) 102. For instance, the user may connect to an application/service through any number of different device modalities. Examples of modalities and communication via the same are known to one skilled in the field of art. Non-limiting examples of different types of modalities comprise but are not limited to: collaborative sessions, chat, user feeds (e.g., live feeds including speech input and/or video feeds); messaging (including SMS and instant messaging); email; collaborative communication channels; collaborative electronic documents; VR/AR workspaces, remote calls (e.g., VOIP); remote meetings (e.g., electronic meetings), or a combination thereof, among other examples. In further examples, a user may carry on a multi-modal communication with an application/service via multiple user computing devices, where the present disclosure is intended to cover such technical instances. Collaborative sessions described herein may pertain to synchronous and/or asynchronous user collaboration through an exemplary collaborative workspace and/or other application/service endpoints.

In some examples, a user computing device 102 may connect to an application/service (e.g., a productivity application/service) that is specifically a video discussion application/service. For ease of understanding, a non-limiting example of a video discussion application/service is Flipgrid® where back-end processing (e.g., server-side processing) behind a video discussion application and front-end representations (e.g., an adapted GUI) bring online collaboration to the Flipgrid® camera application/service. A video discussion application/service is configured to enable users to conduct communication through the posting (or submission) of video clips. Video clips (or clips) may comprise but are not limited to: live video feeds of one or more users; camera feeds (e.g., that include previously recorded content), and the like as known to one skilled in the field of art. A live camera feed as described herein is intended to cover live streaming instances where video data, among other types of data (e.g., audio), is processed as a data stream (e.g., video stream). Processing for rendering and presenting live streams and types of data streams, including representations of multiple data streams for creation of live feeds, are known to one skilled in the field of art. For instance, a live video feed may comprise a plurality of data streams including but not limited to a video stream and an audio stream. Users of a video discussion application/service may post videos, video clips, feeds, etc., in response to a topic that is posted for discussion. For instance, a teacher may post a topic for students to respond to for an educational assignment. For ease of understanding, a non-limiting example is described in the present disclosure that pertains to a teacher posting a topic for a film study class ("Film Study 101"), where a group of students are posting videos in response to a posted assignment. In traditional implementations of video discussion applications/services, users (students) would be required to manually stitch together multiple video clips to create a response to an assignment. Above that, posted video clips have been traditionally treated as their own objects rather than a combined data object. This poses technical challenges when users are collaboratively editing content and manually attempting to combine content into a final product for assignment submission.

For a high-level implementation understanding, Flipgrid® is a web application/service (e.g., providing a website) that allows users (e.g.) teachers to create "groups" which may then be used to facilitate video discussions. Each group acts like a message board where a user (e.g., a teacher) can pose questions (e.g., called "topics") for replies, and other users (e.g., their students) can post video responses that appear in a tiled grid display. Exemplary groups can be shared with classes, small groups, or any collection of users interested in a similar topic or strand of questions. For extensibility, each group can hold an unlimited number of topics and each topic can hold an unlimited number of responses. Topics may be text-based or include a resource such as an image, video, Giphy, emoji, attachment, or the like. Users (e.g., students) can respond via the Flipgrid® application or website with any camera-enabled device or by uploading a previously recorded video. The length of a response video may vary and may further be preset by administrative users (e.g., teachers or other posters of content). Users (e.g., teachers) can also allow students to record replies to other user posts (e.g., classmates' responses). Within an exemplary video discussion application/service, numerous features are available to users to aid with video recording and editing. Non-limiting examples of such features comprise but are not limited to: camera options to manage content addition (e.g., recording of a video clip, uploading of a video clip, mirroring of video, audio control, video control, recording of a screen, image snapshots); camera effect options (e.g., adding of filters, frames, emojis, text, drawings, addition of boards such as whiteboards, resizing and cropping); and features for topic management and/or note addition (e.g., the addition of sticky notes that are displayed for users within a collaboration workspace). Further, in the present disclosure, a new effect feature is also introduced allowing users to create a dueting of a video clip. Dueting enables users to record a video clip (or concurrently play a pre-recorded video clip) simultaneously with the playback of another video clip. Essentially, users can build off another user's video by recording their own video(s) alongside another video as it plays, thereby providing a new layer of creativity and user interaction. Notably, an improved GUI is adapted to enable users to collaboratively create a dueting clip (e.g., multiple users can create a duet with a video engaged in playback), including GUI features that enable automatic initiation of a collaborative duet and control over which users are involved in the dueting clip.

An exemplary application/service component 104 is one or more components configured to provide access to data associated with an application or service and further provide renderings of GUIs of applications/services that are accessible by the user computing device 102. Applications/services, provided through the application/service component 104, may be any type of programmed software. An exemplary application/service is a productivity application/service that is configured for execution of tasks including collaborative communication between users (e.g., via a collaborative workspace) where multiple users are engaged synchronously and/or asynchronously in a collaborative session. As referenced in the foregoing description, a non-limiting example of an application/service (e.g., productivity application/service) is a video discussion application or service. For instance, one or more users may utilize the collaborative workspace to create a collaborative media object providing a plurality of video clips, collectively assembled, in response to a posted topic. However, it is to be understood that processing described in the present disclosure is extensible to work with any type of application/service and any content type. Non-limiting examples of productivity applications or services that are applicable in the present disclosure comprise but are not limited to: video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/service; and social networking applications/services, among other examples.

In at least one example, examples described herein extend to integrating presentation of a collaborative workspace of a first application/service (e.g., a video discussion application/service) within a second application/service that is different from the first application/service. For instance, a user may have a plurality of applications/services open but be focused on a specific application/service (e.g., user is part of an electronic meeting), where it is inefficient to continuously switch between applications/services while focused on a specific task. The present disclosure brings functionality and extensibility to user collaboration, where a GUI display/rendering of a collaborative workspace can be integrated into another application/service endpoint (e.g., GUI of an application/service). In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). Moreover, specific application/services (including those of a distributed software platform) may be configured to interface with other non-proprietary application/services (e.g., third-party applications/services) to extend functionality including data transformation and associated implementation.

Exemplary applications/services, provided by the application/service component 104, may interface with other components of system diagram 100 to enhance processing efficiency and functionality as described herein. For instance, the application/service component 104 is configured to interface with a user computing device 102 as well as the collaborative media management component 106, component for implementation trained AI processing 108 and knowledge repositories 110 (e.g., of a distributed software platform). In doing so, signal data may be collected and analyzed one or more of: the application/service component 104; the collaborative media management component 106, component for implementation trained AI processing 108 and, knowledge repositories 110, to enable contextual processing of data pertaining to a collaborative workspace (e.g., of a video discussion application/service). Signal data may be collectively analyzed to generation determinations described herein including those where the collaborative media management component 106 and/or component implementing trained AI processing 108 are generating and applying importance/relevance scoring/ranking to automatically generate determinations described herein. For instance, application of trained AI model (or models) may be trained to evaluate the importance of video clips to a posted topic (and/or relevance between added clips) to determine how to order or present an arrangement of video clips as a single media object. This type of importance/relevance processing may further be utilized to execute other types of processing determinations including but not limited to: editing capabilities of users (e.g., user settings for collaborative editing/viewing); generation of presence indications for interactions with a collaborative media object during one or more collaborative sessions; generation of a dynamic timeline providing temporal representation of user interactions with a collaborative media object; and generation and provision of data insight representations for a collaborative workspace (e.g., for interaction with a collaborative media object), among other examples. Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services (e.g., via a collaborative workspace and/or other application/service endpoints). In further examples, analysis of signal data may comprise identifying correlations and relationships between the different types of signal data, where telemetric analysis may be applied to generate determinations with respect to a contextual state of a collaborative workspace. For instance, analysis of device-specific signal data, user-specific signal data and application-specific data can be collectively analyzed to determine how to automatically arrange content portions of a collaborative media object as well as generate GUI notifications and data insights associated with a collaborative workspace. Analysis of such types of signal data in an aggregate manner may be useful in helping generate contextually relevant data objects, notifications, data insights and representations thereof, etc.

In some examples, signal data collected and analyzed may comprise data indicating user interaction history (or past user preferences), for example, while working in a collaborative workspace and/or specific application/service (e.g., video discussion application/service). This type of relevance analysis may be helpful to generate data insights that are most contextually relevant to a user (or group of users).

With respect to application-specific signal data, signal data indicating user interactions of users within a collaborative workspace (e.g., of a video discussion application or service) may be collected and analyzed to determine context of users within a collaborative workspace. In some examples, trained AI processing may be trained to focus on specific types of user interactions such as those pertaining to generation and management of a collaborative media object. This may lead to generation of data insights that further the creation of a collaborative media object as well as those that bring attention to features of a video discussion application/service that further collaborative media object creation. In some examples, a user context evaluation is generated collectively for user collaboration of two or more users within the collaborative workspace. This type of evaluation may more accurately capture a state of user collaboration within a collaborative workspace. However, in further examples, signal data pertaining to a user associated with a collaborative workspace may comprise signal data through computing devices and/or other applications/services, which can help provide a clearer picture of a context of a user relative to action within the collaborative workspace.

With respect to a relevance evaluation, a trained AI model may be trained to analyze signal data, determine user context within a collaborative workspace and generate relevance scoring (e.g., relevance ranking processing) that scores the relevance of individual data insights to a user context and/or a state of a collaborative media object within a collaborative workspace. As a non-limiting example, relevance scoring for a data insight may be derived from analysis of collected signal data, an identified user context (individually and/or collaboratively), a state of a collaborative media object within the collaborative workspace, or any combination thereof. For instance, user context within the collaborative workspace may be comparatively evaluated relative to states of collaborative media object (e.g., a current state of the collaborative media object as well as future state that is intended to be reached as a final product that ultimately contemplates the parameters set forth for content submission). It is noted that a trained AI model may be configured to focus on a specific relevance scoring metric or may be trained to collectively consider multiple relevance scoring metrics to determine contextually relevant data insights for presentation. In some examples, developers may set a weighting to specific types of signal data (e.g., those pertaining to interactions with a collaborative media object) to foster generation of contextually relevant suggestions for an objective task within an application/service.

The application/service component 104 is further configured to present, through interfacing with the collaborative media management component 106, an adapted GUI that provides user notifications, GUI menus, GUI elements, etc., to manage collaborative sessions presented through a collaborative workspace. For instance, a GUI of an application/service (e.g., video discussion application/service) may be configured to provide user interface elements that display an active state of a collaborative media object as it is edited throughout a collaborative session. This may include automatic generation and rendering of GUI features/elements that are presented without a user having to take manual action to aggregate video clips into a single data object. In other instances, an application command control (e.g., user interface ribbon and/or GUI menus) may be adapted to include selectable user interface features to manage states of representations of collaborative media objects. Non-limiting visual examples of an improved GUI, and GUI elements provided therein, are provided in FIGS. 3A-3L and FIGS. 4A-4J.

The collaborative media management component 106 is one or more components configured to execute and manage processing operations related to generation and provision of a collaborative workspace, collaborative media objects and representations of data insights for a collaborative workspace as described herein. In some examples, the collaborative media management component 106 may be a distributed computing device (e.g., distributed server device) that executes processing asynchronously from the user computing device 102 which is usable to access a GUI of an application/service. In other examples, the collaborative media management component 106 may be configured as a component that executes on the user computing device 102. In alternative examples, the collaborative media management component 106 is a system of components that execute across one or more server devices and one or more components executing on the user computing device 102, where a network connection is usable to connect the components in a system configuration. The collaborative media management component 106 may be configured to execute any processing operations described herein, including those described relative to method 200 (FIG. 2A), method 250 (FIG. 2B) and processing associated with visual diagrams of FIGS. 3A-3L, FIGS. 4A-4J and further described in the respective accompanying descriptions. It is further to be recognized that an order of execution of processing operations by the collaborative media management component 106 may vary without departing from the spirit of the present disclosure.

To improve processing efficiency and user productivity relative to a collaborative workspace, the collaborative media management component 106 is configured to interface with a component for implementation of trained AI processing 108 to apply trained AI processing that is adapted to automatically generate representations of data insights for management of a collaborative media object within the collaborative workspace. Application of trained AI modeling enables generation of contextually relevant data insights pertaining to feature management of an exemplary application/service (e.g., video discussion application/service) including features for generating and managing a collaborative media object. Signal data associated with users of a collaborative session (e.g., within a collaborative workspace) may be detected and analyzed. While a plurality of different types of signal data are applicably described herein, detected signal data comprises application-specific signal data pertaining to user interactions of users within a collaborative workspace (e.g., of a video discussion application or service). Analysis of signal data leads to a determination as to a context of users within a collaborative workspace (individually or collaboratively). Contextually relevant data insights may then be generated, where representations of data insights are provided for rendering through the collaborative workspace (e.g., a GUI representation thereof).

In generating contextually relevant data insights, trained AI processing, directed by the collaborative media management component 106, is configured to execute a relevance evaluation (e.g., relevance determinations) that identifies relevant features of a video discussion application/service to user context of one or more users within the collaborative workspace. In some examples, a user context evaluation is generated collectively for user collaboration of two or more users within the collaborative workspace. This type of evaluation may more accurately capture a state of user collaboration within a collaborative workspace. With respect to a relevance evaluation, a trained AI model may be trained to generate relevance scoring (e.g., relevance ranking processing) that scores the relevance of individual data insights to a user context and/or a state of a collaborative media object. As a non-limiting example, relevance scoring for a data insight may be derived from analysis of collected signal data, an identified user context (individually and/or collaboratively), a state of a collaborative media object within the collaborative workspace, or any combination thereof. For instance, user context within the collaborative workspace may be comparatively evaluated relative to states of collaborative media object (e.g., a current state of the collaborative media object as well as future state that is intended to be reached as a final product that ultimately contemplates the parameters set forth for content submission). As a collaborative workspace is expansive and a user context can vary from collaborative session to collaborative session, non-limiting examples of specific types of relevance evaluations (and associated scoring metrics) are subsequently disclosed herein. It is noted that a trained AI model may be configured to focus on a specific relevance scoring metric or may be trained to collectively consider multiple relevance scoring metrics to determine contextually relevant data insights for presentation.

In some examples, representations of data insights may be generated in real-time (or near real-time) depending on a user context relative to the collaborative workspace. In other examples, representations of data insights may be generated asynchronously from user access and then surfaced at the most relevant timing based on analysis of signal data received relative to the collaborative workspace. Representations of data insights may comprise not only content defining a contextually relevant data insight but also GUI elements linked to features of a video discussion application/service that are provided through a collaborative workspace. For instance, a representation of a data insight may comprise a selectable GUI element, that when selected, provides automatic execution of a feature of the video discussion application or service. As an example, multiple users may be collaboratively creating a collaborative media object, where selectable GUI elements may be presented to help users create (or add content to) the collaborative media object and/or manage editing of the same. In further examples, representations of data insights may enable automated import/export control of a collaborative media object across different applications/services. In even further examples, representations of data insights may further enable users to integrate a GUI version of the collaborative workspace within a GUI of another application/service. This is extremely beneficial to users who are multi-tasking or are simply accessing content primarily in another application/service.

Moreover, a component for implementation trained AI processing 108 may be applied to aid generation of processing determinations of the collaborative media management component 106. An exemplary component for implementation trained AI processing 108 may manage AI modeling including the creation, training, application, and updating of AI modeling. In cases where trained AI processing is applied, general application of trained AI processing including creation, training and update thereof is known to one skilled the field of art. Above what is traditionally known, trained AI processing may be adapted to execute specific determinations described herein with reference to the collaborative media management component 106 and processing operations executed thereby. For instance, AI model may be specifically trained and adapted for execution of processing operations comprising but not limited to: generation of collaborative media objects including arrangement of content thereof; editing capabilities of users (e.g., user settings for collaborative editing/viewing); generation of presence indications for interactions with a collaborative media object during one or more collaborative sessions; generation of a dynamic timeline providing temporal representation of user interactions with a collaborative media object; and generation and provision of data insight representations for a collaborative workspace (e.g., for interaction with a collaborative media object), among other examples. Exemplary AI processing may be applicable to aid any type of determinative or predictive processing by the collaborative media management component 106, via any of: supervised learning; unsupervised learning; semi-supervised learning; or reinforcement learning, among other examples. Non-limiting examples of supervised learning that may be applied comprise but not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations by the contextual insight generation component 106. Non-limiting examples of relevance scoring, and specific metrics used for relevance scoring, are subsequently described, including the description of method 200 (FIG. 2A) and method 250 (FIG. 2B). Scoring for relevance (or importance) ranking may be based on individual relevance scoring metrics described herein or an aggregation of said scoring metrics. In some alternative examples where multiple relevance scoring metrics are utilized, a weighting may be applied that prioritizes one relevance scoring metric over another depending on the signal data collected and the specific determination being generated for the collaborative media management component 106.

As referenced in the foregoing description, knowledge repositories 110 may be accessed to obtain data for generation, training and implementation of the component for implementation of trained AI processing 108 as well the operation of processing operations by that of the application/service component 104 and the collaborative media management component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the collaborative media management component 106. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/service component 104) for execution of specific applications/services including electronic document metadata, among other examples. In even further examples, telemetry data may be collected, aggregated, and correlated (e.g., by an interfacing application/service) to further provide the collaborative media management component 106 with on demand access to telemetry data which can aid determinations generated thereby. Furthermore, knowledge repositories 110 may be utilized to manage storage of generated data insights (and representations thereof). In some examples, data insights and/or representations thereof may be generated in real-time (or near real-time) during access to a collaborative workspace by users. In other examples, data insights and/or representations thereof may be generated asynchronously from user access to a collaborative workspace. For instance, after users temporarily exit a collaborative session, processing to evaluate user interactions within a collaborative workspace may occur, where data insights may be generated for later representation (e.g., surfacing to users upon subsequent access to the collaborative workspace). In any example, data insights (and representations thereof) may be stored for recall via the application/service component 104. For instance, a repository of data insights and/or representations of data insights may be stored on a distributed data storage for on-demand access.

FIG. 2A illustrates exemplary method 200 related to automatic generation and management of exemplary collaborative media objects, with which aspects of the present disclosure may be practiced. As an example, method 200 may be executed across an exemplary computing system 501 (or computing systems) as described in the description of FIG. 5. Exemplary components, described in method 200, may be hardware and/or software components, which are programmed to execute processing operations described herein. Non-limiting examples of components for operations of processing operations in method 200 are described in system diagram 100. Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 200 may be executed by a component such as a collaborative media management component 106 (of FIG. 1) and/or a component for implementation of trained AI processing 108. In distributed examples, processing operations described in method 200 may be implemented by one or more components connected over a distributed network. For example, components may be executed on one or more network-enabled computing devices, connected over a distributed network, that enable access to user communications.

Method 200 begins at processing operation 202, where data is provided for rendering of a GUI representation of a collaborative workspace of a video discussion application/ service. While examples of method 200 may reference an application/service as a video discussion application or service, it is to be understood that processing operations described in method 200 are applicable to work with any type of application or service described herein including those specifically described with respect to description of the application/service component 104. As referenced in the foregoing, a video discussion application/service is configured to enable users to conduct communication through the posting (or submission) of video clips. Video clips (or clips) may comprise but are not limited to: live video feeds; video feeds (e.g., that include previously recorded content), and the like as known to one skilled in the field of art. A live video feed as described herein is intended to cover live streaming instances where video data, among other types of data (e.g., audio), is processed as a data stream (e.g., video stream). Users of a video discussion application/service may post videos, video clips, feeds, etc., in response to a topic that is posted for discussion. For instance, a teacher may post a topic for students to respond to for an educational assignment. For ease of understanding, a non-limiting example is described in the present disclosure that pertains to a teacher posting a topic for a film study class ("Film Study 101"), where a group of students are posting videos in response to a posted assignment. For ease of understanding, this high-level example may be referenced in other portions of the present disclosure. In traditional implementations of video discussion applications/services, users (students) would be required to manually stitch together multiple video clips to create a response to an assignment. Above that, posted video clips have been traditionally treated as their own objects rather than a combined data object. This poses technical challenges when users are collaboratively editing content and manually attempting to combine content into a final product for assignment submission. For ease of understanding, a non-limiting example of a video discussion application/service is Flipgrid® where back-end processing (e.g., server-side processing) behind a video discussion application and front-end representations (e.g., an adapted GUI) bring online collaboration to application/service components (e.g., Flipgrid® camera application/service).

A collaborative workspace provides features for managing user collaboration to enable task execution within an application/service. An exemplary collaborative workspace fosters synchronous and/or asynchronous user collaboration via a group space that is accessible to multiple users. In some examples, collaboration, through the collaborative workspace, occurs where two or more users who concurrently access the collaborative workspace. In alternative examples, users may utilize the collaborative workspace in an asynchronous manner to conduct user collaboration. The collaborative workspace further provides a topic for the at least two users to respond to by providing content such as video feeds. For instance, a collaborative workspace of a video discussion application/service is configured to provide GUI features that enable users to conduct a video discussion of one or more topics and further provide users with the ability to synchronously and/or asynchronously manage content for posting/submission. Within an exemplary video discussion application/service, numerous features are available to users to aid with video recording and editing. Non-limiting examples of such features comprise but are not limited to: camera options to manage content addition (e.g., recording of a video clip, uploading of a video clip, mirroring of video, audio control, video control, recording of a screen, image snapshots); camera effect options (e.g., adding of filters, frames, emojis, text, drawings, addition of boards such as whiteboards, resizing and cropping); and features for topic management and/or note addition (e.g., the addition of sticky notes that are displayed for users within a collaboration workspace). Further, in the present disclosure, a new effect feature is also introduced allowing users to create a dueting of a video clip. Dueting enables users to record a video clip (or concurrently play a pre-recorded video clip) simultaneously with the playback of another video clip. Essentially, users can build off another user's video by recording their own video(s) alongside another video as it plays, thereby providing a new layer of creativity and user interaction. Notably, an improved GUI is adapted to enable users to collaboratively create a dueting clip (e.g., multiple users can create a duet with a video engaged in playback), including GUI features that enable automatic initiation of a collaborative duet and control over which users are involved in the dueting clip.

Through the present disclosure, an exemplary collaborative workspace enables users to join the same video creation session (e.g., collaborative session) while fostering an environment that allows multiple users to join and record video clips in response to a posted topic. In some examples, video clips can be recorded at the same time where the collaborative workspace is configured to intelligently (and automatically) create an arrangement of those video clips as a single media object. For instance, a teacher may post an assignment for students via a web application/service (e.g., Flipgrid® camera), where a group of students can collaboratively create and/or upload video clips to create a response to the assignment for submission and review by the teacher. Video clips added/uploaded by users are automatically combined to create a draft for assignment submission, which can further be collaboratively edited by a group of users in association with a collaborative session of the collaborative workspace. Collaborative sessions described herein may pertain to synchronous and/or asynchronous user collaboration through an exemplary collaborative workspace and/or other application/service endpoints. Non-limiting visual examples of a collaborative workspace are provided in FIGS. 3A-3L.

Processing operation 202 comprises transmission of data that enables rendering of GUI representations of a collaborative workspace for each user of a collaborative session. While GUI representations may be rendered for individual users of a collaborative session, the collaborative workspace provides, across all GUI representations, real-time (or near real-time) updates of a state of a user communication including generation of a collaborative media object and management thereof. For instance, if a first user adds a video clip to a collaborative media object, a GUI menu providing a representation of the collaborative media object would be updated across each of the GUI representations in real-time (or near real-time) within the collaborative workspace. Furthermore, an exemplary collaborative workspace is adapted to provide GUI elements/features that foster collaboration between users for task completion (e.g., creating and submitting a collaborative media object). GUI representations of a collaborative workspace may further comprise updates as to a state of user access/interaction with a collaborative workspace (e.g., individual GUI representations for users thereof). For example, this may comprise presentation of user presence indications; dynamic timelines of user activity including a state of a collaborative media object and rendering of data insights to assist with user interaction with a collaborative workspace and/or collaborative media object.

Flow of method 200 may proceed to processing operation 204, where signal data may be received indicating user interactions with representations of a collaborative session within a collaboration workspace. As indicated in the foregoing description, including the description of system diagram 100 (FIG. 1), signal data may be collected and analyzed to aid processing described herein. Non-limiting examples of signal data, which may be collected and analyzed, have been described in the foregoing description. While processing operation 204 refers to the receipt of signal data pertaining to user interactions with a collaborative workspace, it is to be recognized that signal data indicating user interactions within the collaborative workspace may be utilized to detect and retrieve other types of signal data previously described. For example, signal data through a video discussion application/service may indicate that a plurality of users are collaborating in a collaborative session provided through a video discussion application/service. This may be a trigger to obtain signal data pertaining to user accounts associated with a collaborative session of an application/service (e.g., video discussion application/service); device-specific access data (e.g., what computing devices are being utilized to access the collaborative session currently or in the past); application-specific or service-specific usage data from other applications/services (e.g., of a distributed software platform), telemetry data or a combination thereof. Any types of signal data, alone or in combination, may be utilized to aid importance/relevance ranking processing to generate determinations including but not limited to automatic determinations with respect to: generation of collaborative media objects including arrangement of content thereof, editing capabilities of users (e.g., user settings for collaborative editing/viewing); generation of presence indications for interactions with a collaborative media object during one or more collaborative sessions; generation of a dynamic timeline providing temporal representation of user interactions with a collaborative media object; and generation and provision of data insight representations for a collaborative workspace (e.g., for interaction with a collaborative media object), among other examples. Importance ranking processing or relevance ranking processing may be executed by one or more trained AI models (e.g., via a component for implementation of trained AI processing 108), where results of ranking processing may be automatically applied to automatically generate determinations usable to update a collaborative workspace (including creation of a collaborative media object).

Processing operation 204 comprises detecting signal data pertaining to users that are actively accessing a collaborative workspace as well as users that are registered for/associated with a collaborative workspace who may subsequently access the collaborative workspace at a later point in time. For instance, user-specific signal data pertaining to a user who is not synchronously accessing a collaborative workspace, but associated therewith, may be useful to provide updates to that user (e.g., through a video discussion application/service upon subsequent access or through a different application/service endpoint) when another user modifies an exemplary collaborative media object. Signal data indicating a history of user access to collaborative workspace may further be useful to help generate collaborative media objects and prioritize or arrange content portions thereof.

As indicated in the foregoing description, signal data indicating user interactions with representations of a collaborative session within a collaboration workspace may comprise user actions to create or add video clips to a collaborative session of the collaborative workspace. For instance, a component of a video discussion application/service may receive submissions of video feeds in response to a posted topic. Video feeds can be recorded live through the collaborative workspace (e.g., during a collaborative session) and/or uploaded by users within the collaborative session. The collaborative workspace is configured to detect and analyze added content and automatically generate a single media object (e.g., collaborative media object) from one or more added video feeds. Portions of the single media object can be edited (e.g., within the collaborative workspace) but the entirety of the collaborative media object is a treated a single media object.

In one example, processing operation 204 comprise detecting recording of a first live video feed from a first device (e.g., user computing device) associated with a first user of a collaborative session presented through the collaborative workspace. The first live video feed (or live camera feed) may be recorded within the collaborative workspace in response to a posted topic that is associated with the collaborative workspace. For instance, the first live video feed may be recorded through a camera feature provided through the video discussion application/service, where a GUI representation of the camera feature may be presented to a user through a GUI (e.g., representation of the collaborative workspace) of the video discussion application/service. In further examples, one or more users (e.g., the same user or another user associated with a collaborative session) may add additional video feeds (e.g., live video feeds or any type of video feed included a pre-recorded video feed) to the collaborative workspace. For example, similar to the recording of the first live video feed, a second live video feed from a second device (e.g., user computing device) associated with a second user of a collaborative session may be recorded within the collaborative workspace. Similarly, the second live video feed may be recorded within the collaborative workspace in response to the posted topic associated with the collaborative workspace. In further examples, additional video feeds (e.g., live video feed or clip of previously recorded video) may be added to the collaborative workspace by one or more users of a collaborative session. For example, a third video feed may be recorded by or added from a third device associated with a third user of the collaborative session. Alternatively, one of the first or second users may add the third video feed to the collaborative workspace. Similarly, the third video feed may be posted in response to the topic associated with the collaborative workspace. User interactions within a collaborative workspace may further add additional content types in response to a topic. In some examples, those additional content types may further be added as content portions of a collaborative media object. Essentially, the collaborative media object comprises multiple video feeds in aggregate but may further combine the same with other content portions of various content types. Non-limiting examples of other content types for inclusion within a collaborative media object comprise but are not limited to: images, memes and/or screenshots; message content; emojis or icons; electronic documents (e.g., word processing documents, notes documents, spreadsheets, slide-based presentations); handwritten input; audio clips; data objects; advertisements; and executable software content, among other examples.

In further examples, signal data indicating user interactions with representations of a collaborative session within a collaboration workspace may comprise user actions to edit a created collaborative media object. Modification-type interactions of a collaborative media object may occur after a collaborative media object is generated and rendered within a GUI representation of the collaborative workspace. Non-limiting examples of such actions comprise but are not limited to: editing an ordering/arrangement of content portions (e.g., video clips) in a representation of a collaborative media object; adding labeling tags, layers of content, etc., to portions of collaborative media object; editing content portions of the collaborative media object including trimming of frames of one or more video clips that are included as a content portion within a collaborative media object; retroactively applying camera options to manage content of a video clip; applying camera effect options; applying features for topic management and/or note addition including adding or removing of topics/sub-topics, tags, etc., to/from a collaborative media object; creating a dueting clip using one or more video clips and/or other content portions of a collaborative media object; deleting of content portions of a rendered collaborative media object; and applying of automated user actions presented in data insights associated with the collaborative workspace, among other examples.

Flow of method 200 may then proceed to processing operation 206. Regardless of the number of video feeds and/or video clips that are added to the collaborative workspace, a collaborative media management component (106 of FIG. 1), associated with the collaborative workspace, may automatically generate (processing operation 206) a collaborative media object. Processing for automatic generation (processing operation 206) of the collaborative media object comprises automatically combining added video feeds/videoclips (and in some cases content portions of other content types) into a single media object for presentation in the collaborative workspace of the video discussion application or service. Execution of processing operation 206 may occur through a programmed software module, a trained AI model or a combination thereof. An exemplary collaborative media management component (or the like) may be configured to detect and analyze added content to a collaborative workspace and automatically execute processing operations to generate a single media object (e.g., collaborative media object) from one or more added video feeds (or other content portions). Portions of the single media object can be edited (e.g., within the collaborative workspace) but the entirety of the collaborative media object is a treated a single media object. This is beneficial for not only review of a submission of the collaborative media object (e.g., by a teacher) but also for users who want to export or transfer the collaborative media object to work in other applications/services.

In one example, processing operation 206 comprises aggregating a clip of the first live video feed and a clip of the second live video feed in a sequential order (and the third video feed in such examples) to create the single media object. When additional video clips or content portions are added, the collaborative media object can be updated compiling aggregated content into a single media object. Aggregation of video clips (and other content portions) in a sequential order may evaluate timestamp data associated with a video clip to determine an order or arrangement within the collaborative media object. In some instances, developers may set a specific attribute of timestamp data as the delimiting factor in determining how to order video clips. For instance, a timestamp indicating when a video clip was added to the collaborative workspace (via recording or upload) may be the primary factor for ordering video clips and/or content portions. In another example, a timestamp indicating when a video clip (or content portion) was recorded (or created) may be the primary factor for determining how to arrange content of the collaborative media object.

In further examples, trained AI processing may be applied to automatically generate (processing operation 206) a collaborative media object. Trained AI processing that executes processing operations to intelligently determine how to arrange the content (e.g., clips of video feeds) for aggregation as a collaborative media object. For example, relevance ranking processing may generate relevance scores associated with each specific content portion (e.g., video clips) for inclusion in a collaborative media object. Generated relevance scoring may be comparatively used to prioritize video clips for an arrangement as a single media object. For instance, the higher the relevance scoring the higher the priority in the order of arrangement. In one example, a relevance score may be used to score a relevance of a content portion to the posted topic that is associated with a representation of the collaborative workspace (e.g., the topic that users are generating a collaborative media object to respond to). For instance, content and metadata of a video clip may be analyzed to determine how relevant a video clip is to the topic. In some examples, this may further factor in guidelines or parameters outlined in association with a topic which may be analyzed and factored into relevance scoring. For example, a teacher may post requirements for a topical assignment (e.g., associated with a collaborative workspace), where relevance scoring scores how relevant a student video clip is to the requirements in addition to the content of the posting. In yet another example, a group of users may have previously submitted assignments in the form of collaborative media objects, where past history and user preferences from previous assignments may help determine how to arrange content for presentation as a collaborative media object. For instance, a trained AI model may focus on specific types of signal data that are most contextually relevant to the purpose of creation of the collaborative media object (e.g., as an education assignment, work presentation, etc.). In alternative examples, relevance scoring may be determined relative to slotted positions or sub-topics associated with a topic, where relevance scores may be generated for specific slots/positions (e.g., opening video clip, closing/summary video clip) or sub-topics and then ordered according to the relevance to the specific slots/positions (or sub-topics). In this way, relevance scoring is still evaluating content portions relative to a topic, but further optimizes the manner by which content is ordered, so that users are less likely to have to then execute manual actions to modify an arrangement.

Data that may be analyzed to generate relevance scoring may comprise but is not limited to: the various types of signal data previously described; content and metadata associated with a content portion (e.g., video clip); user history regarding preferences (e.g., individual users and/or a group or team of users) for creating collaborative media objects; user account data including priority settings of users within a group or team (e.g., team lead, project manager vs associate); guidelines and parameters set for a topic and/or assignment (e.g., by a teacher); or a combination thereof. Data and metadata associated with a collaborative workspace may be parsed and analyzed to identify a topic, guidelines requirements, associated users, etc., any of which may be pertinent to generating relevance scoring depending on how an AI model is trained by developers. Content portions (e.g., video clips) as well as other content of a collaborative workspace can be analyzed through means known to one skilled in the art (e.g., optical character recognition; image recognition, natural language processing, etc.). That is, processing operations for obtaining data that is utilized to generate relevance scoring (and further train an AI model) is known to one skilled in the field of art. Above what is traditionally known is the application of the trained AI processing for generating unique relevance scoring and further applying exemplary relevance scoring to generate unique determinations including the creation of a collaborative media object. A trained AI model may then use the results of the relevance scoring to arrangement content of a collaborative media object as a single media object.

Once a collaborative media object is generated (processing operation 206), flow of method 200 may proceed to processing operation 208. At processing operation 208, data for rendering of the collaborative media object may be transmitted for display in a GUI representation of the collaborative workspace. For instance, this may occur in distributed examples where a component is executing processing and transmits, over a network connection, data for rendering a representation of a GUI on a client computing device (e.g., user computing device). As an example, transmission of data for rendering a collaborative media object, and representations thereof, may comprise transmitting, to a client device, data for rendering the collaborative media object in a GUI presenting the collaborative workspace (e.g., within the video discussion application/service). In alternative examples, processing to generate a collaborative media object, and representations thereof, may occur directly on a client device that is rendering a user representation of the collaborative workspace (e.g., representation of collaborative workspace for first user of a group of users).

Flow of method 200 may then proceed to processing operation 210. At processing operation 210, a representation of a collaborative media object is rendered in a representation of the collaborative workspace. In one example, a representation of a collaborative media object is rendered at a client computing device that is presenting a representation of a collaborative session (via a GUI representation of a collaborative workspace). In other examples, rendering of a collaborative media object may be generated via a first computing device and transmitted (e.g., over a network connection) to one or more additional computing devices for duplicating a rendering. Processing operation 210 may comprise rendering portions of the collaborative media object in a GUI associated with the collaborative workspace of the video discussion application or service, where the entirety of the collaborative media object and/or portion thereof are independently editable in a collaborative manner by the two or more users. In addition to rendering of portions of the collaborative media object, processing operation 210 may comprise automatically generating, in the collaborative workspace of the video discussion application or service, a separate GUI window that is specific to the collaborative media object configured to enable editing management of the portions of the collaborative media object by the two or more users. FIGS. 3A-3L of the present disclosure provide non-limiting examples of rendering of a collaborative media object within a representation of a collaborative workspace as well as GUI features/menus for management of a collaborative media object.

Flow of method 200 may then proceed to processing operation 212, where presence data (e.g., presence indications of users collaboratively managing a collaborative media object) is generated for indicating user collaboration within the collaborative workspace. As previously described, users may be collaboratively working within the same collaborative workspace through individual GUI representations thereof which capture editing from the perspective of an individual user. When a user is working on a specific task (e.g., editing a portion of a collaborative media object), they may temporarily lose track of what other collaborators may be doing in other individual representations of the collaborative workspace. As such, a collaborative media management component may be configured to detect presence data for collaborative users and present presence indications (displayable in individual GUI representation of the collaborative workspace) specifically pertaining to user actions relative to a collaborative media object. Presence indications are GUI representations that identify specific users within a collaborative workspace and specific user action that is (or has been performed) relative to management of content portions of a collaborative media object. For instance, a first user may trim frames off a specific video clip, causing an updated version of the video clip (and therefore the collaborative media object) to be generated. Other collaborative users may automatically see an updated version of the collaborative media object and wonder why a different version is displayed. Additionally, multiple users may be editing similar content portions at the same time. It is useful to know what portions of the collaborative media object each user is editing in real-time (or near real-time) so that user productivity and efficiency can be improved when editing a collaborative media object.

Processing operation 212 comprises detecting presence data of the at least two users during interaction with portions of the collaborative media object displayed within the collaborative workspace of a video discussion application or service. This may occur through analysis of signal data detected for user actions within a collaborative workspace. Presence indications for respective users may then be generated for display in a rendering of the collaborative workspace (e.g., individual GUI representations associated with specific users). Processing operation 212 may further comprise transmitting data for rendering, within the collaborative workspace, presence indications for collaborative users within the collaborative workspace. In additional examples, activity notifications may be generated and presented for users which comprise a dynamic timeline providing temporal representation of user interactions with a collaborative media object. For instance, since collaborative editing may occur in real-time, one user may add a video clip and then realize that another user may have modified that video clip. As such, a collaborative media management component may be configured to generate dynamic media management timelines identifying user interactions (e.g., modification) with a collaborative media object as well as identification of a timing of when an interaction occurred. This can aid in providing users with a fuller picture of a collaborative session and even help identify a point that an edit should be rolled back or returned to a previous version of the collaborative media object.

Flow of method 200 may proceed to processing operation 214, where representations of presence data is rendered within a representation of the collaborative workspace. Non-limiting examples of renderings of representations of presence data (e.g., presence indications and/or dynamic timelines of user activity relative to a collaborative media object) are illustrated in FIGS. 3J and 3K.

Flow of method 200 then proceeds to decision operation 216. At decision operation 216, it is determined whether user action is received, through the collaborative workspace, that results in an update to the collaborative media object. Non-limiting examples of updates to a collaborative media object have been described in the foregoing description. In technical instances where an update is received to the collaborative media object, flow of decision operation 216 branches "YES" and processing of method 200 returns to processing operation 204. At processing operation 204, signal data is detected and analyzed regarding user actions within the collaborative workspace, for example, with respect to management of a collaborative media object. Processing of method 200 may re-execute processing operations (e.g., processing operations 204-216) to determine how to update a representation of a collaborative media object.

As a non-limiting example, an edit to a video clip may be received through an interaction with the collaborative workspace of the video discussion application or service. The edit may be made by a collaborative user (e.g., second user) that is different from the user (e.g., first user) that posted the video clip. As a result of that collaborative edit, a representation of the collaborative media object may be updated. Data for rendering an updated representation of the collaborative media object may be transmitted for display in the collaborative workspace after the collaborative edit.

In another non-limiting example, users may edit one or more portions of a collaborative media object via a new effect feature that allows users to create a dueting of a video clip. Dueting enables users to record a video clip (or concurrently play a pre-recorded video clip) simultaneously with the playback of another video clip. Essentially, users can build off another user's video by recording their own video(s) alongside another video as it plays, thereby providing a new layer of creativity and user interaction for generation of a collaborative media object. Notably, an improved GUI is adapted to enable users to collaboratively create a dueting clip (e.g., multiple users can create a duet with a video engaged in playback), including GUI features that enable automatic initiation of a collaborative duet and control over which users are involved in the dueting clip. As an example, a dueting request may be received through a GUI of a representation of a collaborative workspace, where the dueting request is a request to add one or more video feeds (or other content portions) to the collaborative media object for simultaneous playback with a video clip. Collaboration through the collaborative workspace enables multiple live video feeds to be recorded concurrent with the playback of another video clip, which enhances a collaborative media object.

Continuing the above discussion, GUI features may be presented through an adapted GUI representation that enables users to automatically initiate collaborative dueting via user interface feature selection. A dueting request can be automatically created through a GUI that may enable users to select, through the GUI, multiple users for automatic initiation of a dueting of one or more video clips (e.g., that are part of the collaborative media object). Processing of the dueting request automatically initiates recording of a dueting clip. Upon completion of the dueting clip, a representation of the collaborative media object may be automatically updated to include the dueting clip (e.g., replace a prior version of a video clip with a dueting clip that includes the original video clip). For instance, a dueting request may be received from a device associated with a first user, where the dueting request comprises a request to record a live camera feed of the first user and a live camera feed of one or more additional users (e.g., a second user) concurrent with a playback of a video clip/video feed already added to a collaborative media object. A dueting clip may then automatically be initiated that replaces a clip of a prior recorded video feed with the dueting clip to create an updated representation of the collaborative media object (e.g., single media object). Data for rendering the updated representation of the collaborative media object may then be transmitted for rendering within a GUI representation of the collaborative workspace.

In technical instances where an update is not received to the collaborative media object, flow of decision operation 216 branches "NO" and processing of method 200 proceeds to processing operation 218. At processing operation 218, a version of the collaborative media object is stored for recall. In one example, processing operation 218 may comprise user action that posts/submits the collaborative media object for review by one or more other users (e.g., a teacher). This may automatically trigger storage of a version of a collaborative media object for later recall. In another example, a user may execute explicit action to save a collaborative media object or transfer the same to a data storage (e.g., local or distributed). In any such instances, a version of the collaborative media object may be stored, for example, on a distributed data storage associated with the video discussion application/service or a distributed data storage for a user account (or group of users, team) associated with a file hosting service. In further examples, processing operation 218 may comprise processing operations that automatically save and store a version of a collaborative media object that is current to the collaborative workspace. In one example, a user action to export a version of the collaborative media object to another application/service endpoint may be a trigger to automatically save and store a version of the collaborative media object for recall. In other instances, any modification (or a threshold level of modification) may be a trigger to automatically store a version of a collaborative media object. During user collaboration, multiple versions of a collaborative media object may be generated (e.g., continuous update to the collaborative media object) before a final version is ready for posting or submission. Tracking versions of the collaborative media object and storing the same may be useful as users continue to collaboratively edit a collaborative media object and may want to roll back (or undo) an edit to the collaborative media object. For instance, multiple edited versions of a collaborative media object may be generated and accessible through GUI of the collaborative workspace. In some examples, a dynamic timeline providing temporal representation of modifications to the collaborative media object may be displayed for a group of users (e.g., through the collaborative workspace). This may provide users with a clearer picture of the state of the collaborative media object, when (and who) edited the collaborative media object and further provide context information for reviewers (e.g., teachers) of the collaborative media object.

Flow of method 200 may then proceed to processing operation 220. At processing operation 220, the collaborative media object may be recalled for subsequent usage (e.g., presentation or transmission) by a user of an application/service. For instance, one or more users may exit the collaborative workspace and subsequently return for update to the collaborative media object. A rendering of the collaborative media object may be presented in a GUI representation of the collaborative workspace. In some examples, the collaborative media object may be recalled for editing and/or transport directly from a data storage (e.g., distributed data storage) rather than through a GUI representation of a collaborative workspace. In alternative examples, recall (processing operation 220) of a collaborative media object may occur directly through a different application/service endpoint. For instance, an exemplary collaborative workspace of a video discussion application/service may be integrated for presentation within another application/service (GUI representation thereof). The present disclosure enables extensibility where different application/services may be adapted to include GUI features that provide automatic integration of a collaborative workspace (e.g., of a video discussion application/service) within a GUI of a respective application/service. For example, a group of users may be conducting an electronic meeting through a different application/service at the same time they are editing a collaborative media object via a video discussion application/service. Integrating a rendering of a GUI representation of the collaborative workspace improves processing efficiency and usability of application/services, where users would not have to constantly switch between GUI windows to manage a collaborative media object while conducting an electronic meeting.

As indicated in the foregoing description, a collaborative workspace may be accessed at a later point in time by users. In further examples, a collaborative workspace may be associated with more than one topic, where GUI features for topical control may enable users to view different topics and create different collaborative media objects for different topics. As such, the flow of method 200 indicates that processing may return back to processing operation 202, where a rendering of the collaborative workspace (e.g., GUI representation thereof) can be subsequently provided for user access.

FIG. 2B illustrates exemplary method 250 related to automatic generation and management of data insights to aid user collaboration within a collaborative workspace, with which aspects of the present disclosure may be practiced. As an example, method 250 may be executed across an exemplary computing system 501 (or computing systems) as described in the description of FIG. 5. Exemplary components, described in method 250, may be hardware and/or software components, which are programmed to execute processing operations described herein. Non-limiting examples of components for operations of processing operations in method 250 are described in system diagram 100. Processing operations performed in method 250 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 250 may be executed by a component such as a collaborative media management component 106 (of FIG. 1) and/or a component for implementation of trained AI processing 108. In distributed examples, processing operations described in method 250 may be implemented by one or more components connected over a distributed network. For example, components may be executed on one or more network-enabled computing devices, connected over a distributed network, that enable access to user communications.

Method 250 begins at processing operation 252, where data is provided for rendering of a GUI representation of a collaborative workspace of a video discussion application/service. Processing for rendering a GUI representation of a collaborative workspace, including distributed processing examples, have been described in the foregoing description including the description of method 200 (FIG. 2A) and are similarly applicable. In one example, processing operation 252 renders a collaborative workspace in a GUI representation of a video discussion application or service. An exemplary collaborative workspace has been previously defined. In one example, the collaborative workspace is concurrently accessed by at least two users and further provides a topic for the at least two users to respond to by providing content including video feeds. Alternative examples of processing operation 252 comprise transmitting data for rendering of the collaborative workspace to a client computing device that will subsequently render a GUI representation of a video discussion application or service.

Flow of method 250 may proceed to processing operation 254, where signal data is detected (collected) for analysis. Signal data may be collected through programmed interfacing with computing devices, applications/services, etc., as known to one skilled in the field of art. For instance, an API or the like may be utilized to collect application-specific signal data from a video discussion application/service and/or devices, other applications/services and associated user accounts. Exemplary signal data comprises application-specific signal data associated with a collaborative workspace (e.g., collaborative session provided through access to the collaborative workspace of a video discussion application/service). For example, during a collaborative session, signal data collected may be signal data associated with at least two users of a collaborative session. This may comprise signal data directly collected through a specific application/service that provides the collaborative workspace as well as other types of signal data collected in association with user accounts that are part of a collaborative session provided via the collaborative workspace. Non-limiting examples of signal data have been described in the foregoing description. For instance, signal data that may be collected and analyzed comprises but is not limited to: device-specific signal data collected from operation of one or more user computing devices; user-specific signal data collected from specific tenants/user-accounts with respect to access to any of: devices, login to a distributed software platform, applications/services, etc.; and application-specific data collected from usage of applications/services (e.g., via a collaborative workspace and/or other application/service endpoints). With respect to application-specific signal data, signal data indicating user interactions of users within a collaborative workspace (e.g., of a video discussion application or service) may be collected and analyzed to determine context of users within a collaborative workspace. In some examples, trained AI processing may be trained to focus on specific types of user interactions such as those pertaining to generation and management of a collaborative media object. This may lead to generation of data insights that further the creation of a collaborative media object as well as those that bring attention to features of a video discussion application/service that further collaborative media object creation. In some examples, a user context evaluation is generated collectively for user collaboration of two or more users within the collaborative workspace. This type of evaluation may more accurately capture a state of user collaboration within a collaborative workspace. However, in further examples, signal data pertaining to a user associated with a collaborative workspace may comprise signal data through computing devices and/or other applications/services, which can help provide a clearer picture of a context of a user relative to action within the collaborative workspace.

Method 250 may then proceed to processing operation 256. At processing operation 256, one or more trained AI models may be applied. An exemplary trained AI model is specifically adapted to generate representations of data insights for management of a collaborative media object within the collaborative workspace (e.g., of a video discussion application/service). Implementation of trained AI processing (e.g., a trained AI model) has been previously described in the present disclosure. Method 250 will now focus on specific processing operations executed by trained AI processing, which may be implemented by one or more components (e.g., component configured for implementation of trained AI processing 108 of FIG. 1) through interfacing with a collaborative media management component 106 (of FIG. 1). At least processing operations 258 to 264 describe specific processing operations executed by a trained AI model (or models). However, it is to be recognized that trained AI processing can be applied to improve processing (e.g., automatic and intelligent learning processing) for any processing operation described in the present disclosure. For example, a trained AI model may be configured to detect (collect) signal data for analysis and data insight generation.

At processing operation 258, the trained AI model is applied to analyze signal data detected/collected which is associated with users of a collaborative session (e.g., within a collaborative workspace). Analysis (processing operation 258) of signal data may comprise application-specific signal data pertaining to video discussion application/service. This may aid a determination of a context of users (user context) within a collaborative workspace. Analysis (processing operation 258) of signal data may comprise parsing signal data to identify specific types of signal data (e.g., user-specific signal data, device-specific signal data, application-specific signal data) including targeted types of application-specific signal data pertaining to a collaborative session accessed via a collaborative workspace of a video discussion application/service. One or more different types of signal data may be analyzed by a trained AI model. Targeted types of application-specific signal data comprise but are not limited to: user accounts accessing a video discussion application/service (including user accounts associated with a distributed software platform); user presence (current and/or past access as well as user accounts assigned to a specific collaborative session) within a collaborative workspace; topics associated with a collaborative session of a collaborative workspace; parameters or guidelines for content submission for a collaborative session; data pertaining to creating of a collaborative media object including content portions added to a collaborative workspace and/or relevant to a topic of a collaborative workspace; data pertaining to user activity within a collaborative workspace including management of a collaborative media object; user messages or notes (e.g., sticky notes added) within a collaborative workspace; signal data pertaining to the management of video feeds (including selection of camera features and effects); and data pertaining to integration of a collaborative workspace (e.g., of a video discussion application/service) within other applications/services, among other examples.

Once signal data, including application-specific signal data, is detected, flow of method 250 may proceed to processing operation 260. At processing operation 260, a user context may be determined for one or more users relative to a collaborative workspace. An exemplary user context is determined (processing operation 260) based on analysis of detected signal data including the collected application-specific signal data. A user context is intended to be a determination of an activity state of users of a collaborative workspace whether a user is accessing the collaborative workspace or not. An exemplary user context can be configured to be a representation of an individual user state, a collaborative user state (e.g., identifying an activity state of multiple users relative to one another); or a combination thereof. In one or more examples, an activity state of users within a collaborative workspace may be defined relative to a state of a collaborative media object. However, it is to be recognized that the user context evaluation may comprise determination of user activity that does not pertain to collaborative media object creation.

As indicated in the foregoing description, a common task through a collaborative workspace is the creation and management of a collaborative media object. User context may be an explicit determination of use activity (or inactivity) relative to a creation state of a collaborative media object whether or not users are actively accessing a collaborative workspace. A state of a collaborative media object is intended to be a point in the lifecycle of creation of a collaborative media object. This data may be useful to generating contextual insights that further the task of collaborative media object creation. Any state determination for a collaborative media object may be generated and used to help gauge a current representation of user activity within a collaborative workspace. For instance, lifecycle creation states of a collaborative media object may comprise a first state of a collaborative media object that may be a pre-creation state, for example, where a collaborative media object has yet to be created. A second state of a collaborative media object (e.g., lifecycle creation state) may be a draft completion state (e.g., one or more versions of a collaborative media object have been created but not yet finalized). A third state of a collaborative media object (e.g., lifecycle creation state) may be a confirmation state, where a collaborative media object has been created, edited and is subsequently ready for submission. It is to be recognized that other types of state of a collaborative media object may be created and managed without departing from the spirit of the present disclosure.

In further examples, determination of a user context may further contemplate user activity in other applications/services concurrent (or asynchronously) with access to the collaborative workspace. For instance, a user context determination may correlate any of the examples of application-specific signal data described above with other types of signal data collected. This may be useful to identifying a more complete picture or understanding of a user context (relative to their work within a collaborative workspace). As an example, user account data of a user account that is accessing a collaborative workspace may be utilized to determine past user activity associated with that user account through a video discussion application/service and/or other types of applications/services (e.g., email, messaging, collaboration applications/services and other types of productivity applications/services). In further technical instances, signal data may be analyzed to identify electronic documents or files that are concurrently being accessed along with a collaborative workspace and/or were previously accessed (or recently generated). For instance, a user may have recently created a video clip that is pertinent for submission to a posted topic, but that video clip may not yet be uploaded to the collaborative workspace. Content and metadata of any type of application/service may be analyzed (and correlated with application-specific signal data) to determine potentially relevant content that may further user productivity through the collaborative workspace. Additionally, device-specific signal data may be correlated with application-specific data to help identify user preferences, relevant content, etc., all of which may be specific to the device a user may be utilizing to access the collaborative workspace.

The trained AI model may then be adapted to generate (processing operation 262) data insights for a collaborative workspace. For instance, in examples where a collaborative workspace is provided for a video discussion application/service, processing operation 262 comprises generating data insights that correspond with features of a video discussion application/service. This may bring attention to features of a video discussion application/service that can be utilized to complete a task relative to a collaborative media object (e.g., creation, editing, commenting, exporting, submission/posting). In some examples, data insights may comprise predetermined content and messaging that directs a user to a specific feature and/or provides a GUI feature for automated processing. In other examples, data insights may be contextually tailored for users and/or group of users, where content included therein can make reference to specific users, topics, tasks, actions, electronic documents, etc. In some technical instances, relevance scoring processing may further be utilized to determine which content to include in a generated data insight.

Processing operation 262 further comprises actions to filter/curate data insights for contextual relevance. In some technical examples, a plurality of data insights may be generated and stored. Those data insights may then be scored for relevance to determine which data insights are most relevant to the user context within the collaborative workspace. In alternative examples, a relevance scoring is used to determine which data insights to generate. In any applied example, trained AI processing is configured to execute a relevance evaluation (e.g., relevance determinations) that identifies relevant features of a video discussion application/service relative to a user context of one or more users within the collaborative workspace. With respect to a relevance evaluation, a trained AI model may be trained to generate relevance scoring (e.g., relevance ranking processing) that scores the relevance of individual data insights to a user context and/or a state of a collaborative media object. For instance, a determination is made as to how relevant a feature of a video discussion application/service is to state of the collaborative media object (e.g., creating, editing, exporting, posting).

As a non-limiting example, relevance scoring for a data insight may be derived from analysis of collected signal data, an identified user context (individually and/or collaboratively), a state of a collaborative media object within the collaborative workspace, or any combination thereof. An AI model may be trained to process any combination of that data and generate a relevance determination therefrom. For instance, user context within the collaborative workspace may be comparatively evaluated relative to states of a collaborative media object (e.g., a current state of the collaborative media object as well as future state that is intended to be reached as a final product that ultimately contemplates the parameters set forth for content submission). It is noted that a trained AI model may be configured to focus on a specific relevance scoring metric or may be trained to collectively consider multiple relevance scoring metrics to determine contextually relevant data insights for presentation.

In one example of relevance ranking processing, relevance scoring may be generated for one or more data insights that scores a relevance of a data insight to a most recent user action (or group of user actions) within a collaborative workspace. In one specific example, a relevance scoring may score a relevance of a data insight to a most recent user action that modified the collaborative media object. For instance, based on a user adding a content portion to a collaborative media object, a data insight may be sent to users with a suggestion for editing that content portion or re-arranging content portions of an automatically generated collaborative media object. In yet another example, AI modeling may be trained to score a relevance of a data insight relative to assignment instructions (or parameters), associated with the collaborative workspace, for posting/submitting a video discussion response to the topic. As an example, an administrative user (e.g., teacher) may post rules or guidelines pertaining to a submission that is to be received from a student (or group of students), where data insights can be intelligently generated to help users comply with assignment instructions. In further examples, AI modeling may be trained to score a relevance of a feature of the video discussion application or service relative to content associated with a different application or service. For instance, two group members may have been discussing, via a messaging application/service, an addition of a specific video clip to their collaborative media object. A feature to help automatically import that video clip and automatically update their collaborative media object may be extremely helpful.

In some examples, a trained AI model may be configured to collectively contemplate a plurality of relevance scoring metrics in a relevance determination. For instance, relevance metrics may be generated for any of the above identified technical scenarios, where an aggregate relevance score may be generated for a specific data insight as to its contextual relevance to a user context within a video discussion application/service. In some example, AI modeling may be trained to apply a specific weighting to specific types of relevance scoring metrics. As an example, relevance of actions pertaining to user interactions associated with a collaborative media object may be weighted higher than user actions with content of other applications/services.

Processing operation 262 may further comprise processing that curates/filters data insights based on evaluation of relevance scoring generated thereof. A threshold evaluation of relevance scoring may be applied to determine the most contextually relevant data insights for a determined user context. Thresholds may be set by developers, where values may vary without departing from the spirit of the present disclosure. One or more data insights may be selected/curated for representation generation based on a threshold analysis of generated relevance scoring. In one example, a single data insight (e.g., highest scoring data insight based on relevance scoring) may be output for presentation through a GUI of a collaborative workspace based on analysis of relevance scoring. In other examples, N number of data insights (e.g., any number of data insights) that exceed a threshold relevance score may be propagated for presentation or stored for recall when a user context changes. In even further examples, generated data insights, whether they meet a threshold relevance scoring or not, may be stored for subsequent recall. As an example, a distributed data storage (e.g., knowledge repositories 110 of FIG. 1) may be utilized to manage storage of data insights and/or generated representations thereof. While a data insight may not be relevant to a current user context, that same data insight may be more relevant to a future user context. Storing data insights (and/or representations thereof) may improve processing efficiency during subsequent contextual analysis of a collaborative workspace. As referenced in the foregoing description, different representations of a collaborative workspace may be presented for different users. If multiple users are concurrently accessing a collaborative workspace, there may be multiple representations of the same collaborative workspace being managed by a collaborative media management component. It follows that different data insights may be most relevant to different users, where different data insights may be selected for contextual relevance to different (user) representations of a collaborative workspace.

Flow of method 250 may then proceed to processing operation 264. At processing operation 264, a representation(s) of one or more data insights may be generated. Representations of data insights may be generated based on a result of analysis of a relevance evaluation pertaining to generated data insights. Processing for execution of a relevance evaluation of data insights has been described in the foregoing description including the description of processing operation 262. Non-limiting examples of representations of data insights are visually illustrated in FIGS. 4A-4J.

In some examples, representations of data insights may be generated (processing operation 264) in real-time (or near real-time) depending on a user context relative to the collaborative workspace. In other examples, representations of data insights may be generated (processing operation 264) asynchronously from user access and then surfaced at the most relevant timing based on analysis of signal data received relative to the collaborative workspace. Representations of data insights may comprise not only content defining a contextually relevant data insight but also GUI elements linked to features of a video discussion application/service that are provided through a collaborative workspace. For instance, a representation of a data insight may comprise a selectable GUI element, that when selected, provides automatic execution of a feature of the video discussion application or service. As an example, multiple users may be collaboratively creating a collaborative media object, where selectable GUI elements may be presented to help users create (or add content to) the collaborative media object and/or manage editing of the same. In further examples, representations of data insights may enable automated import/export control of a collaborative media object across different applications/services. In even further examples, representations of data insights may further enable users to integrate a GUI version of the collaborative workspace within a GUI of another application/service. This is extremely beneficial to users who are multi-tasking or are simply accessing content primarily in another application/service. In any example, relevance scoring results and/or analysis of a user context (e.g., explicitly identifying a lifecycle creation state of a collaborative media object) may be used to determine not only content of data insight but also how to present the same (e.g., whether to customize it for a specific user or provide a predetermined template for representation of a data insight). This type of analysis further pertains to determining whether to include specific GUI features/elements that provide automatic actions for features of a video discussion application/service.

Flow of method 250 may proceed to processing operation 266. At processing operation 266, data for rendering one or more representations of data insights may be transmitted for display in a GUI representation of the collaborative workspace. For instance, this may occur in distributed examples where a component is executing processing and transmits, over a network connection, data for rendering a representation of a GUI on a client computing device (e.g., user computing device). As an example, transmission of data for rendering a representation of a data insight, may comprise transmitting, to a client device, data for rendering the one or more representations of data insights in a GUI presenting the collaborative workspace (e.g., within the video discussion application/service). In alternative examples, processing to generate a representation of data insights, may occur directly on a client device that is rendering a user representation of the collaborative workspace (e.g., representation of collaborative workspace for first user of a group of users).

Flow of method 250 may then proceed to processing operation 268. At processing operation 268, a representation of data insight (or multiple representations thereof) is rendered in a representation of the collaborative workspace. In one example, a representation of a collaborative media object is rendered at a client computing device that is presenting a representation of a collaborative session (via a GUI representation of a collaborative workspace). In other examples, rendering of a collaborative media object may be generated via a first computing device and transmitted (e.g., over a network connection) to one or more additional computing devices for duplicating a rendering. As previously indicated, FIGS. 4A-4J of the present disclosure provide non-limiting examples of rendering of representations of data insights as well as GUI features/menus for management thereof.

After a representation of a data insight is rendered, flow of method 250 may proceed to decision operation 270. At decision operation 270, it is determined whether a user interacts with a representation of a data insight. In examples where a user interaction is not received with respect to a representation of a data insight, flow of decision operation 270 branches "NO" and method 250 returns to processing operation 252. At that point, processing of method 250 may proceed as previously described, for example, to execute new user context evaluations. In some examples, a change to a user context may result in the recall of a previously generated data insight and/or representation of a data insight. In examples where users are synchronously utilizing the collaborative workspace, developers may set a predetermined time period for re-execution of a user context analysis. In other examples, developers may set a trigger for re-execution of a user context analysis. For instance, the execution of a user action and/or an update to a collaborative media object may be an automatic trigger to re-evaluate a user context associated with the collaborative workspace. As previously referenced, users may utilize the collaborative workspace to collaborate asynchronously. As such, user contextual evaluations may also subsequently occur at different times.

In examples where a user interaction is received with a representation of a data insight, flow of decision operation 270 branches "YES" and method 250 proceeds to processing operation 272. At processing operation 272, a GUI of a collaborative workspace is updated based on a result of the user interaction with the representation of the data insight. For instance, in examples where a GUI element is presented that is configured to execute an automatic action, an action is automatically executed when that GUI element is selected. Some non-limiting examples of user interactions with representations of data insight are shown in FIGS. 4A-4J and further described in the accompanying description.

FIGS. 3A-3L illustrate exemplary processing device views associated with user interface examples for an improved user interface that is adapted for generation and management of collaborative media objects, with which aspects of the present disclosure may be practiced. FIGS. 3A-3L provide non-limiting front-end examples of processing described in the foregoing including system diagram 100, method 200 (FIG. 2A) and method 250 (FIG. 2B).

FIG. 3A presents processing device view 300, illustrating a GUI 301 of an application/service (e.g., a video discussion application/service) that is adapted to present an exemplary collaborative workspace. The GUI 301 is configured to provide application command control and associated GUI elements including those associated with management of one or more topics for a collaborative session (of the collaborative workspace) as well as management of video feeds, to be posted in response to a topic, through a video discussion application/service. For example, a topic control feature 302 is provided to enable users to manage access to specific topics provided through a collaborative workspace. In the example shown, the topic control feature 302 is set to present a collaborative workspace representation for a topic "Film Study 101", where a plurality of users may collaborate to create a video discussion posting/submission for a "Film Study 101" class. As shown in GUI 301, user presence status indications 303 indicate that a group of three users ("User 1", "User 2 and "User 3") are concurrently collaborating within the collaborative workspace. As background, a teacher of the "Film Study 101" class may have posted an assignment for a group of users to respond to by providing a video discussion submission. This is an example of a video discussion application/service being utilized for remote learning (or electronic learning). However, as identified in the foregoing discussion, the present disclosure is not limited to educational examples. An educational example is illustrated in FIGS. 3A-3L for ease of understanding and explanation.

In the example shown in processing device view 300, the GUI 301 displays a representation of the collaborative workspace as displayed to a first user (indicated by user identification 304). A camera representation 305 for a first user ("User 1") is provided within the GUI 301, which provides a representation of a live video feed (or live camera feed) for the first user. When the first user selects to record a live video feed through the collaborative workspace, the camera representation 305 may update to reflect a state of the first user via control over a camera device associated with a users' computing device. In some examples, a GUI feature for live collaborative video feeds 306 may be provided through the GUI 301. The GUI feature for live collaborative video feeds 306 provides the live video feeds for other collaborative users (e.g., "User 2", "User 3") of a collaborative session directly within a representation of the collaborative workspace (e.g., "User 1"). Additionally, a GUI menu for feature management 307 is presented providing features of functionality through the video discussion application/service for a user to manage video feeds that may be added to the collaborative workspace. Non-limiting examples of features that may be included in the GUI menu for feature management 307 comprise but are not limited to: camera options to manage content addition (e.g., recording of a video clip, uploading of a video clip, mirroring of video, audio control, video control, recording of a screen, image snapshots); camera effect options (e.g., adding of filters, dueting, framing, emojis, text, drawings, addition of boards such as whiteboards, resizing and cropping); and features for topic management and/or note addition (e.g., the addition of sticky notes that are displayed for users within a collaboration workspace). Furthermore, a GUI time indicator 308 may be provided that provides timestamp data for the recording of live video feeds via the video discussion application/service. For instance, a live camera feeds may be recorded in set intervals (e.g., maximum length of recording is 1 minute), where each time a user initiates recording of a live camera feed a recording can be created up to that designated interval. Administrative users (e.g., teachers) of a collaborative workspace may set time intervals (e.g., a maximum length for recording of a video clip) that may be applied to live video feed recording. In some alternative examples, no set time interval is predetermined for live video feed recording.

Figure 3B:
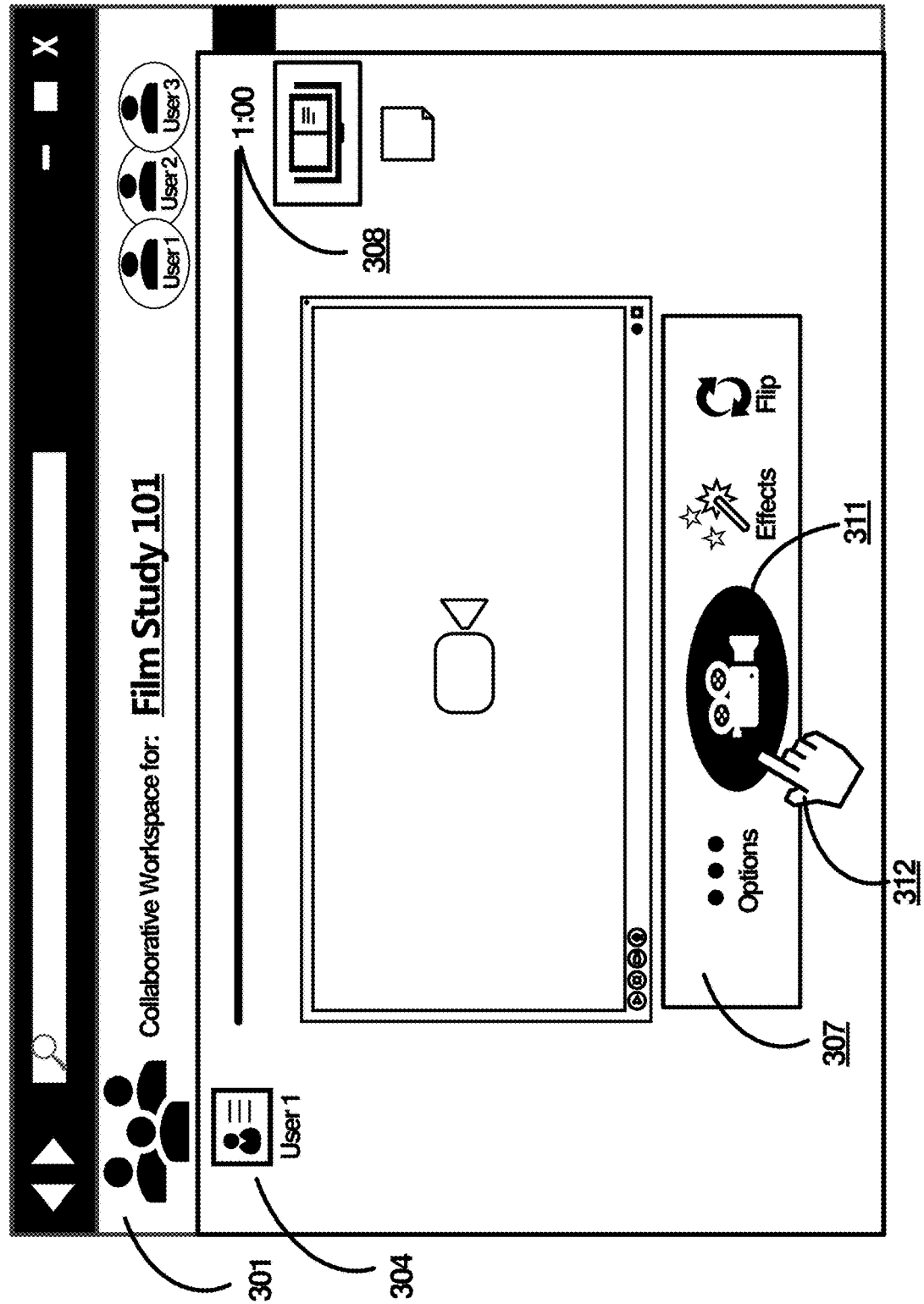

FIG. 3B presents processing device view 310, illustrating a continued example of the GUI 301 of the collaborative workspace (e.g., provided through a GUI of a video discussion application/service) that is shown in processing device view 300 (FIG. 3A). In the example shown in processing device view 310, a live camera recording feature 311 is selected, via user action 312, from the GUI menu for feature management 307. The user action 312 is a trigger to begin recording of a live video feed (e.g., of the first user) via the video discussion application/service. As previously indicated, a maximum length of a recording of a live video feed may be preset according to a set interval for the application/service or via user preferences.

FIG. 3C presents processing device view 315, illustrating a continued example of the GUI 301 of the collaborative workspace (e.g., provided through a GUI of a video discussion application/service) that is shown in processing device view 310 (FIG. 3B). In the example shown in processing device view 315, a camera representation 305 for the first user is updated to enable recording of a live video feed (live camera feed) of the first user. An updated camera representation 316 is presented that reflects a live video feed of the first user as being recorded. As can be seen in processing device view 315, the GUI time indicator 308 indicates a recording time for recording of the live video feed. In examples where a set interval is applied indicating a maximum recording length, the recording will complete upon the time the maximum recording time is reached (e.g., 1 minute). Should the user wish to quickly initiate recording of a subsequent live video feed, a quick record GUI feature 317 (e.g., "Next") is presented for selection, overlaying the camera representation 305. Selection of the quick record GUI feature 317 would automatically initiate another recording of a live video feed from directly with camera representation 305 without the user having to utilize the GUI menu for feature management 307.

FIG. 3D presents processing device view 320, illustrating a continued example of the GUI 301 of the collaborative workspace (e.g., provided through a GUI of a video discussion application/service) that is shown in processing device view 315 (FIG. 3C). As can be seen in processing device view 320, a representation of the collaborative workspace, via the GUI 301, has been changed to provide a representation of GUI 301 from the perspective of a second user ("User 2"). This is reflected in the update to the user identification 321 (identifying "User 2"). Furthermore, a GUI window 322 is automatically added to the GUI 301 to reflect the automatic generation of a collaborative media object. GUI window 322 provides access to a current state of a collaborative media object. For example, GUI window 322 is automatically rendered and presented in a GUI 301 in response to the addition of the live video feed ("Clip 1-User 1") recorded by user 1 as previously described with reference to FIGS. 3B and 3C. Added content portions of a collaborative media object may further be presented in GUI window 322. For instance, identification of a first live video feed 323 ("Clip 1-User 1") is presented within GUI window 322 to enable "User 2" to view and/or edit the first live video feed 323 and any additional video feeds (or content portions) added to the collaborative media object.

Furthermore, processing device view 320 illustrates a continued example where a second user is recording a live video feed to add to the collaborative media object. A camera representation 324 (for "User 2") is provided within the GUI 301, which illustrates a representation of a live video feed (or live camera feed) for the second user. The live camera recording feature, presented in the GUI menu for feature management 307, is selected via user action 325. The user action 325 is a trigger to begin recording of a live video feed (e.g., of the first user) via the video discussion application/service. An updated camera representation 326 is presented that reflects a live video feed of the second user as being recorded. Upon completion of recording a collaborative media object may be automatically updated to reflect the addition of the second live video feed (as shown in FIG. 3E).

FIG. 3E presents processing device view 330, illustrating a continued example of the GUI 301 of the collaborative workspace (e.g., provided through a GUI of a video discussion application/service) that is shown in processing device view 320 (FIG. 3D). As can be seen in processing device view 330, a representation of the collaborative workspace, via the GUI 301, has been changed to provide a representation of GUI 301 from the perspective of a third user ("User 3"). This is reflected in the update to the user identification 331 (identifying "User 3"). A camera representation 332 (for "User 3") is provided within the GUI 301, which illustrates a representation of a live video feed (or live camera feed) for the third user. Furthermore, a GUI window 322 is automatically updated in the GUI 301 to reflect an automatic update to the collaborative media object. GUI window 322 provides access to a current state of a collaborative media object. For example, GUI window 322 is automatically rendered and presented in a GUI 301 in response to the addition of the second live video feed ("Clip 2-User 2") recorded by user 2 as previously described with reference to FIG. 3D. Added content portions of a collaborative media object may further be presented in GUI window 322. For instance, identification of a first live video feed 323 ("Clip 1-User 1") and the second live video feed 333 ("Clip 2-User 2") is presented within GUI window 322 to enable User 3 to view and/or edit the first live video feed 323 and/or the second live video feed 333. As can be seen in GUI window 322, the length ("1:39") of the collaborative media object has been updated to reflect the aggregation of multiple live video feeds as a single media object.

Moreover, processing device view 330 illustrates a continued example where a third user is adding a third video feed to the collaborative media object. For instance, the third video feed may have been previously recorded (e.g., via the collaborative workspace or another application/service). An options feature, presented in the GUI menu for feature management 307, is selected via user action 334. The user action 334 is a trigger to render a GUI sub-menu providing additional options for managing video feeds within the collaborative workspace. A representation of a GUI sub-menu is illustrated and further described in the description of FIG. 3F.

Figure 3F:
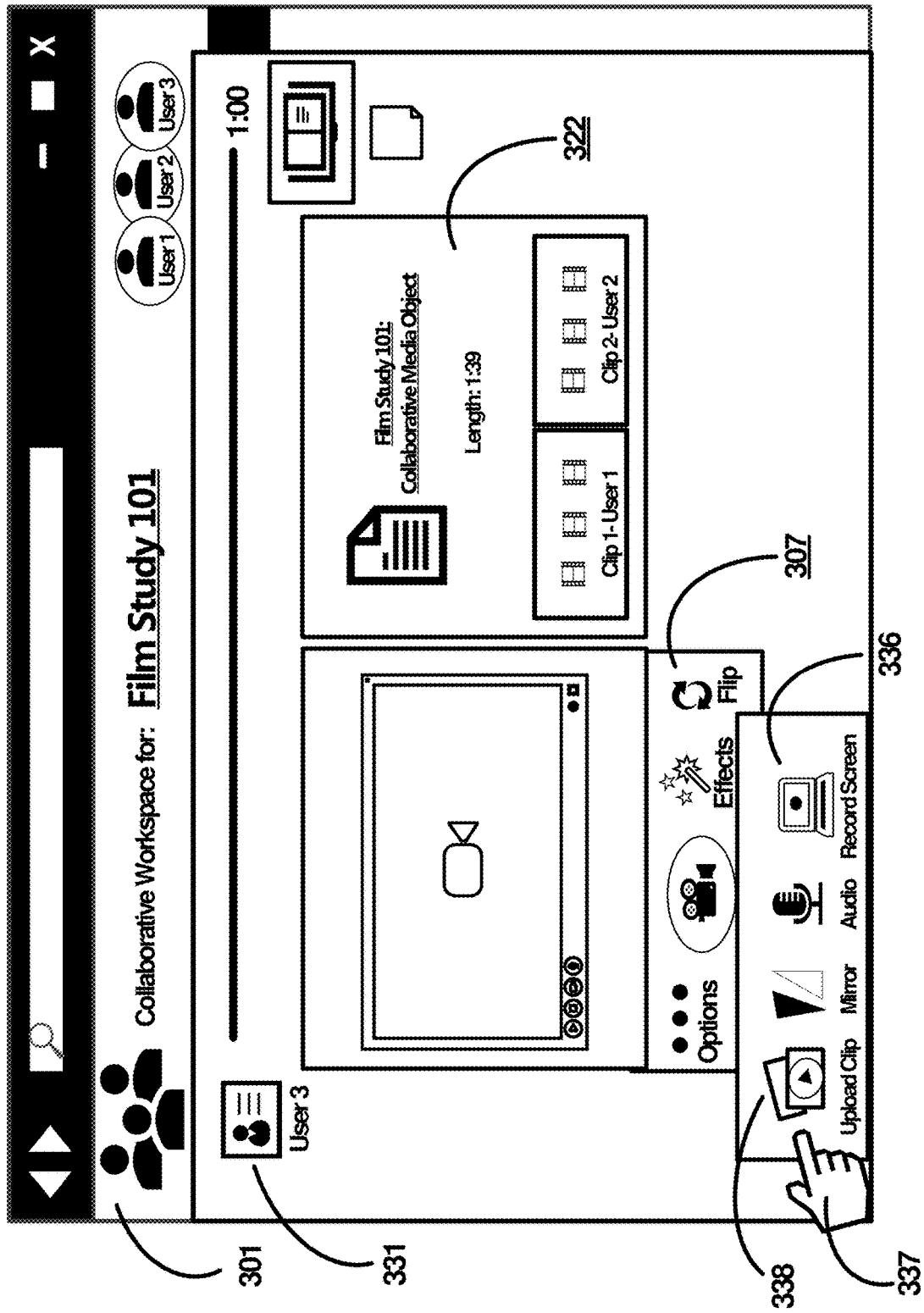
Figure 3K:
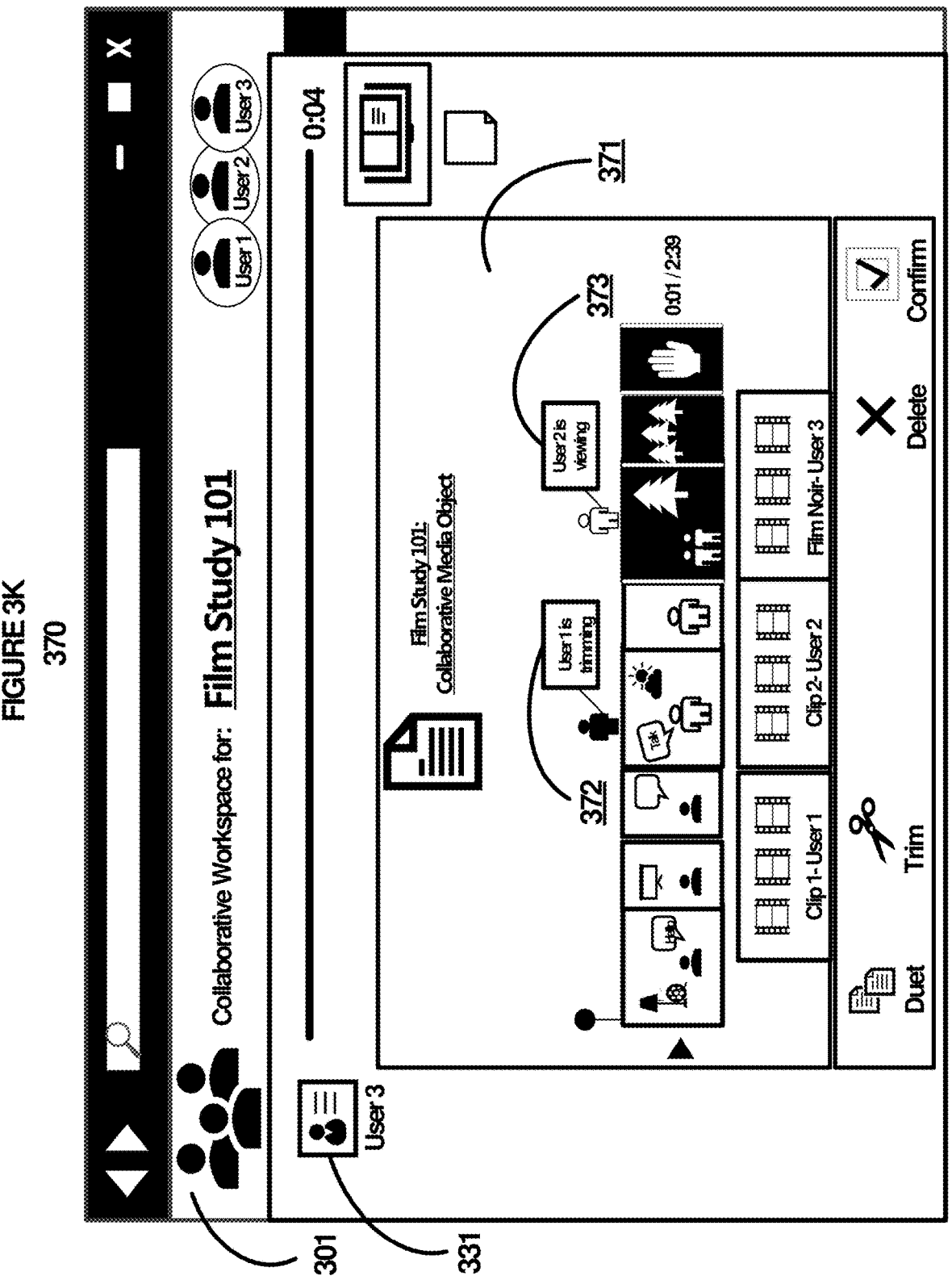

FIG. 3F presents processing device view 335, illustrating a continued example of the GUI 301 of the collaborative workspace (e.g., provided through a GUI of a video discussion application/service) that is shown in processing device view 330 (FIG. 3E). A GUI feature sub-menu 336 is presented in processing device view 335, for example, in response to a receipt of user action 334 (FIG. 3E). The GUI feature sub-menu 336 comprises a plurality of features for management of video feeds within a collaborative workspace. In the example shown in processing device view 335, a user action 337 is received that selects a GUI feature 338 configured to trigger upload of a video clip to the collaborative workspace. In response to the user action 337, selecting GUI feature 338, additional GUI prompts (not shown) may be presented for a user to guide the user with uploading a video clip to the collaborative workspace.

FIG. 3G presents processing device view 340, illustrating a continued example of the GUI 301 of the collaborative workspace (e.g., provided through a GUI of a video discussion application/service) that is shown in processing device view 335 (FIG. 3F). Processing device view 340 illustrates the automatic update of a collaborative media object, which occurs based on a result of receiving an uploaded video clip ("Film Noir") from "User 3." The GUI window 322, providing management of the collaborative media object, is automatically updated in the GUI 301 to reflect an automatic update to the collaborative media object. GUI window 322 provides access to a current state of a collaborative media object. For example, GUI window 322 is automatically rendered and presented in a GUI 301 in response to the addition of the third video feed ("Film Noir-User 3"). Added content portions of a collaborative media object may further be presented in GUI window 322. For instance, identification of a first live video feed 323 ("Clip 1-User 1"), the second live video feed 333 ("Clip 2-User 2"), and the third video feed 341 ("Film Noir-User 3") is presented within GUI window 322 to enable user 3 to view and/or edit the first live video feed 323, the second live video feed 333 and/or the third video feed 341. As can be seen in GUI window 322, the length ("2:39") of the collaborative media object has been updated to reflect the aggregation of multiple live video feeds as a single media object. Moreover, a user action 342 may be received that selects the GUI window 322 to provide further management of the collaborative media object. As shown in processing device view 345 (FIG. 3H), a sub-menu of the GUI window 322 is presented that enables users to manage content portions of the collaborative media object.

FIG. 3H presents processing device view 345, illustrating a continued example of the GUI 301 of the collaborative workspace (e.g., provided through a GUI of a video discussion application/service) that is shown in processing device view 340 (FIG. 3G). As shown in processing device view 345, a GUI sub-menu 346 configured for collaborative media object management is presented. As referenced in the foregoing, presentation of the GUI sub-menu 346 may automatically occur in response to a receipt of user action 342 (FIG. 3G). An ordered (or arranged) frame representation 347 of content portions, comprising a single media object, is presented in GUI sub-menu 346. As previously indicated, processing to generate a collaborative media object may arrange content portions (e.g., added video clips and/or other content portions) for representation as a single media object. When the collaborative media object being executed, a seamless representation of content (e.g., presentation of added video clips in a sequential order) occurs as if all the content portions are stitched together. Processing operations for arranging/ordering content portions of a collaborative media object have been described in the foregoing description, including the description of method 200 (FIG. 2).

As shown in ordered frame representation 347, individual frames of added video clips are presented in a sequential order. This enables users to view and edit individual frames of content portions of the collaborative media object. As such, users can collaboratively edit/modify any portions (or sub-portions) of the single media object. A GUI feature 348 configured for frame indication provides a visual identifier as to where a focus is when editing frames of the collaborative media object. For instance, if a user selects an editing feature from a GUI menu of editing features 350, the GUI feature 348 configured for frame indication clearly identifies what frame would be edited. In alternative examples, a user may manually select a specific frame and subsequently select an editing feature from the GUI menu of editing features 350 to apply an edit.

Furthermore, GUI sub-menu 346 may further provide corresponding indications of the content portions that make up the collaborative media object. While ordered frame representation 347 shows an order of individual frames that collectively form the single media object, ordered clip representation 349 shows a representation of video clips (and/or other content portions) that comprise the collaborative media object. Ordered clip representation 349 enables users to edit the entirety of a video clip in a single action as opposed to modifying individual frames of each of the video clips presented. For instance, a user may wish to remove a video clip or modify an order/arrangement of the video clip within the collaborative media object. An adapted GUI 301 makes it easier to work with the entirety of a video clip rather than selecting individual frames.

Processing device view 345 further shows receipt of user actions (351 and 352) to delete a video clip from the collaborative media object. For instance, a third user ("User 3") may wish to delete the video clip added by the second user ("Clip2-User 2"). A first user action 351 is received to select the second video clip ("Clip2-User 2") from the ordered clip representation 349, and a second user action 352 is received that selects a delete feature 353 from the GUI menu of editing features 350. A result of processing of those user actions is presented in FIG. 3I.

FIG. 3I presents processing device view 355, illustrating a continued example of the GUI 301 of the collaborative workspace (e.g., provided through a GUI of a video discussion application/service) that is shown in processing device view 345 (FIG. 3H). To further illustrate the collaborative nature of the collaborative workspace, a GUI representation of the collaborative workspace is returned to a representation provided to the first user ("User 1"). In the example shown in processing device view 355, the collaborative media object is updated to remove ("Clip2-User 2") based on receipt of user actions by User 3. This update is immediately reflected in the GUI representation provided to "User 1". A representation of a GUI window 356 for management of the collaborative media object illustrates the present state of the collaborative media object as comprising ("Clip1-User 1") and ("Film Noir-User 3").

Additionally, processing device view 355 illustrates receipt of user actions to create a dueting clip for the collaborative media object. For instance, a third video clip ("Film Noir-User 3") or frames thereof can be selected via user action 357 in conjunction with a user action 358 that selects a duet feature 359 from the GUI menu of editing features 350. For instance, user actions 357 and 358 may be continuous (or consecutive) actions that identify specific content in which to apply a dueting request. In alternative examples, the GUI feature 348 configured for frame indication can be utilized to indicate the content that a user wishes to use for creation of a dueting request. While not illustrated in processing device view 355, additional GUI features may be presented through an adapted user interface to help users create a collaborative dueting that includes live video feeds from multiple users collaboratively.

FIG. 3J presents processing device view 360, illustrating a continued example of the GUI 301 of the collaborative workspace (e.g., provided through a GUI of a video discussion application/service) that is shown in processing device view 355 (FIG. 3I). In the example shown in processing device view 360, a collaborative dueting request is being processed, where a dueting clip is being created that includes live video feeds from multiple users in a collaborative manner. For instance, a first user ("User 1") may provide a dueting request to have live video feeds from both "User 1" and "User 2" recording concurrent with playback of a third video clip ("Film Noir-User 3"). A representation of a GUI window 361 for management of the collaborative media object is provided in view of that request, which provides real-time playback of the third video clip ("Film Noir-User 3") simultaneously with the presentation of live video feeds of the first user (live video feed 362 for "User 1") and the second user (live video feed 363 for "User 2"). A user action 364 is received to initiate recording of the dueting clip. Upon receipt of user action 364, the third video clip ("Film Noir-User 3") may be automatically executed along with recording of respective live video feeds. In alternative examples, a selection of a duet feature, from the GUI menu of editing features 350, automatically triggers launch of a dueting clip. For instance, users may be provided with visual cues (e.g., a countdown) that indicates when concurrent recording will begin. Arrow indication 365 is illustrated as a symbol for playback of the third video clip simultaneously with the recording of live video feed 362 and live video feed 363. Once a dueting clip is recorded, the collaborative media object may be automatically updated to include the dueting clip (e.g., replacing a prior version of the third video clip).

FIG. 3K presents processing device view 370, illustrating a continued example of the GUI 301 of the collaborative workspace (e.g., provided through a GUI of a video discussion application/service) that is shown in processing device view 345 (FIG. 3H). Returning back to a previous example where the collaborative media object comprises three video clips, a GUI representation of the collaborative workspace for a third user ("User 3") is illustrated. Processing device 370 provides non-limiting visual examples of exemplary presence indications, where real-time status updates for collaborative editing may be visually provided to the third user through an adapted GUI 301 of the collaborative workspace. As previously indicated, presence indications are GUI representations that identify specific users within a collaborative workspace and specific user action that is (or has been performed) relative to management of content portions of a collaborative media object. Presence indications may be visually presented in a GUI window 371 configured for management of the collaborative media object. Moreover, presence indications may be presented in addition to other content previously described with respect to GUI windows providing management of the collaborative media object. For instance, a first presence indication 372 provides visual identification of activity of a first user. In the example shown, a first user ("User 1") may be currently trimming frames off the second video clip ("Clip 2-User 2") that is added by the second user ("User 2'). A second presence indication 373 provides visual identification of activity of a second user. Concurrently, the second user ("User 2") may be viewing the third clip ("Film Noir-User 3") that was added by the third user. Exemplary presence indications help visually notify the third user of collaborative activity to help the third user determine its next task so as not to overlap with collaborative editing being applied by other users.

Figure 3L:
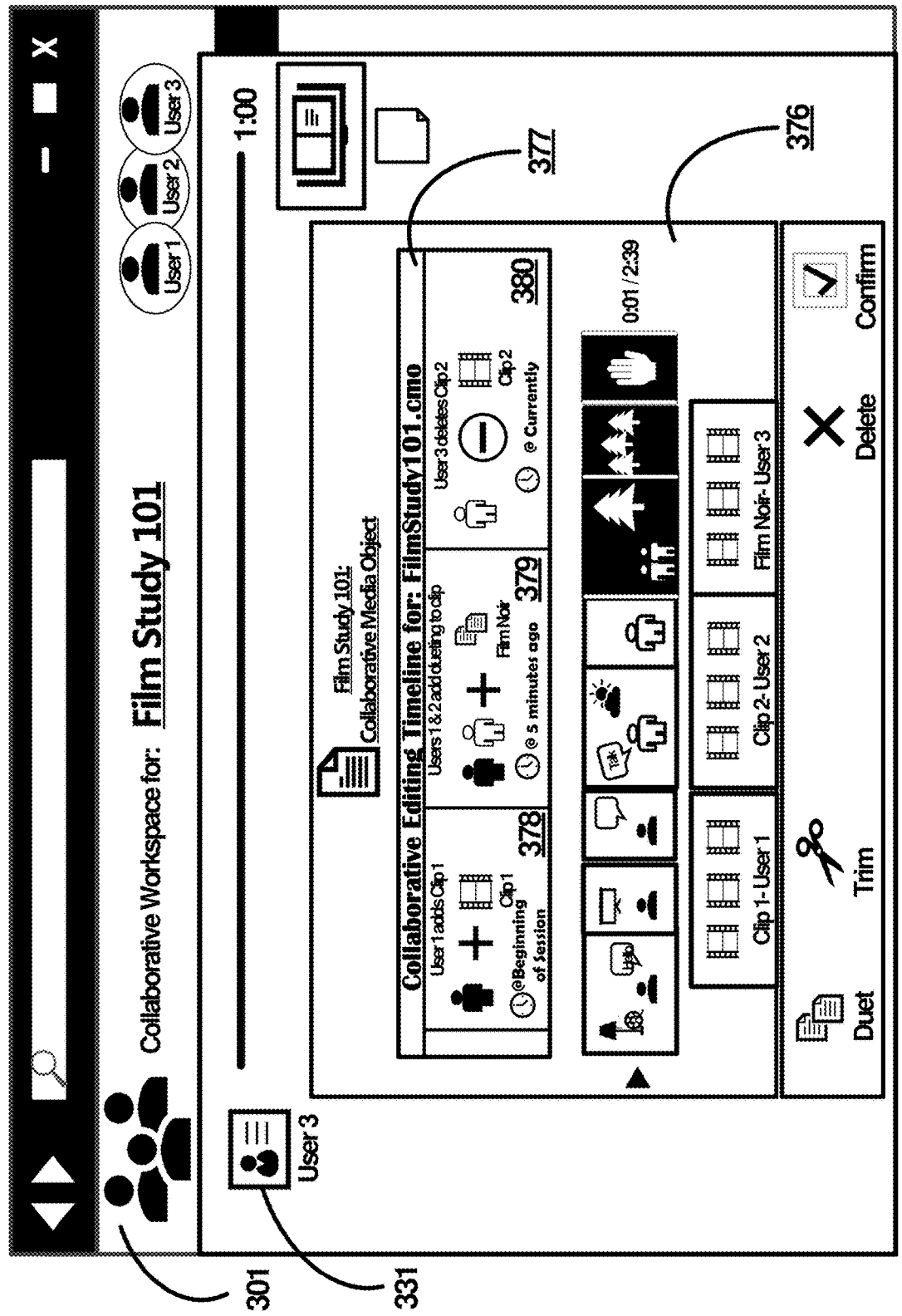

FIG. 3L presents processing device view 375, illustrating a continued example of the GUI 301 of the collaborative workspace (e.g., provided through a GUI of a video discussion application/service) that is shown in processing device view 370 (FIG. 3K). As referenced in the foregoing description (including the description of method 200 (FIG. 2), activity notifications may be generated and presented for users which comprise a timeline providing temporal representation of user interactions with a collaborative media object. For instance, since collaborative editing may occur in real-time, one user may add a video clip and then realize that another user may have modified that video clip. As such, a collaborative media management component may be configured to generate dynamic media management timelines identifying user interactions (e.g., modifications) with a collaborative media object as well as identification of a timing of when an interaction occurred. This can aid in providing users with a fuller picture of a collaborative session and even help identify a point that an edit should be rolled back or returned to a previous version of the collaborative media object.

Processing device view 375 illustrates the presentation of a dynamic timeline 377 that identifies temporal representation of user interactions (e.g., modifications) with a collaborative media object. For instance, an exemplary dynamic timeline 377 may be rendered as a GUI feature of a GUI window 376 configured for management of the collaborative media object. An exemplary dynamic timeline 377 may comprise temporal representations of modification to a collaborative media object, where data included therein may comprise but is not limited to: data indicating a timing of a modification; a description of a content portion that was modified; and an identification of one or more users involved in the modification. However, is it to be recognized that any type of determination, generated by an exemplary collaborative media management component (e.g., from analysis of signal data described herein), may be rendered within a dynamic timeline 377.

In the example shown in processing device view 375, the dynamic timeline 377 comprises a first temporal indication 378 providing data indicating a first edit/modification to a collaborative media object. The first temporal indication 378 indicates that a first user ("User 1") added a video clip to the collaborative media object at the beginning of a collaborative session within the collaborative workspace. The second temporal indication 379 provides data indicating a subsequent edit to the collaborative media object. For example, the second temporal indication 379 provides a temporal identification of the addition of a collaborative dueting clip (e.g., between "User 1" and "User 2") to the collaborative media object. The third temporal indication 380 provides an identification of a current update to the collaborative media object. For example, the third temporal indication 380 indicates that a third user ("User 3") has just currently deleted a video clip ("Clip 2") from the collaborative media object. As such, an exemplary dynamic timeline 377 may provide a comprehensive temporal representation of modification of a collaborative media object, which can continuously expand over time as additional modifications occur to a collaborative media object. In some alternative examples, a dynamic timeline 377 may further span multiple collaborative sessions. For instance, a collaborative workspace may be associated with multiple topics, where the dynamic timeline 377 can provide a comprehensive temporal representation across multiple topics and/or collaborative media objects. This may comprise technical instances where multiple topics are associated with a single collaborative media object as well as technical instances where each of multiple collaborative media objects are associated with an individual topic.

FIGS. 4A-4J illustrate exemplary processing device views associated with user interface examples for an improved user interface that is adapted for generation and management of data insights to aid user collaboration within a collaborative workspace, with which aspects of the present disclosure may be practiced. FIGS. 4A-4J provide non-limiting front-end examples of processing described in the foregoing including system diagram 100, method 200 (FIG. 2A) and method 250 (FIG. 2B). The GUI examples shown in FIG. 4A-4J build off of those examples previously described with respect to the examples provided in FIGS. 3A-3L.

Figure 4A:
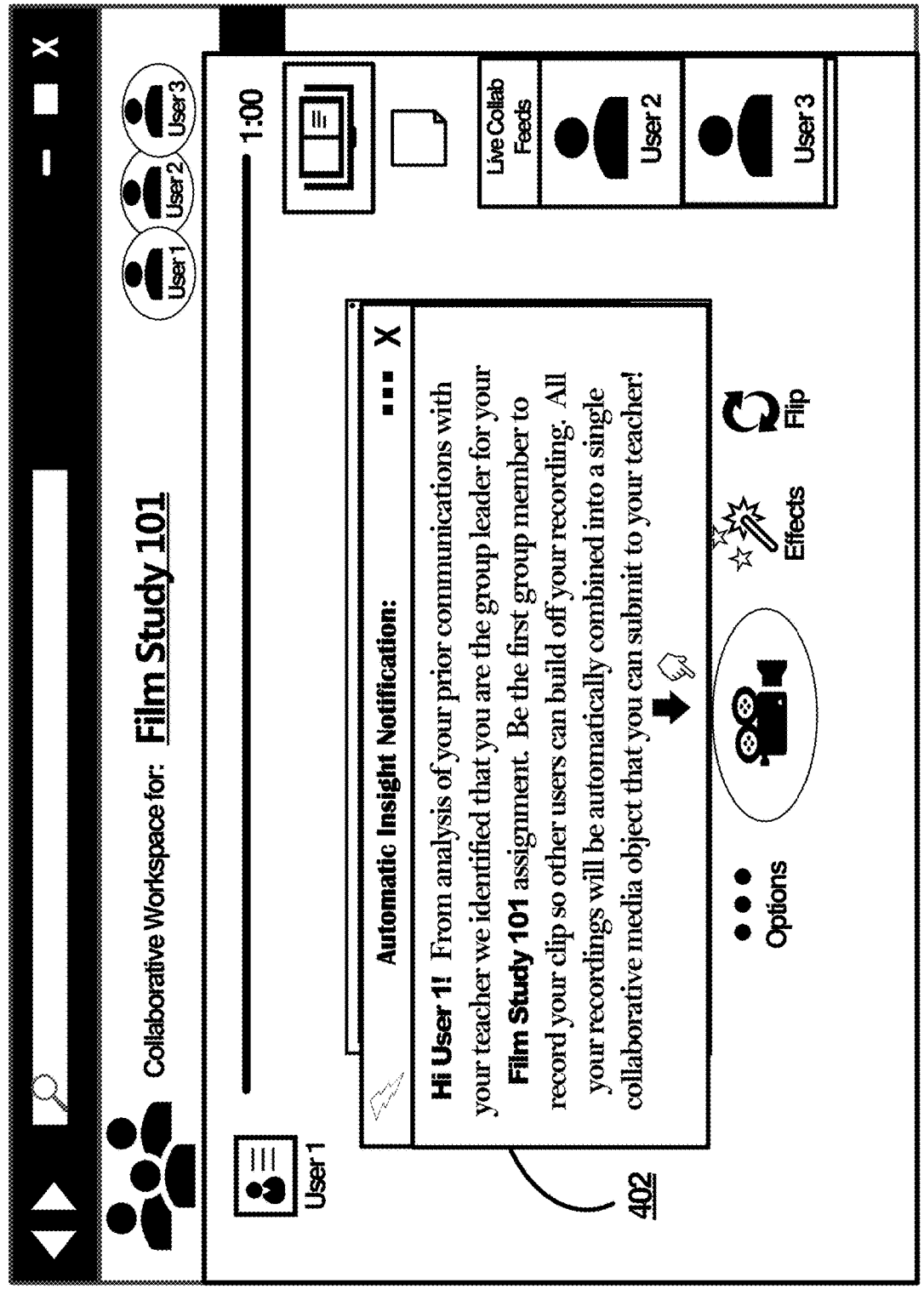

FIG. 4A presents processing device view 400, illustrating a GUI, as previously shown as GUI 301 (FIG. 3A), which newly features an automatic data insight notification that is provided through a GUI representation of a collaborative workspace. As previously described, an exemplary GUI is that of a video discussion application/service that is adapted to present an exemplary collaborative workspace. Data insight notification 402 is automatically presented through a GUI representation of the collaborative workspace. Data insight notification 402 is a result of back-end processing as previously described in the foregoing description including the description of method 250 (FIG. 2B). For instance, data insight notification 402 brings attention to a camera feature of the video discussion application/service while providing a suggestion for a user ("User 1") to record a video clip to automatically initiate generation of a collaborative media object. As previously described, analysis of signal data, including application-specific signal data, may yield determinations as to specific topics associated with a collaborative session, specific user accounts associated with the collaborative session and guidelines/instructions associated with a submission of a collaborative media object via the video discussion application/service, among other examples. From the contextual description generated within data insight notification 402, it is clear that a real-time contextual analysis was executed that is helpful to further task completion via the collaborative workspace. For example, a state of the collaborative media object was determined to be a pre-creation state, where the collaborative media object has yet to be created. Previous correspondence between a student ("User 1") and a teacher may have further yielded a determination that "User 1" is the group leader for creation of a posting/submission via the video discussion application/service. As such, contextual insight generation can greatly improve usability of applications/services such as video discussion applications/services.

FIG. 4B illustrates processing device view 405, presenting a GUI, as previously shown as GUI 301 (FIG. 3A), which newly features an automatic data insight notification that is provided through a GUI representation of a collaborative workspace. Data insight notification 407 is automatically presented through a GUI representation of the collaborative workspace. Data insight notification 407 brings attention to specific features and functionality of the collaborative workspace of the video discussion application/service. For example, data insight notification 407 calls out the automatic presentation of a GUI window for management of a collaborative media object. Based on detection and analysis of a user action (e.g., by "User 1"), Data insight notification 407 is automatically provided for "User 2" through a GUI representation of the collaborative workspace. Data insight notification 407 further directs a user as to how content can be automatically added to the collaborative media object.

Figure 4C:
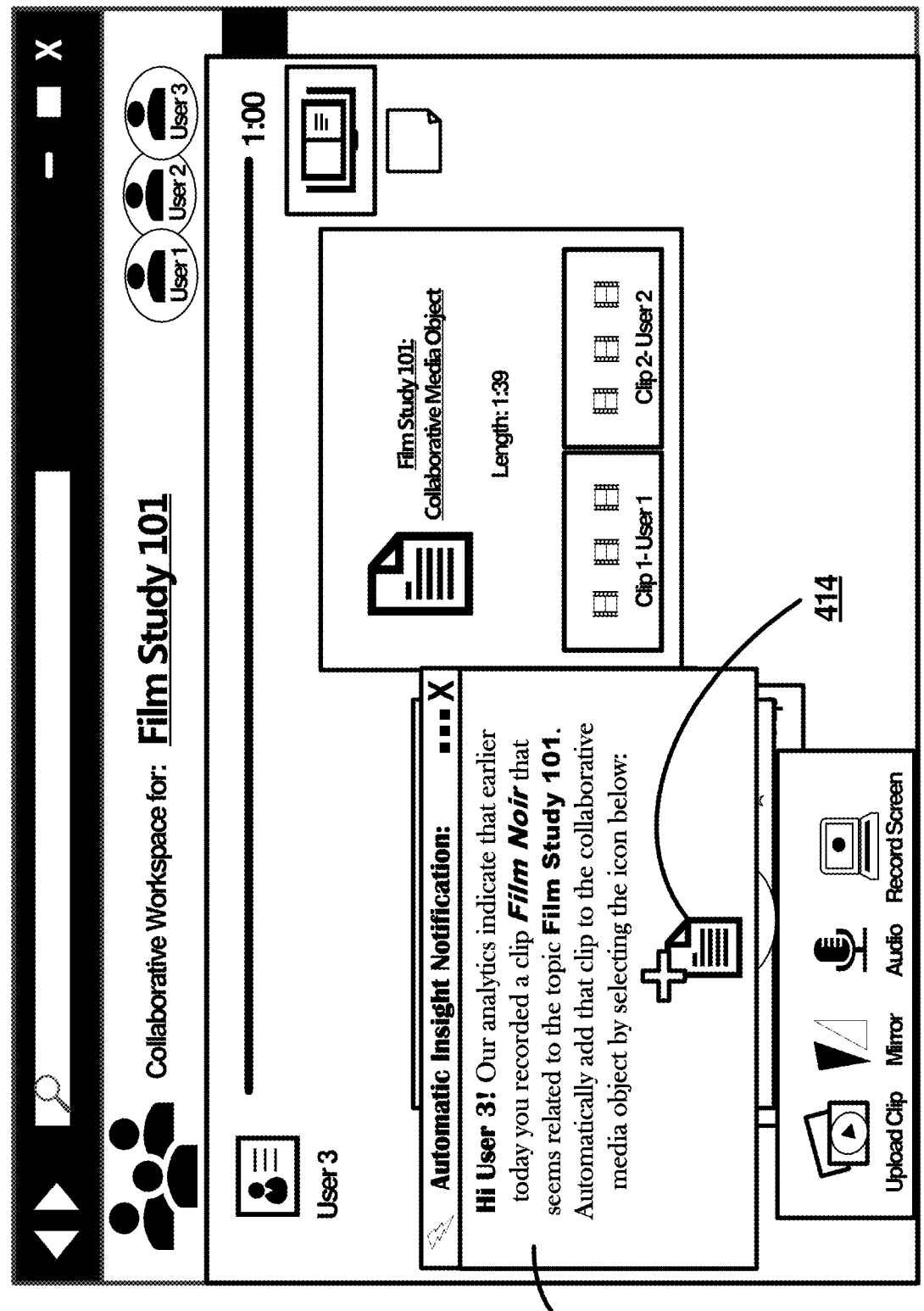

FIG. 4C illustrates processing device view 410, presenting data insight notification 412. Data insight notification 412 is the result of back-end context analysis that identifies content from another application/service that may be relevant to a topic of the collaborative workspace and generation of a collaborative media object. In the example shown in processing device view 410, it is determined that "User 3" recorded a video clip ("Film Noir") prior to joining the collaborative workspace. Furthermore, to aid user productivity, an automatic GUI element 414 is presented that is configured for automatic upload of the previously recorded video clip ("Film Noir") to the collaborative workspace. Selection of the automatic GUI element 414 would result in execution of an automatic action to update the collaborative media object. Alternatively, the user could upload the video clip ("Film Noir") through a series of actions via a GUI menu for feature management (e.g., GUI menu for feature management 307 of FIG. 3A).

FIG. 4D illustrates processing device view 415, presenting data insight notification 416. Data insight notification 417 brings attention to a "Trim" feature for editing of frames of an exemplary collaborative media object. As previously described, application-specific signal data, including guidelines and parameters for posting/submitting a collaborative media object, may be analyzed and used to aid generation of content for data insights. In the example shown in data insight notification 417, a length of a collaborative video submission is becoming increasingly close to the time requirement set forth by a teacher who assigned the "Film Study 101" assignment. This is called out for the users to make them aware of the guidelines/parameters set for content submission. Furthermore, contextual analysis of the collaborative media object, among other types of signal data, reveals that duplicate frames have been identified in the video clips that aggregate to form the collaborative media object. A suggestion for removing some of duplicate frames is presented to "User 2". This is a contextually relevant suggestion that results from relevance analysis of a user context relative to the collaborative workspace.

Figure 4E:
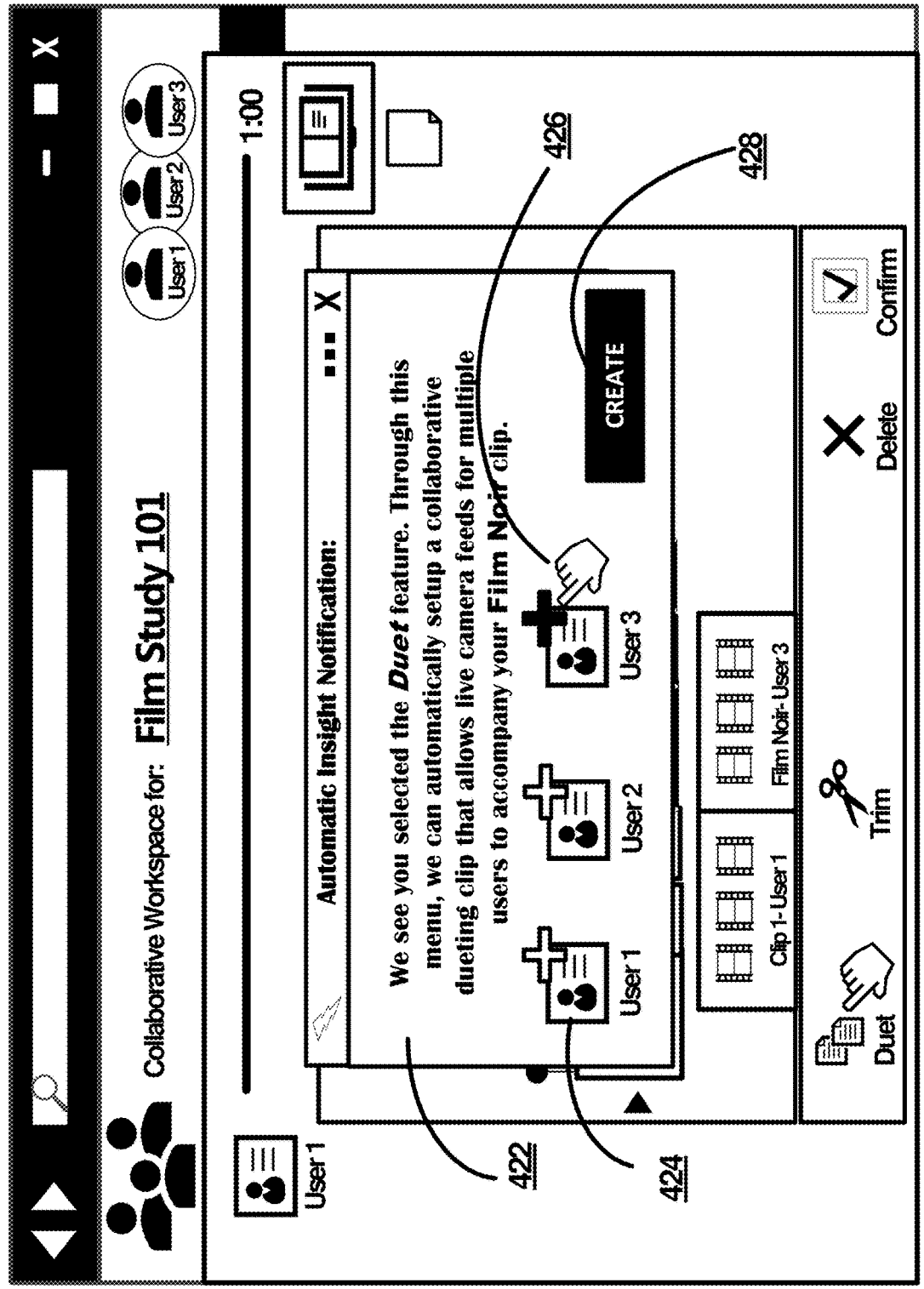

FIG. 4E illustrates processing device view 420, presenting data insight notification 422. Data insight notification 422 is an automatic data insight configured to aid a user with automatic creating of a collaborative dueting clip. The processes for creation of a dueting request and collaborative dueting clips has been previously described in the foregoing description. In processing device view 420, data insight notification 422 provides GUI elements 424 that each correspond to a respect user that is concurrently accessing the collaborative workspace (e.g., users 1-3). Data insight notification 422 enables users to utilize GUI elements 424 to quickly select which users they would like to include in a dueting request (including creation of a collaborative dueting request). In the example shown in processing device 420, "User 1" executes a selection action 426 to elect to involve "User 3" in the collaborative dueting request. Selection of creation GUI element 428 would automatically initiate creation of a dueting clip involving "User 3". Additional users selected via GUI elements 424 would result in the automatic initiation and processing of a collaborative dueting request.

Figure 4F:
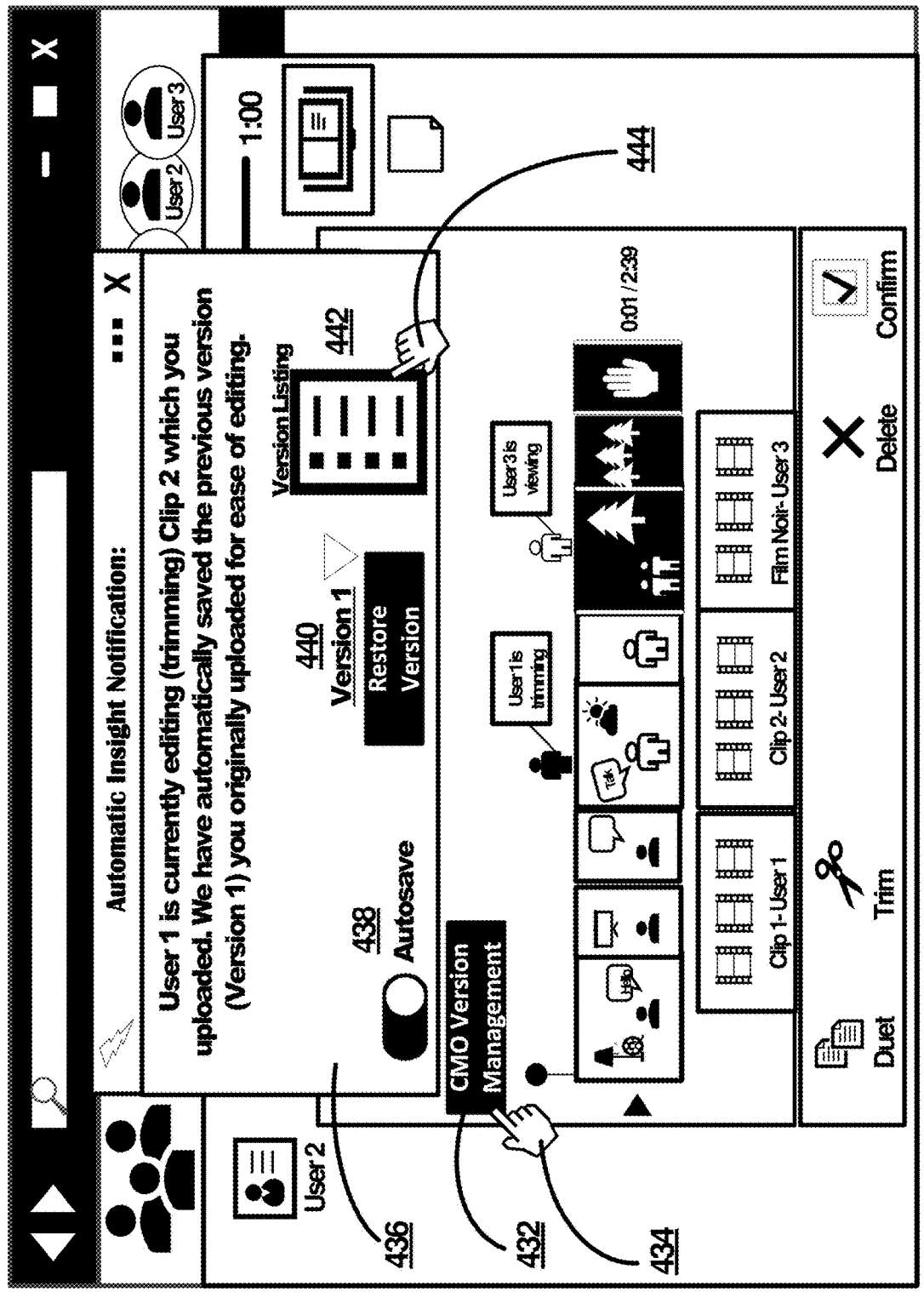

FIG. 4F illustrates processing device view 430, presenting data insight notifications related to management of different versions of a collaborative media object. Processing device view 430 presents a version control GUI feature 432 ("CMO Version Management), which provides quick access to a GUI feature menu 436 that enables user control over versioning of a collaborative media object. For instance, a user selection action 434 of GUI feature 432 would result in the presentation of GUI feature menu 436 in a GUI of the video discussion application/service. In the example shown, GUI feature menu 436 further comprises a data insight that provides real-time (or near real-time) status updates as to the editing of a collaborative media object including identifying that multiple versions of the collaborative media object have been automatically saved on behalf of the group of users. An autosave GUI feature 438 is further presented in GUI feature menu 436, where the autosave GUI feature 438 enables toggle control over whether to automatically save versions of a collaborative media object. In some instances, users may strictly prefer that a most recent version of the collaborative media object be accessible.

Moreover, processing device view 430 presents additional GUI features, within the GUI feature menu 436, that enable further control over presentation of a collaborative media object. Version selection GUI feature 440 enables toggling/restoring of a version of the collaborative media object to a previous (or different) version of the collaborative media object. For instance, a user may not like the changes another user collaboratively made to the collaborative media object. A user may wish to rollback the changes and restore a previous version ("Version 1") of the collaborative media object. In a non-limiting example, the version selection GUI feature 440 also includes a selectable feature that may reveal a version listing GUI feature 442 which provides a full list of all versions of the collaborative media object. In the example shown a user action 444 is executed that selects "Version 1" from the version listing GUI feature 442. This would automatically result in update of the version selection GUI feature 440. While a plurality of selectable features is shown in GUI feature menu 436 for ease of viewing, it is to be recognized that presentation of any of the described GUI features may vary including presentation of a plurality of different GUI elements and/or GUI windows.

Figure 4G:
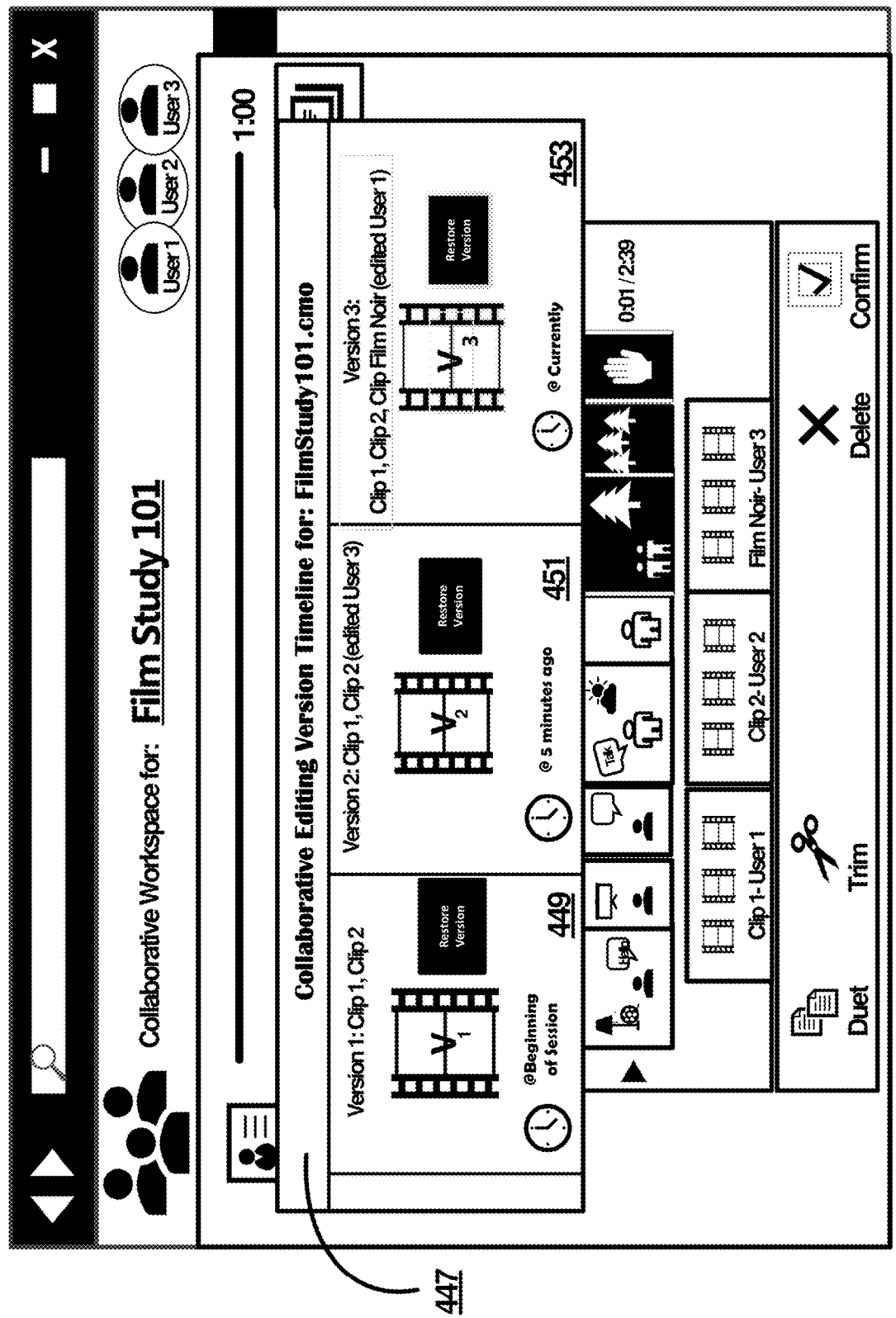

FIG. 4G illustrates processing device view 445, presenting a dynamic GUI timeline 447 that visually presents temporal representation of collaborative editing related to a collaborative media object. The dynamic GUI timeline 447 provides users with a visual representation of user activity, relative to the collaborative media object, within the collaborative workspace. In further instances, a teacher, accessing the collaborative workspace, can further evaluate (grade) user interactions and participation in creation of the collaborative media object.

Processing device view 445 illustrates an alternative manner in which versions of a collaborative media object may be represented to users of the collaborative workspace. In the example show, a first temporal indication 449 provides data related to generation of a collaborative media object within the collaborative workspace. A second temporal indication 451 provides data related to a first edit/modification of the collaborative media object within the collaborative workspace (e.g., a collaborative session thereof). A third temporal indication 453 provides data related to a subsequent edit/modification of the collaborative media object within the collaborative workspace (e.g., a collaborative session thereof). In some examples, selectable GUI elements may also be provided within the dynamic GUI timeline 447, which when selected, enable automatic return of the collaborative media object to a respective version (e.g., a previous version).

Figure 4H:
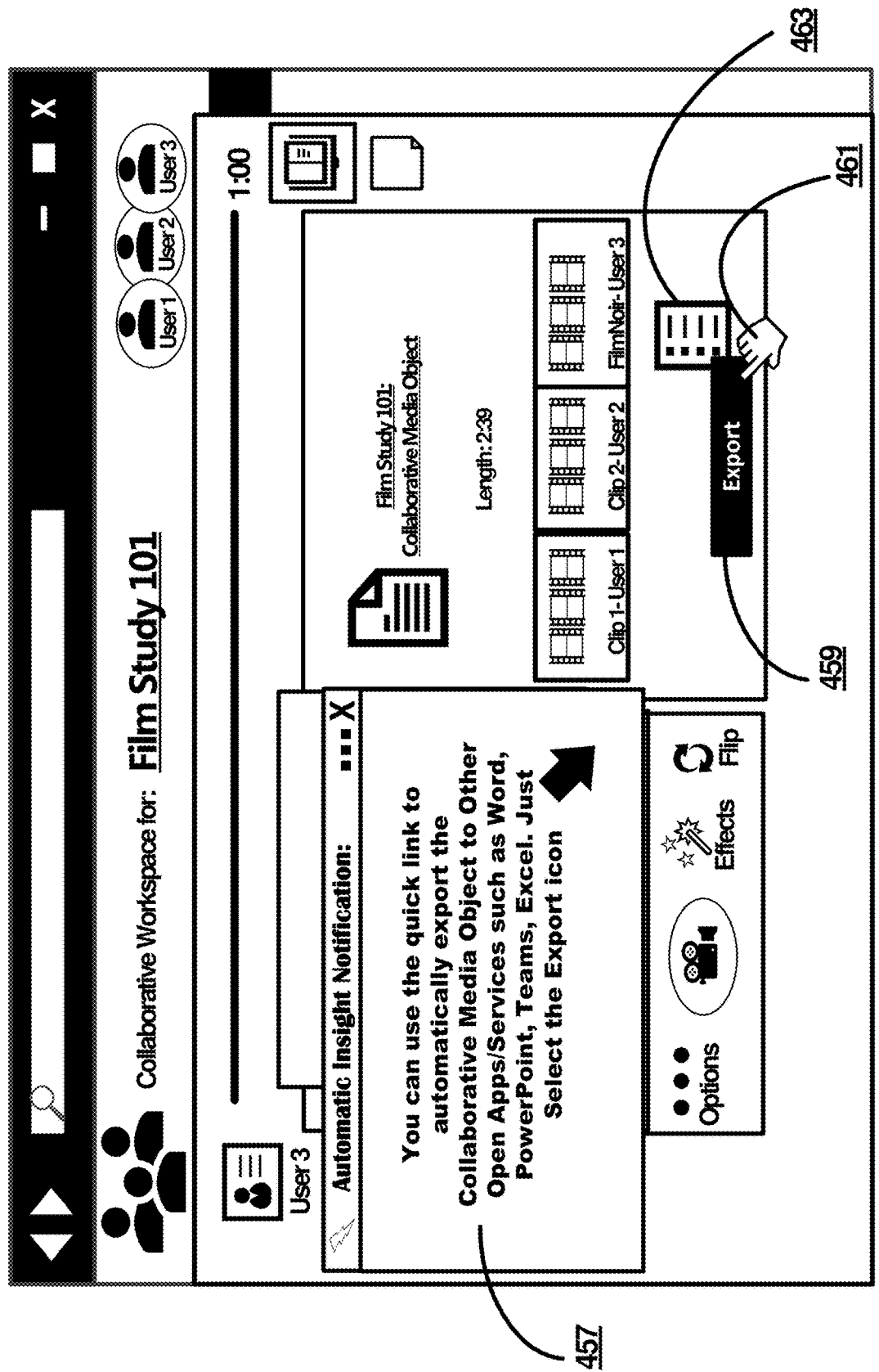

FIG. 4H illustrates processing device view 455, presenting a data insight notification 457 that directs attention to an export GUI feature 459 provided through a GUI of the video discussion application/service. Data insight notification 457 directs a user to additional features of a GUI window that is specific to management of a collaborative media object within the collaborative workspace of a video discussion application/service. Export GUI feature 459 is configured to automatically initiate a request to export the collaborative media object for processing within another application/service (e.g., GUI thereof). In the example shown in processing device view 455, a user selection action 461 selects export GUI feature 459. This results in the automatic presentation of a GUI listing of applications/services 463, where the user can select a specific application/service for export of the collaborative media object. For example, a user may select a word processing application/service, which would result in the automatic export of the collaborative media object to a word processing document presented through a GUI of the word processing application/service. In examples where a specific word processing document is selected, a collaborative media object may be automatically embedded within that word processing document.

Figure 4I:
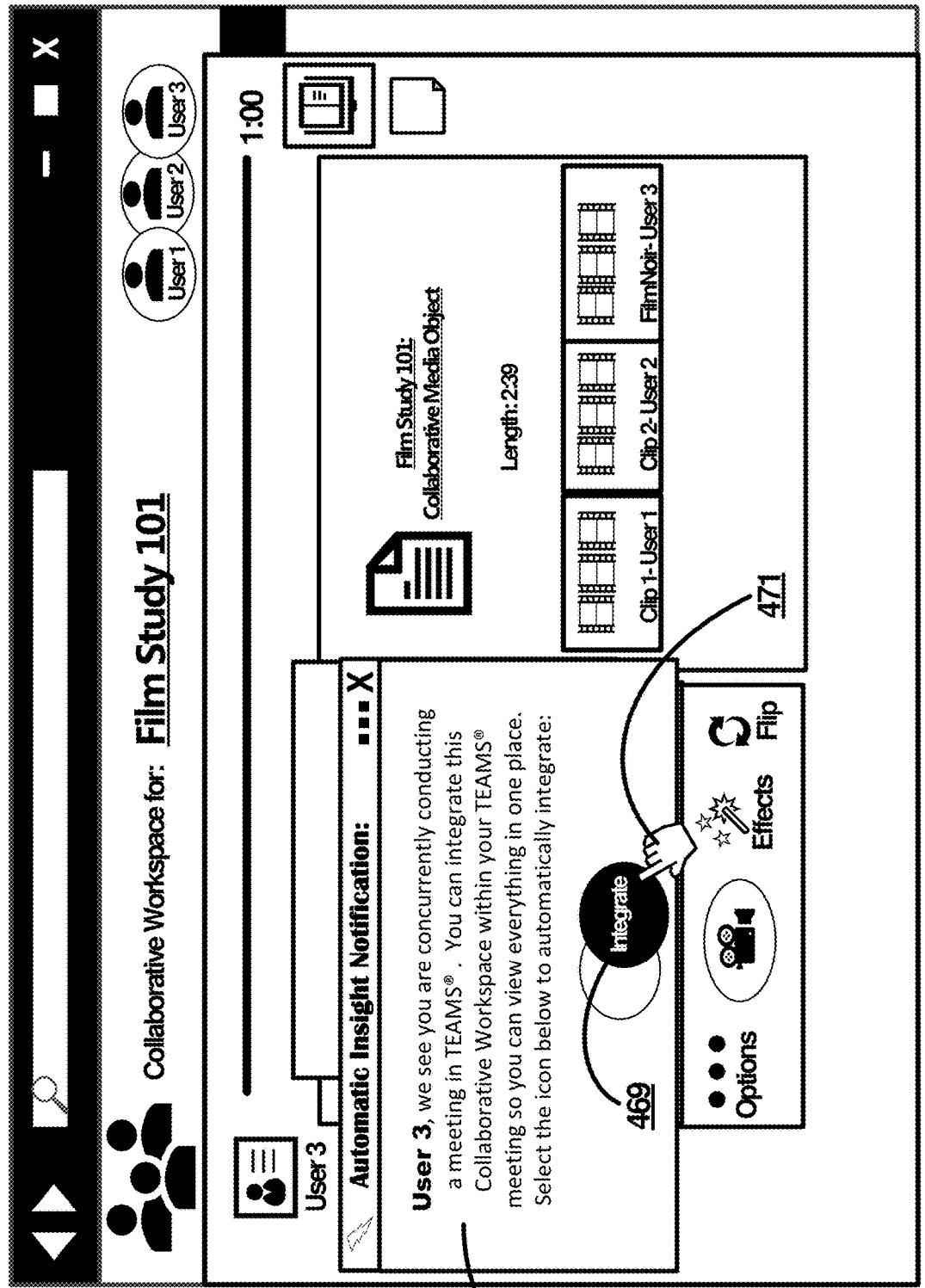

FIG. 4I illustrates processing device view 465, presenting a data insight notification 467 directing attention to an integration GUI feature 469 provided through a GUI of the video discussion application/service. When selected, the integration GUI feature 469 is configured to automatically integrate a GUI representation of the collaborative workspace (of the video discussion application/service) into a GUI representation of another application/service. In the example shown in processing device view 465, contextual analysis of a user context yielded a determination that "User 3" is concurrently engaged in an electronic meeting (e.g., through MICROSOFT® TEAMS®) and continues to switch back and forth between the video discussion application/service and a GUI for the electronic meeting. By selecting integration GUI feature 469, via user selection action 471, the collaborative workspace of the video discussion is automatically integrated into the GUI presenting the electronic meeting as shown in processing device view 475 (FIG. 4J).

FIG. 4J illustrates processing device view 475, presenting a visual representation of an integration of a collaborative workspace (of a video discussion application/service) within a GUI representation of another application/service endpoint (e.g., MICROSOFT® TEAMS®). As shown in processing device view 475, a GUI representation of the collaborative workspace 477 is presented within a GUI of another application/service endpoint. For ease of control over access to the collaborative workspace, a return GUI feature 479 is incorporated within the GUI representation of the collaborative workspace 477. This may improve processing efficiency (e.g., reduction is processing of user actions) as well as application/service usability by avoiding requiring users to close/minimize/resize different GUI windows to access different GUIs. Selection of the return GUI feature 479 would result in the automatic return to a GUI window representation of the collaborative workspace as shown prior to integration within the different application/service endpoint.

FIG. 5 illustrates a computing system 501 suitable for implementing processing operations described herein related to generation and management of collaborative media objects and data insights within an exemplary collaborative workspace, with which aspects of the present disclosure may be practiced. As referenced above, computing system 501 may be configured to implement processing operations of any component described herein including exemplary collaborative media management components as previously described. As such, computing system 501 may be configured to execute specific processing operations to solve the technical problems described herein, which comprise processing operations for intelligent and timely contextual analysis that is usable to automatically generate and management exemplary collaborative media objects including integration across different applications/services. Computing system 501 may be implemented as a single apparatus, system, or device or may be implemented in a distributed manner as multiple apparatuses, systems, or devices. For example, computing system 501 may comprise one or more computing devices that execute processing for applications and/or services over a distributed network to enable execution of processing operations described herein over one or more applications or services. Computing system 501 may comprise a collection of devices executing processing for front-end applications/services, back-end applications/service or a combination thereof. Computing system 501 comprises, but is not limited to, a processing system 502, a storage system 503, software 505, communication interface system 507, and user interface system 509. Processing system 502 is operatively coupled with storage system 503, communication interface system 507, and user interface system 509. Non-limiting examples of computer system 501 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 502 loads and executes software 505 from storage system 503. Software 505 includes one or more software components (e.g., 506a and 506b) that are configured to enable functionality described herein. In some examples, computing system 501 may be connected to other computing devices (e.g., display device, audio devices, servers, mobile/remote devices, gaming devices, VR devices, AR devices, etc.) to further enable processing operations to be executed. When executed by processing system 502, software 505 directs processing system 502 to operate as described herein for at least the various processes, operational scenarios, and sequences discussed in the foregoing implementations. Computing system 501 may optionally include additional devices, features, or functionality not discussed for purposes of brevity. Computing system 501 may further be utilized to execute system diagram 100 (FIG. 1), processing operations described in method 200 (FIG. 2A), method 250 (FIG. 2B) and/or the accompanying description of FIGS. 3A-3L and 4A-4J.

Referring still to FIG. 5, processing system 502 may comprise processor, a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, microprocessors, graphical processing units, application specific processors, sound cards, speakers and logic devices, gaming devices, VR devices, AR devices as well as any other type of processing devices, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for executing one or more collaborative media management component(s) 506a as described herein. Software 505 may further comprise application/service component(s) 506b that provide applications/services as described in the foregoing description such as applications/services that enable access to data usable to engage in user communications and application/services that enable users to engage in user communications, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to execute specific processing components described herein as well as process data and respond to queries. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Communication interface system 507 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: an improved GUI providing automatic generation of collaborative media objects; application command control and GUI features to aid generation and management of collaborative media objects; notification of automatically generated data insights and representations thereof; and generation and management of dynamic data insight timelines, among other examples. User interface system 509 comprises a graphical user interface that presents graphical user interface elements representative of any point in the processing described in the foregoing description including processing operations described in system diagram 100 (FIG. 1), processing operations described in method 200 (FIG. 2A), method 250 (FIG. 2B) and/or the accompanying description of FIGS. 3A-3L and 4A-4J. A graphical user interface of user interface system 509 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 501 that enable output of other types of signals (e.g., audio output) in conjunction with operation of exemplary applications/services (e.g., presentation broadcast service) described herein.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    rendering, in a graphical user interface (GUI) representation of a video discussion application or service, a collaborative workspace that is accessed by at least two users and further provides a topic for the at least two users to respond to by providing content including video feeds;
    detecting signal data associated with the at least two users, wherein the signal data comprises application-specific signal data pertaining to user interactions of the at least two users within the collaborative workspace of the video discussion application or service;
    applying a trained artificial intelligence (AI) model that is trained to generate representations of data insights for management of a collaborative media object within the collaborative workspace, wherein an application of the trained AI model comprises execution of processing operations that comprise:
        analyzing the signal data, including the application-specific signal data, using the trained AI model,
        determining a user context of the at least two users within the collaborative workspace based on an analysis of the application-specific signal data,
        generating data insights corresponding with features of the video discussion application or service based on a relevance evaluation that is derived from analyzing of:
            the signal data including the application-specific signal data,
            the user context of the at least two users within the collaborative workspace, and
            a state of a collaborative media object within the collaborative workspace, wherein the collaborative media object is a single media object that comprises an aggregation of two or more of the video feeds added through the collaborative workspace of the video discussion application or service, and generating a representation of one or more data insights for the video discussion application or service based on a result of the relevance evaluation; and presenting, in the GUI representation of the video discussion application or service, the representation of the one or more data insights within the collaborative workspace.

2. The method of claim 1, wherein the generating of the data insights further comprises generating, as the relevance evaluation, relevance scoring for each of the data insights that scores a relevance of a data insight relative to a most recent user action that modified the collaborative media object; and curating the data insights based on a threshold evaluation of the relevance scoring, and wherein a data insight, used in the representation of one or more data insights, is selected based on a result of the curating of the data insights.

3. The method of claim 1, wherein the generating of the data insights further comprises generating, as the relevance evaluation, relevance scoring for each of the data insights that scores a data insight relative to assignment instructions, associated with the collaborative workspace, for posting a video discussion response to the topic; and curating the data insights based on a threshold evaluation of the relevance scoring, and wherein a data insight, used in the representation of one or more data insights, is selected based on a result of the curating of the data insights.

4. The method of claim 1, wherein the generating of the data insights further comprises generating, as the relevance evaluation, relevance scoring for each of the data insights that scores a data insight relative to a most recent user action within the collaborative workspace; and curating the data insights based on a threshold evaluation of the relevance scoring, and wherein a data insight, used in the representation of one or more data insights, is selected based on a result of the curating of the data insights.

5. The method of claim 1, wherein the generating of the data insights further comprises generating, as the relevance evaluation, relevance scoring for each of the data insights that scores a relevance of a feature of the video discussion application or service relative to content associated with a different application or service; and curating the data insights based on a threshold evaluation of the relevance scoring, and wherein a data insight, used in the representation of one or more data insights, is selected based on a result of the curating of the data insights.

6. The method of claim 1, wherein the generating of the representation of the one or more data insights comprises generating a selectable GUI element configured to provide an automatic execution of a feature of the video discussion application or service, and wherein the presenting of the representation of the one or more data insights comprises presenting a corresponding data insight along with the selectable GUI element.

7. The method of claim 6, wherein the selectable GUI element, upon selection, is configured to automatically export the collaborative media object to another application or service.

8. The method of claim 6, wherein the selectable GUI element, upon selection, is configured to automatically initiate integration of the collaborative workspace within a GUI of another application or service.

9. A system comprising:
at least one processor; and
a memory, operatively connected with the at least one processor, storing computer-executable instructions that, when executed by the at least one processor, causes the at least one processor to execute a method that comprises:
rendering, in a graphical user interface (GUI) representation of a video discussion application or service, a collaborative workspace that is accessed by at least two users and further provides a topic for the at least two users to respond to by providing content including video feeds;
detecting signal data associated with the at least two users, wherein the signal data comprises application-specific signal data pertaining to user interactions, of the at least two users, within the collaborative workspace of the video discussion application or service;
applying a trained artificial intelligence (AI) model that is trained to generate representations of data insights for management of a collaborative media object within the collaborative workspace, wherein an application of the trained AI model comprises execution of processing operations that comprise:
analyzing the signal data, including the application-specific signal data, using the trained AI model,
determining a user context of the at least two users within the collaborative workspace based on an analysis of the application-specific signal data,
generating data insights corresponding with features of the video discussion application or service based on a relevance evaluation that is derived from analyzing of:
the signal data including the application-specific signal data,
the user context of the at least two users within the collaborative workspace, and
a state of a collaborative media object within the collaborative workspace, wherein the collaborative media object is a single media object that comprises an aggregation of two or more of the video feeds added through the collaborative workspace of the video discussion application or service, and
generating a representation of one or more data insights for the video discussion application or service based on a result of the relevance evaluation; and
presenting, in the GUI representation of the video discussion application or service, the representation of the one or more data insights within the collaborative workspace.

10. The system of claim 9, wherein the generating of the data insights further comprises generating, as the relevance evaluation, relevance scoring for each of the data insights that scores a relevance of a data insight relative to a most recent user action that modified the collaborative media object; and curating the data insights based on a threshold evaluation of the relevance scoring, and wherein a data insight, used in the representation of one or more data insights, is selected based on a result of the curating of the data insights.

11. The system of claim 9, wherein the generating of the data insights further comprises generating, as the relevance evaluation, relevance scoring for each of the data insights that scores a data insight relative to assignment instructions, associated with the collaborative workspace, for posting a video discussion response to the topic; and curating the data insights based on a threshold evaluation of the relevance scoring, and wherein a data insight, used in the representation of one or more data insights, is selected based on a result of the curating of the data insights.

12. The system of claim 9, wherein the generating of the data insights further comprises generating, as the relevance evaluation, relevance scoring for each of the data insights that scores a data insight relative to a most recent user action within the collaborative workspace; and curating the data insights based on a threshold evaluation of the relevance scoring, and wherein a data insight, used in the representation of one or more data insights, is selected based on a result of the curating of the data insights.

13. The system of claim 9, wherein the generating of the data insights further comprises generating, as the relevance evaluation, relevance scoring for each of the data insights that scores a relevance of a feature of the video discussion application or service relative to content associated with a different application or service; and curating the data insights based on a threshold evaluation of the relevance scoring, and wherein a data insight, used in the representation of one or more data insights, is selected based on a result of the curating of the data insights.

14. The system of claim 9, wherein the generating of the representation of the one or more data insights comprises generating a selectable GUI element configured to provide an automatic execution of a feature of the video discussion application or service, and wherein the presenting of the representation of the one or more data insights comprises presenting a corresponding data insight along with the selectable GUI element.

15. The system of claim 14, wherein the selectable GUI element, upon selection, is configured to automatically export the collaborative media object to another application or service.

16. A method comprising:
    transmitting, to a client computing device, data for rendering a graphical user interface (GUI) representation of a collaborative workspace within a video discussion application or service, wherein the collaborative workspace is accessed by at least two users and further provides a topic for the at least two users to respond to by providing content including video feeds;
    detecting signal data associated with the at least two users, wherein the signal data comprises application-specific signal data pertaining to user interactions, of the at least two users, within the collaborative workspace of the video discussion application or service;
    applying a trained artificial intelligence (AI) model that is trained to generate representations of data insights for management of a collaborative media object within the collaborative workspace, wherein an application of the trained AI model comprises execution of processing operations that comprise:
        analyzing the signal data, including the application-specific signal data, using the trained AI model,
        determining a user context of the at least two users within the collaborative workspace based on an analysis of the application-specific signal data,
        generating data insights corresponding with features of the video discussion application or service based on a relevance evaluation that is derived from analyzing of:
            the signal data including the application-specific signal data,
            the user context of the at least two users within the collaborative workspace, and
            a state of a collaborative media object within the collaborative workspace, wherein the collaborative media object is a single media object that comprises an aggregation of two or more of the video feeds added through the collaborative workspace of the video discussion application or service, and
        generating a representation of one or more data insights for the video discussion application or service based on a result of the relevance evaluation; and
    transmitting, to the client computing device, data for rendering the representation of the one or more data insights within the collaborative workspace of the video discussion application or service.

17. The method of claim 16, wherein the generating of the data insights further comprises generating, as the relevance evaluation, relevance scoring for each of the data insights that scores a relevance of a data insight relative to a most recent user action that modified the collaborative media object; and curating the data insights based on a threshold evaluation of the relevance scoring, and wherein a data insight, used in the representation of one or more data insights, is selected based on a result of the curating of the data insights.

18. The method of claim 16, wherein the generating of the data insights further comprises generating, as the relevance evaluation, relevance scoring for each of the data insights that scores a data insight relative to assignment instructions, associated with the collaborative workspace, for posting a video discussion response to the topic; and curating the data insights based on a threshold evaluation of the relevance scoring, and wherein a data insight, used in the representation of one or more data insights, is selected based on a result of the curating of the data insights.

19. The method of claim 16, wherein the generating of the data insights further comprises generating, as the relevance evaluation, relevance scoring for each of the data insights that scores a data insight relative to a most recent user action within the collaborative workspace; and curating the data insights based on a threshold evaluation of the relevance scoring, and wherein a data insight, used in the representation of one or more data insights, is selected based on a result of the curating of the data insights.

20. The method of claim 16, wherein the generating of the data insights further comprises generating, as the relevance evaluation, relevance scoring for each of the data insights that scores a relevance of a feature of the video discussion application or service relative to content associated with a different application or service; and curating the data insights based on a threshold evaluation of the relevance scoring, and wherein a data insight, used in the representation of one or more data insights, is selected based on a result of the curating of the data insights.

* * * * *